(12) United States Patent
Koch et al.

(10) Patent No.: US 11,947,354 B2
(45) Date of Patent: Apr. 2, 2024

(54) GEOCODING DATA FOR AN AUTOMATED VEHICLE

(71) Applicant: Automodality, Inc., Syracuse, NY (US)

(72) Inventors: Edward Lee Koch, San Rafael, CA (US); Daniel Allan Hennage, Mill Valley, CA (US)

(73) Assignee: FARMX Inc., Mountain View, CA (US)

(*) Notice: Subject to any disclaimer, the term of this patent is extended or adjusted under 35 U.S.C. 154(b) by 0 days.

(21) Appl. No.: 17/888,443

(22) Filed: Aug. 15, 2022

(65) Prior Publication Data

US 2023/0251655 A1 Aug. 10, 2023

Related U.S. Application Data

(63) Continuation of application No. 16/694,957, filed on Nov. 25, 2019, now Pat. No. 11,415,986, which is a continuation of application No. 15/175,374, filed on Jun. 7, 2016, now Pat. No. 10,488,860.

(51) Int. Cl.
| | |
|---|---|
| G05D 1/00 | (2006.01) |
| G01C 21/00 | (2006.01) |
| G06F 16/29 | (2019.01) |
| G06F 16/9537 | (2019.01) |

(52) U.S. Cl.
CPC ....... *G05D 1/0088* (2013.01); *G01C 21/3841* (2020.08); *G06F 16/29* (2019.01); *G06F 16/9537* (2019.01); *Y10S 707/99945* (2013.01); *Y10S 707/99948* (2013.01)

(58) Field of Classification Search
CPC .............. G05D 1/0088; G01C 21/3841; Y10S 707/99945; Y10S 707/99948
See application file for complete search history.

(56) References Cited

U.S. PATENT DOCUMENTS

| | | | | |
|---|---|---|---|---|
| 4,652,803 A | * | 3/1987 | Kamejima | G05D 1/0246 318/568.25 |
| 6,118,404 A | * | 9/2000 | Fernekes | G01C 21/3878 701/430 |
| 6,321,158 B1 | * | 11/2001 | DeLorme | G06Q 10/047 701/426 |
| 6,327,533 B1 | * | 12/2001 | Chou | G01S 19/49 701/472 |

(Continued)

*Primary Examiner* — Michael J Zanelli
(74) *Attorney, Agent, or Firm* — Kerr IP Group, LLC

(57) ABSTRACT

An Autonomous Vehicle (AV) system is described. The AV system is capable of determining at motor control command associated with an AV trajectory. The AV system includes a content generating device, a system controller, and an AV sensor. The content generating device collects target data associated with a target. The system controller is communicatively coupled to the content generating device. The system controller extracts target features from the target data. Also, the system controller compares the extracted target features to target model data to determine a target pose. Additionally, the system controller determines the AV trajectory by comparing the target pose with at least one target objective. The AV sensor determines an AV state. The system controller determines a motor control command associated with the AV trajectory based on the AV state, the target objective, and the AV trajectory.

20 Claims, 41 Drawing Sheets

Automated Vehicle Subsystems

(56) References Cited

U.S. PATENT DOCUMENTS

| | | | |
|---|---|---|---|
| 6,681,231 B1* | 1/2004 | Burnett | G06F 16/9537 348/222.1 |
| 6,850,269 B2* | 2/2005 | Maguire | H04N 7/181 348/E7.086 |
| 6,853,332 B1* | 2/2005 | Brookes | G01S 3/7864 342/63 |
| 6,985,588 B1* | 1/2006 | Glick | H04L 63/06 380/258 |
| 7,277,126 B2* | 10/2007 | Koizumi | H04N 1/4092 348/222.1 |
| 7,603,334 B2* | 10/2009 | Beloesch | G06F 11/3676 717/124 |
| 8,560,146 B2* | 10/2013 | Kwon | G01N 33/0075 701/4 |
| 9,164,511 B1* | 10/2015 | Ferguson | B60W 40/06 |
| 2002/0003571 A1* | 1/2002 | Schofield | B60Q 1/543 348/148 |
| 2002/0026289 A1* | 2/2002 | Kuzunuki | H04W 4/02 702/150 |
| 2002/0044690 A1* | 4/2002 | Burgess | G06F 16/29 382/209 |
| 2002/0055924 A1* | 5/2002 | Liming | G06F 16/29 |
| 2002/0078035 A1* | 6/2002 | Frank | G06F 16/954 |
| 2004/0015467 A1* | 1/2004 | Fano | G06F 16/48 |
| 2004/0019584 A1* | 1/2004 | Greening | G06F 16/2365 |
| 2004/0070678 A1* | 4/2004 | Toyama | H04N 1/00244 707/E17.026 |
| 2004/0229620 A1* | 11/2004 | Zhao | H04W 64/00 455/445 |
| 2004/0241860 A1* | 12/2004 | Kaster, Jr. | C12N 15/8289 800/278 |
| 2005/0009573 A1* | 1/2005 | Tokkonen | H04M 1/72445 455/567 |
| 2005/0021202 A1* | 1/2005 | Russell | H04B 7/18506 348/143 |
| 2005/0063563 A1* | 3/2005 | Soliman | H04N 1/32117 382/104 |
| 2005/0209815 A1* | 9/2005 | Russon | G06F 16/58 707/E17.026 |
| 2005/0228860 A1* | 10/2005 | Hamynen | H04L 67/52 709/203 |
| 2005/0234896 A1* | 10/2005 | Shima | G06F 16/954 |
| 2006/0145892 A1* | 7/2006 | Gueziec | G08G 1/09675 340/995.13 |
| 2006/0241860 A1* | 10/2006 | Kimchi | G06Q 30/0275 340/995.14 |
| 2007/0032244 A1* | 2/2007 | Counts | H04W 8/14 455/456.1 |
| 2013/0318214 A1* | 11/2013 | Tebay | H04L 67/06 709/219 |
| 2014/0074342 A1* | 3/2014 | Wong | G05D 1/021 701/26 |
| 2014/0316616 A1* | 10/2014 | Kugelmass | G05D 1/104 701/8 |
| 2016/0214715 A1* | 7/2016 | Meffert | G01S 17/88 |
| 2017/0206648 A1* | 7/2017 | Marra | G01C 21/20 |
| 2017/0336792 A1* | 11/2017 | Gdalyahu | G06F 16/2379 |

* cited by examiner

Figure 27. Main Architecture Components

Figure 28. Expanded Architecture Components

Figure 29. Automated Vehicle Subsystems

Figure 30. Autonomous Vehicle System Controller Functions

Figure 31. Ground Station Functions

Figure 32. Cloud Station Functions

Figure 33. Target Detection/Recognition

Figure 34. AV Motion Commands with Respect to the Target

Figure 35. AV Motion Control

Figure 36. AV Aided Fish Finder

Figure 37. Example UI Device with Video Rate Control

Figure 38. Main Architecture with Chronicle Server

Figure 39. Chronicle Generation Algorithm

Figure 40. Example Chronicle

GEOCODING DATA FOR AN AUTOMATED VEHICLE

CROSS-REFERENCE

This patent application is a Continuation of patent application Ser. No. 16/694,957 (now U.S. Pat. No. 11,415,986) entitled GEOCODING DATA FOR AN AUTOMATED VEHICLE filed on Nov. 25, 2019, which is Continuation of patent application Ser. No. 15/175,374 (now U.S. Pat. No. 10,488,860) entitled GEOCODING DATA FOR AN AUTOMATED VEHICLE filed Jun. 7, 2016, all of which are hereby incorporated by reference.

FIELD

The invention relates to systems for collecting and geocoding object data. More particularly, the invention relates to systems for collecting object data with an automated vehicle (AV) as the AV traverses a specified route, geocoding the collected object data, and presenting the geocoded object data on a user device.

BACKGROUND

With the widespread use of Global Position System (GPS) sensors, geographic identifiers are commonly used to track vehicles and to help drivers find a particular location. Geocoding, or geo-location, is the process of assigning geographic identifiers such as latitude, longitude, or Universal Transverse Mercator (UTM) to data or content. The data having the geographic coordinates can be mapped and entered into a Geographic Information System (GIS). These location tags may also take the form of an actual address which can be translated into latitude and longitude.

An illustrative example of geocoded data is a geocoded photo. The geocoded photo is an image that is associated with a geographical location. A geocoded image can be associated to geographic coordinates such as latitude and longitude or a physical address. In theory, every part of a picture can be tied to geographic location, but in the most typical application, only the position of the photograph is associated with the entire digital image.

There are various methods for geocoding data. For example, where data to be geocoded comprises an image recorded by a location aware device such as a camera equipped with a GPS receiver, the location of the camera used to take a particular photo is recorded. Although most digital cameras do not contain a built in GPS receiver, an external GPS device can be used to keep track of the camera location and the data can be synchronized using specialized software.

The process of geocoding user generated data is often a relatively challenging and time consuming task. For example, the currently available location aware devices are specialized devices that may not integrate with other electronic devices. Thus, it can become quite challenging to geocode user generated data that is generated from a first device with location specific content that is generated by another device that has different capabilities. A simplified system and method for geocoding user generated data is therefore desirable.

Data may also be geocoded in association with a variety of assets or objects for observation or monitoring purposes. For example, an object or asset, such as a fence, a levee, a building, a bridge, a power line, and the like, may require periodic visual inspection. To this end, data may be collected in association with the object and geocoded. However, the problems described above may persist. For instance, user generated data can be difficult to geocode. Additionally, it may be difficult or time consuming to regularly collect or geocode such data, particularly when the object to be visually inspected is not easily accessible or disposed over rough or difficult terrain. Systems and methods for collecting and geocoding such data at regular intervals are therefore desirable.

SUMMARY

An Autonomous Vehicle (AV) system is described. The AV system is capable of determining a motor control command associated with an AV trajectory. The AV system includes a content generating device, a system controller, and an AV sensor. The content generating device collects target data associated with a target. The system controller is communicatively coupled to the content generating device. The system controller extracts target features from the target data. Also, the system controller compares the extracted target features to target model data to determine a target pose. Additionally, the system controller determines the AV trajectory by comparing the target pose with at least one target objective. The AV sensor determines an AV state. The system controller determines a motor control command associated with the AV trajectory based on the AV state, the target objective, and the AV trajectory.

A system for determining an Automated Vehicle (AV) trajectory that includes an AV and a server is also described. The AV includes a content generating device, a system controller, and an AV sensor. The content generating device collects target data associated with a target. The system controller is communicatively coupled to the content generating device. The AV sensor determines an AV state. The server is communicatively coupled to the AV. The server receives the target data from the AV. The server then extracts target features from the target data. The extracted target features are compared to target model data to determine a target pose. The server determines the AV trajectory by comparing the target pose with a target objective. The server then transmits the AV trajectory to the AV system controller. In one embodiment, the server determines an AV state, determines at least one motor control command based upon the AV state, the at least one target objective, and the AV trajectory, and transmits the motor control command to the system controller. In a further embodiment, the server includes at least one of a ground station and a cloud station.

In one embodiment, the extracted target features include at least one of an edge, a corner, and a shape. In another embodiment, the content generating device includes at least one of a sonar sensor, an infrared sensor, a LIDAR sensor, and a camera. In yet another embodiment, the target model data includes at least one of a target model feature and a target location. In a still further embodiment, the target pose includes at least one of a target location with respect to the AV and an orientation with respect to the AV. In a further embodiment, the at least one target objective includes at least one of an AV location with respect to the target, an AV orientation with respect to the target, a time, and a velocity. In an even further embodiment, the AV state includes at least one of an AV speed, a proximity to an obstacle, an AV orientation, an AV heading, an AV altitude, and an AV location, wherein an obstacle includes the target. In a further embodiment, the AV trajectory includes at least one of a desired AV state and a rate of change in the AV state.

FIGURES

References to the following drawings are for illustrative purposes and not for limiting purposes. The following drawings describe one or more illustrative embodiments.

Figure 12:
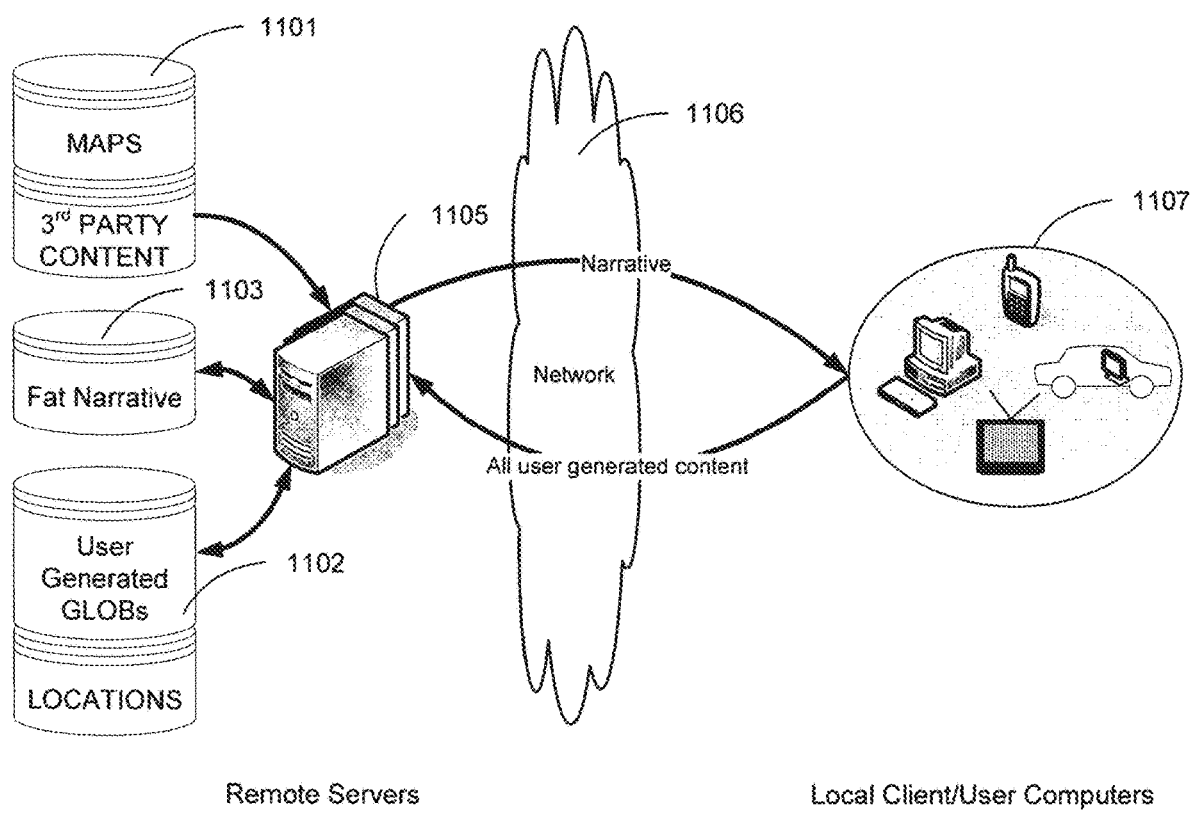

FIG. 12 presents an illustrative system architecture with fat servers and thin clients.

Figure 13:
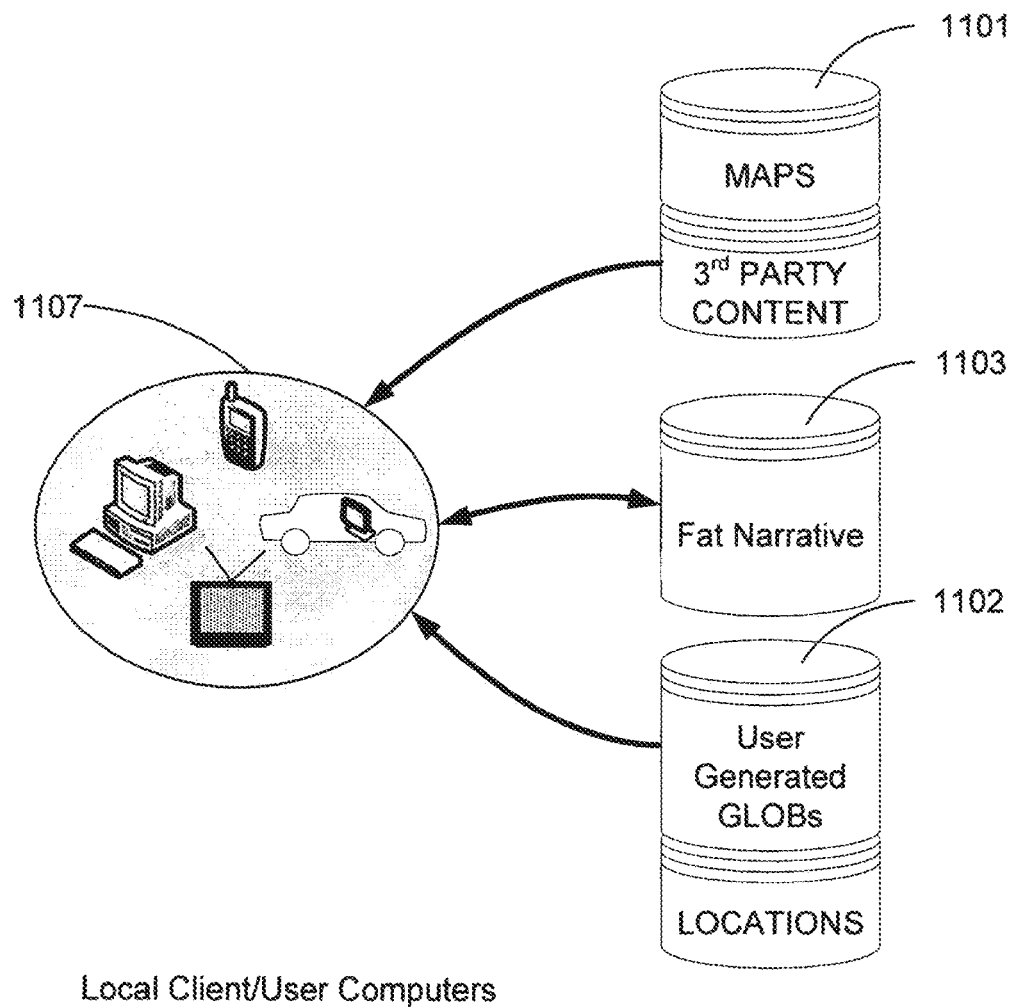

FIG. 13 presents an illustrative system architecture with no remote servers.

Figure 14:
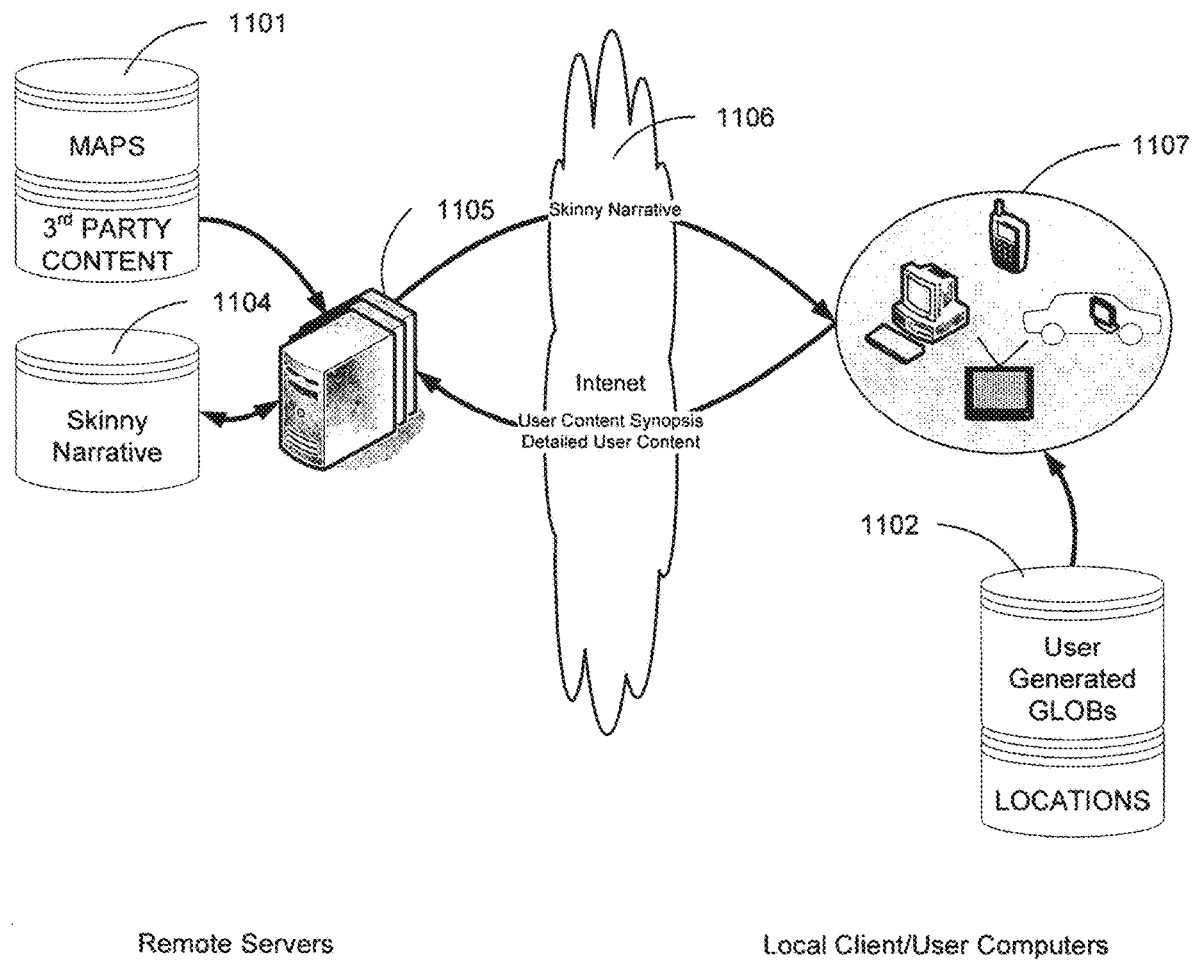

FIG. 14 presents an illustrative system architecture with remote servers that generate skinny Chronicles or Narratives.

Figure 15:
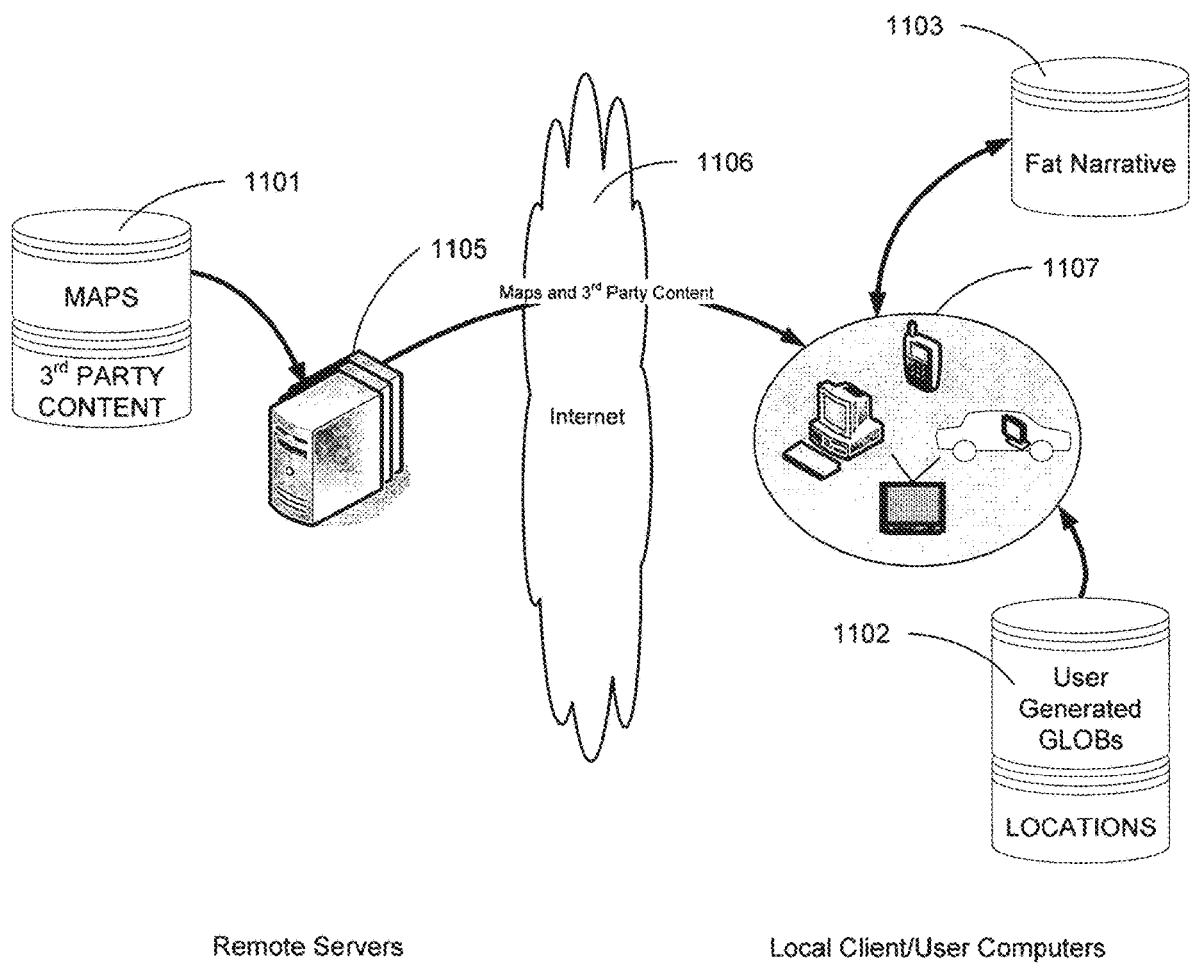

FIG. 15 presents an illustrative system architecture with remote servers and clients generating the Chronicle or Narratives.

Figure 16:
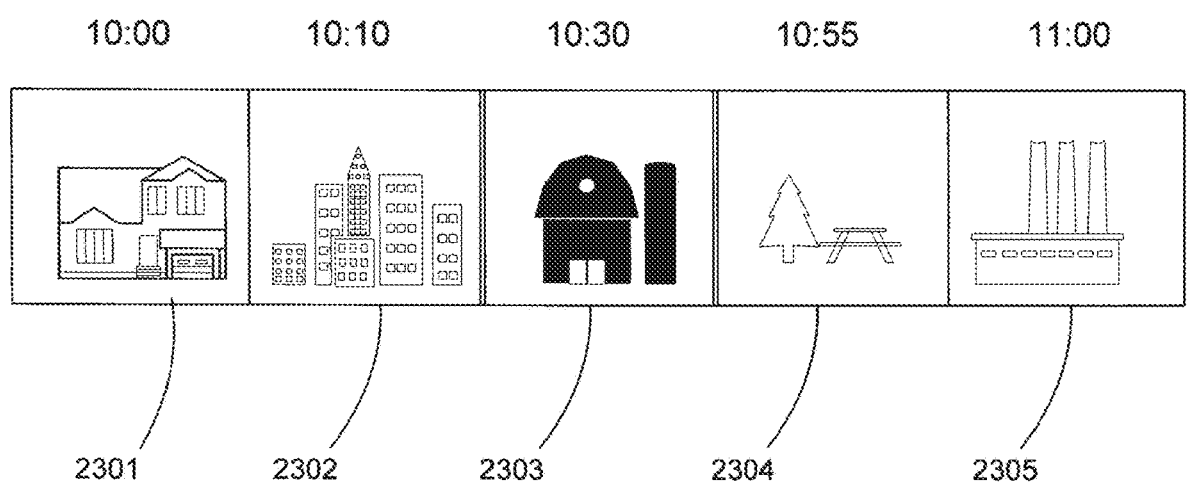

FIG. 16 provides an illustrative depiction of a time stamped photographs.

Figure 17:
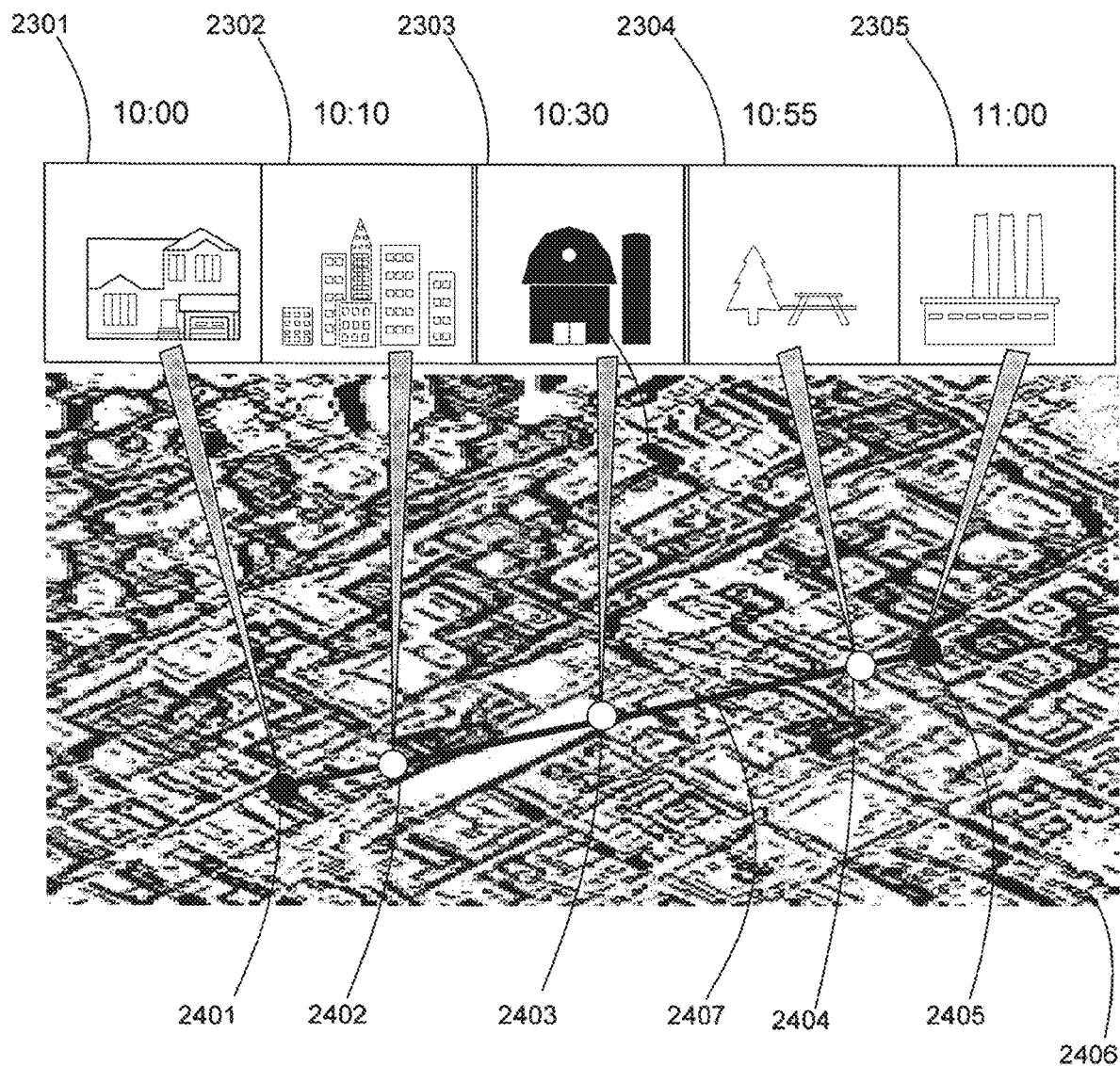

FIG. 17 illustrates the explicit and implicit geocoding of photographs.

Figure 18:
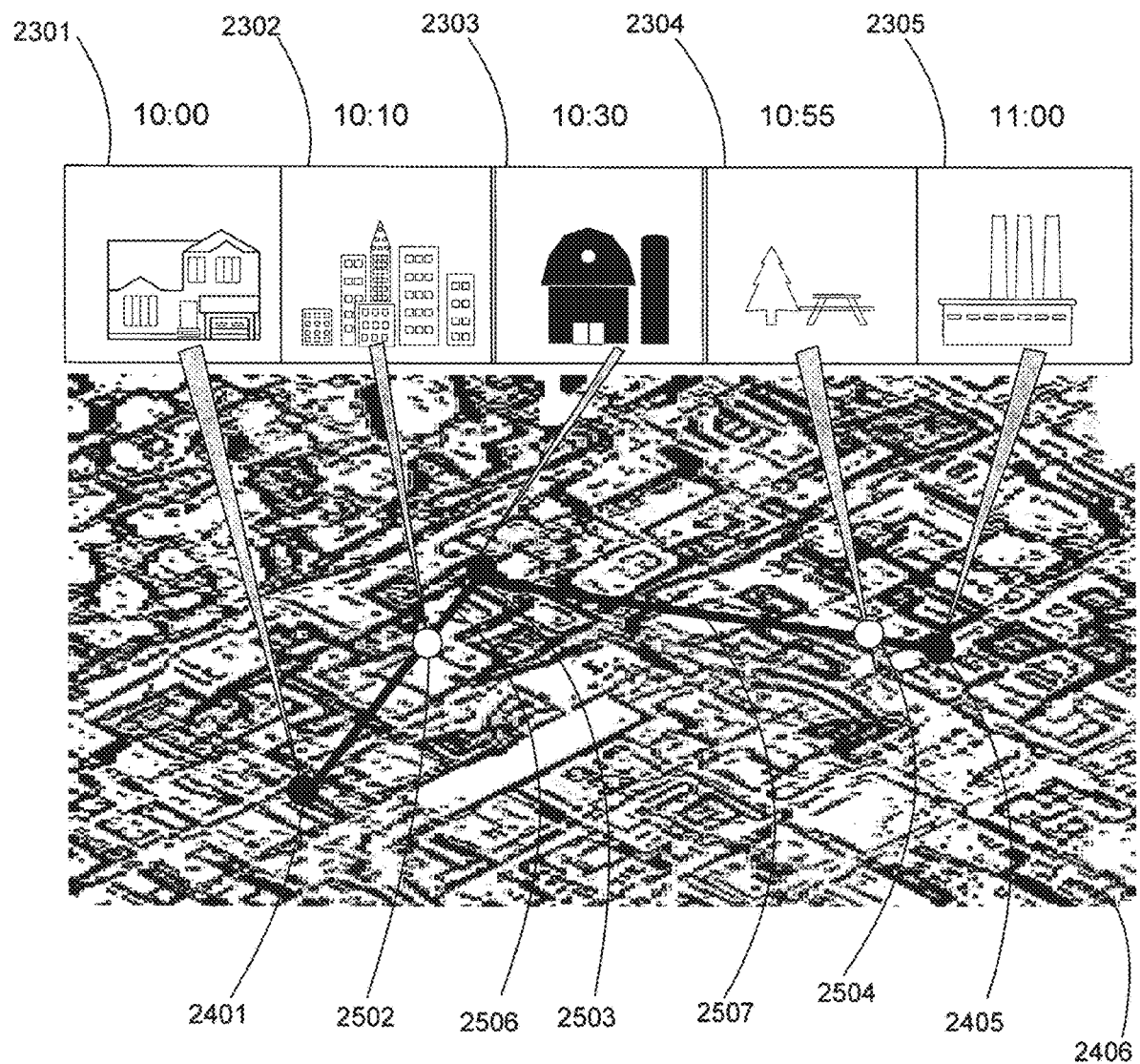

FIG. 18 further illustrates explicit and implicit geocoding of photographs.

Figure 19:
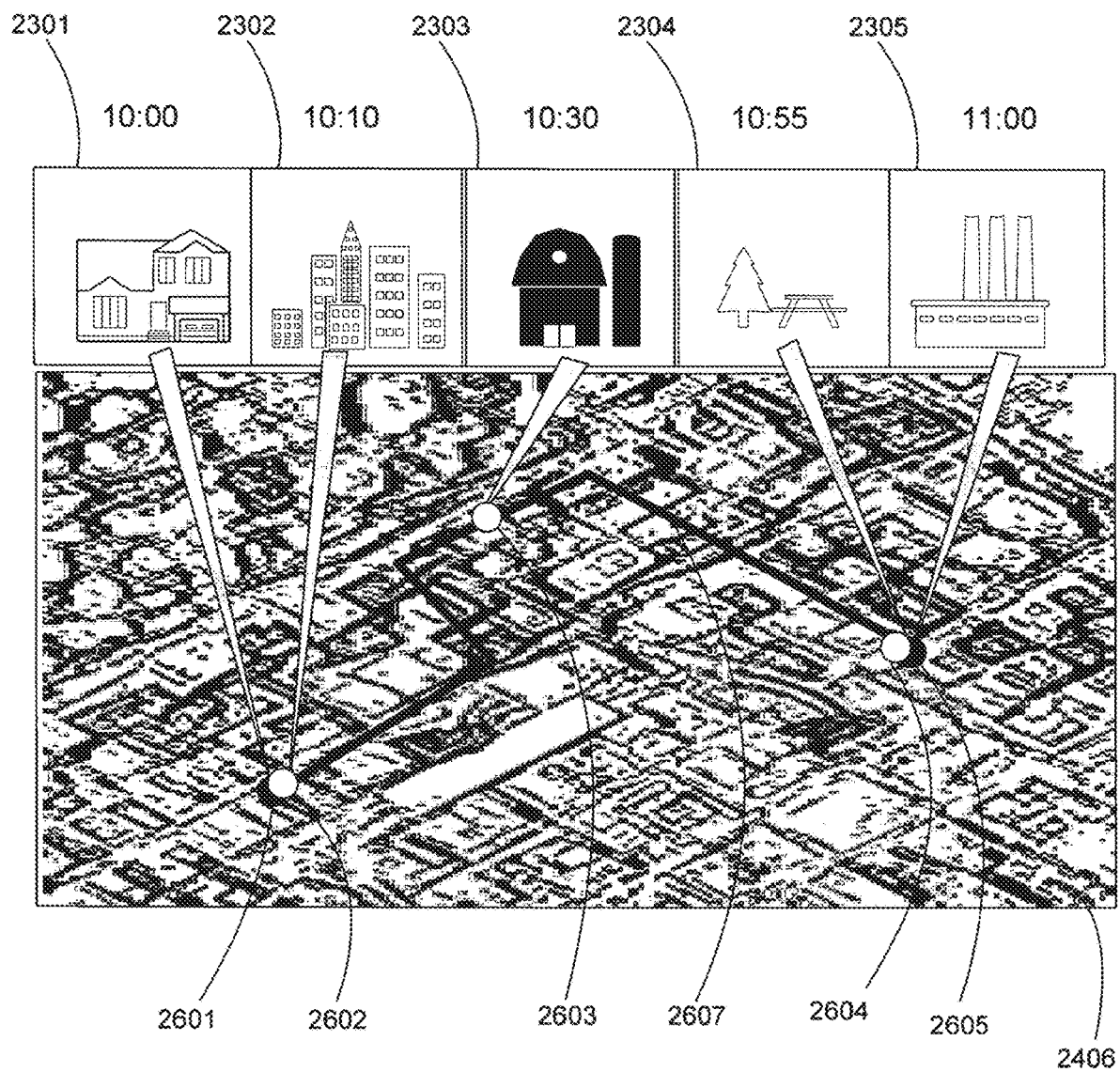

FIG. 19 provides an illustrative example of implicit geocoding based on different path and distribution rules.

Figure 20:
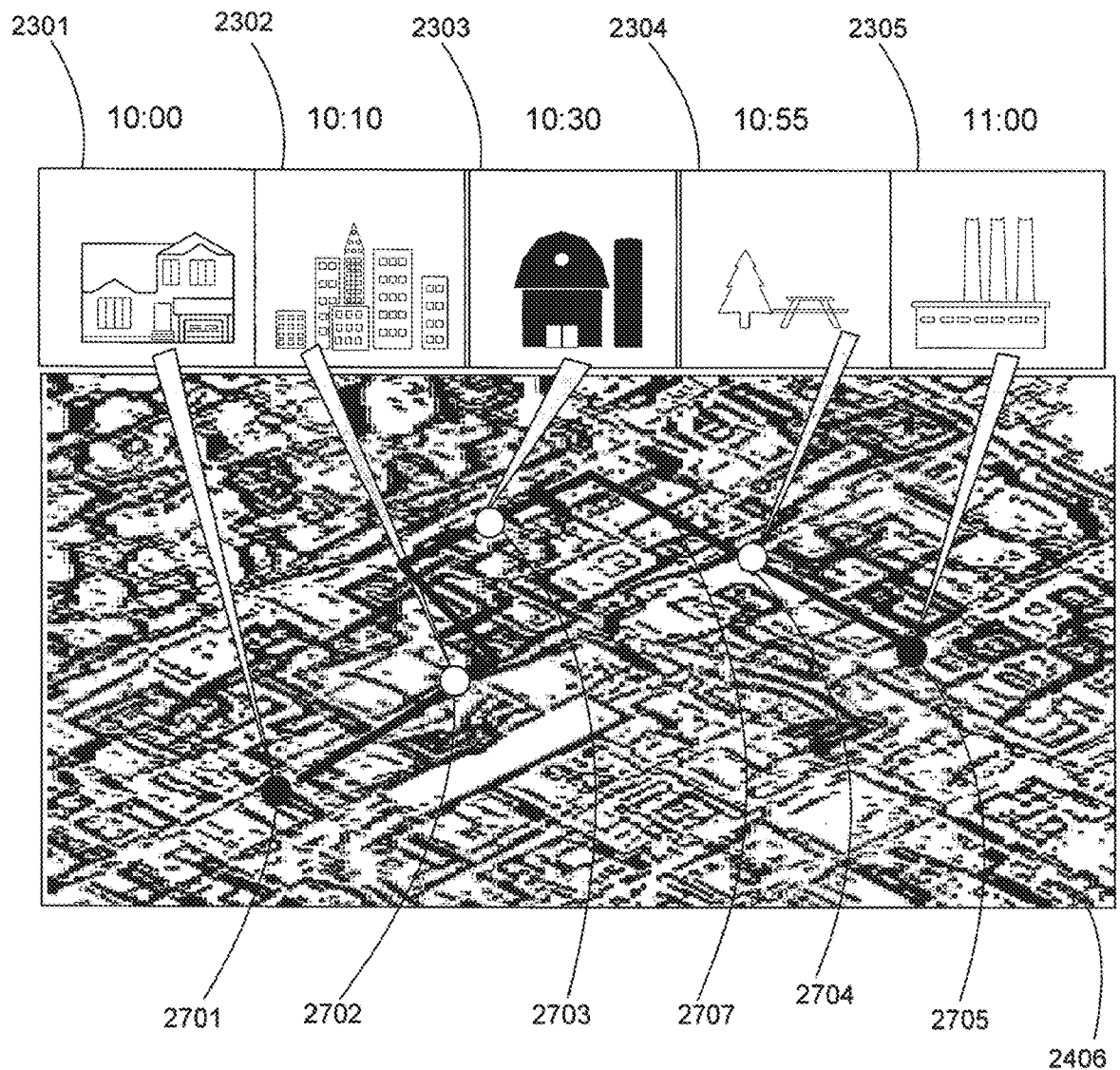

FIG. 20 provides an illustrative example of implicit geocoding of a user defined photograph sequence with no time stamps.

Figure 21:
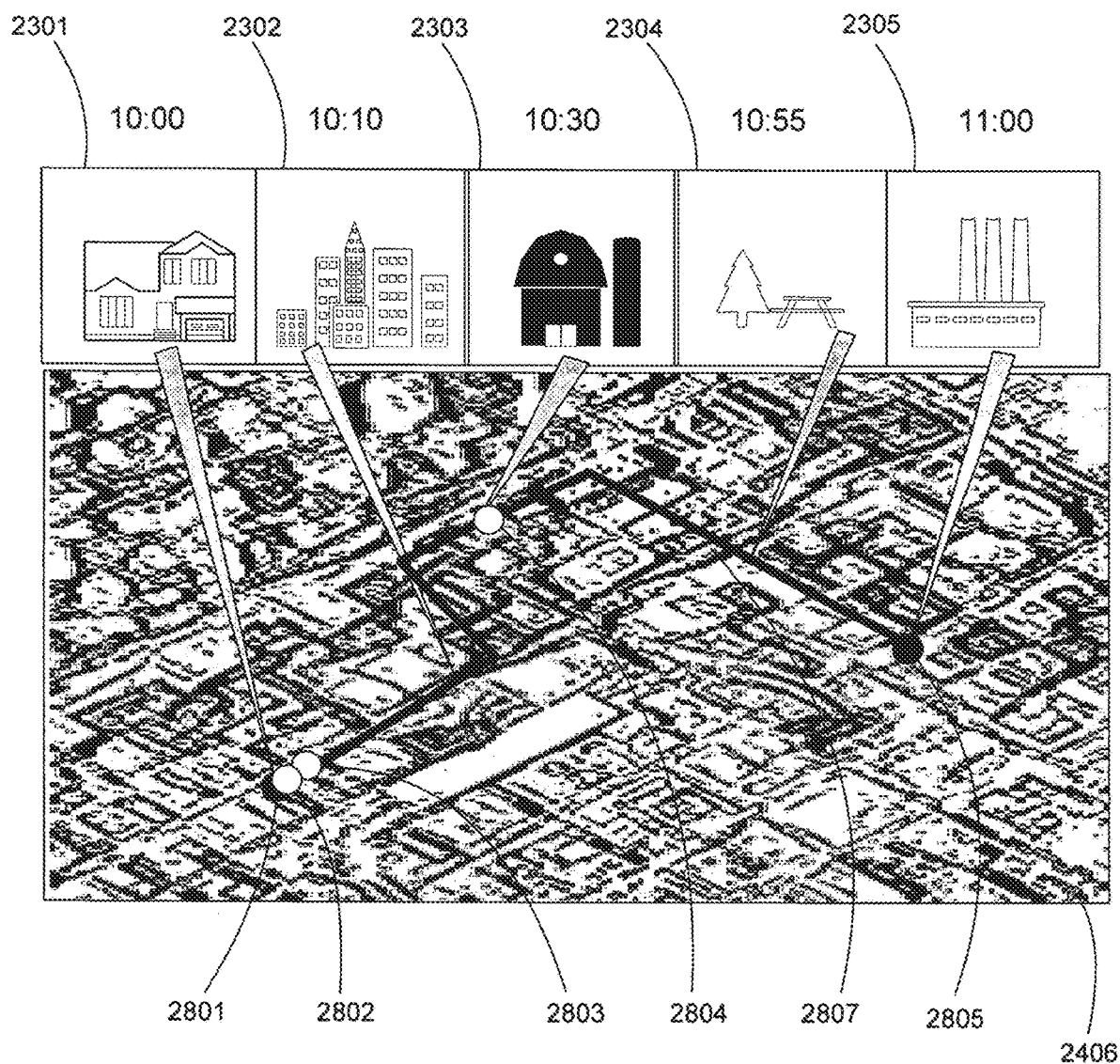

FIG. 21 provides an illustrative example of implicit geocoding of a user defined photograph sequence with no time stamps and additional relationship rules.

Figure 22:
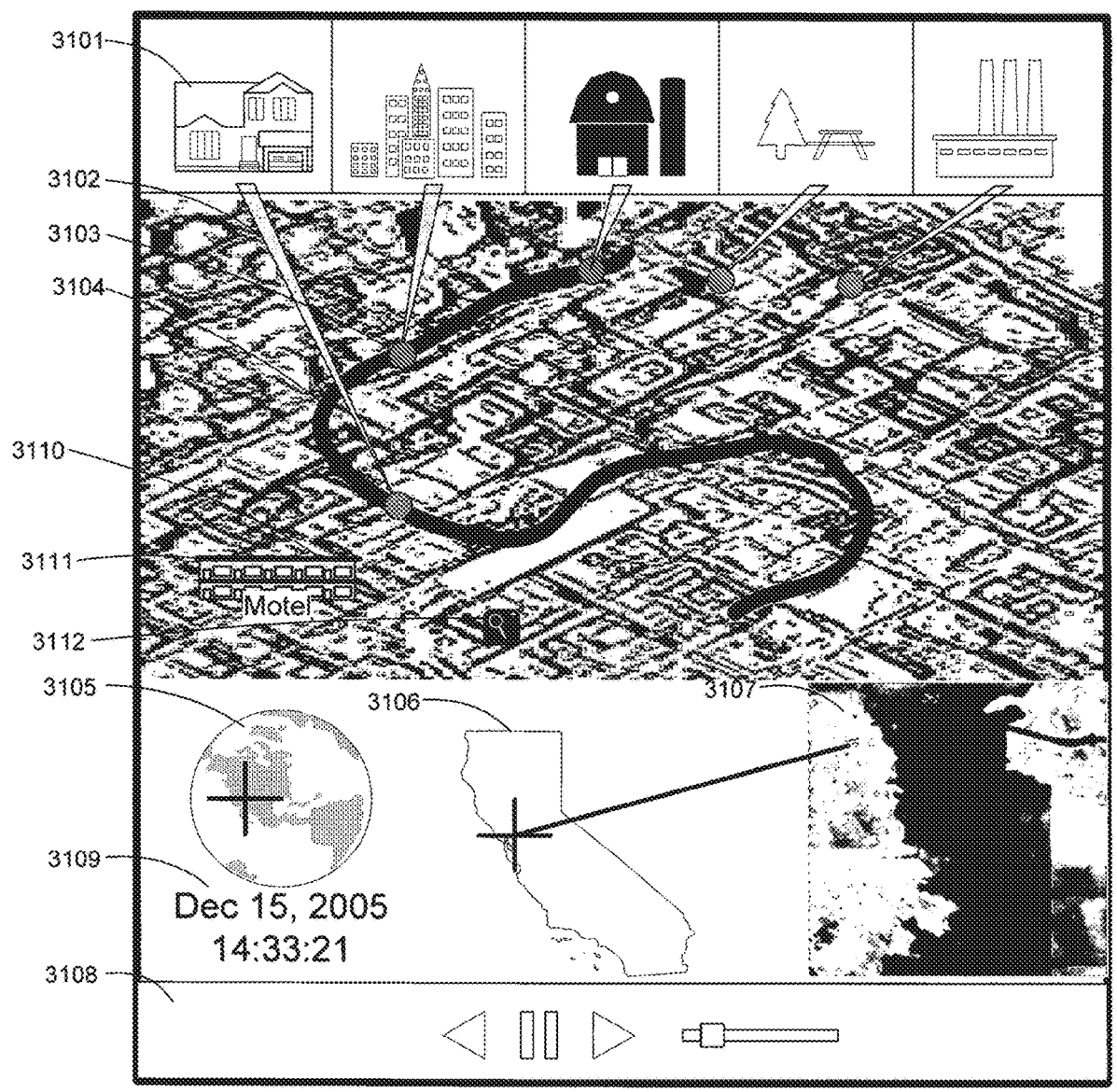

FIG. 22 provides an illustrative Virtual Tour.

Figure 23:
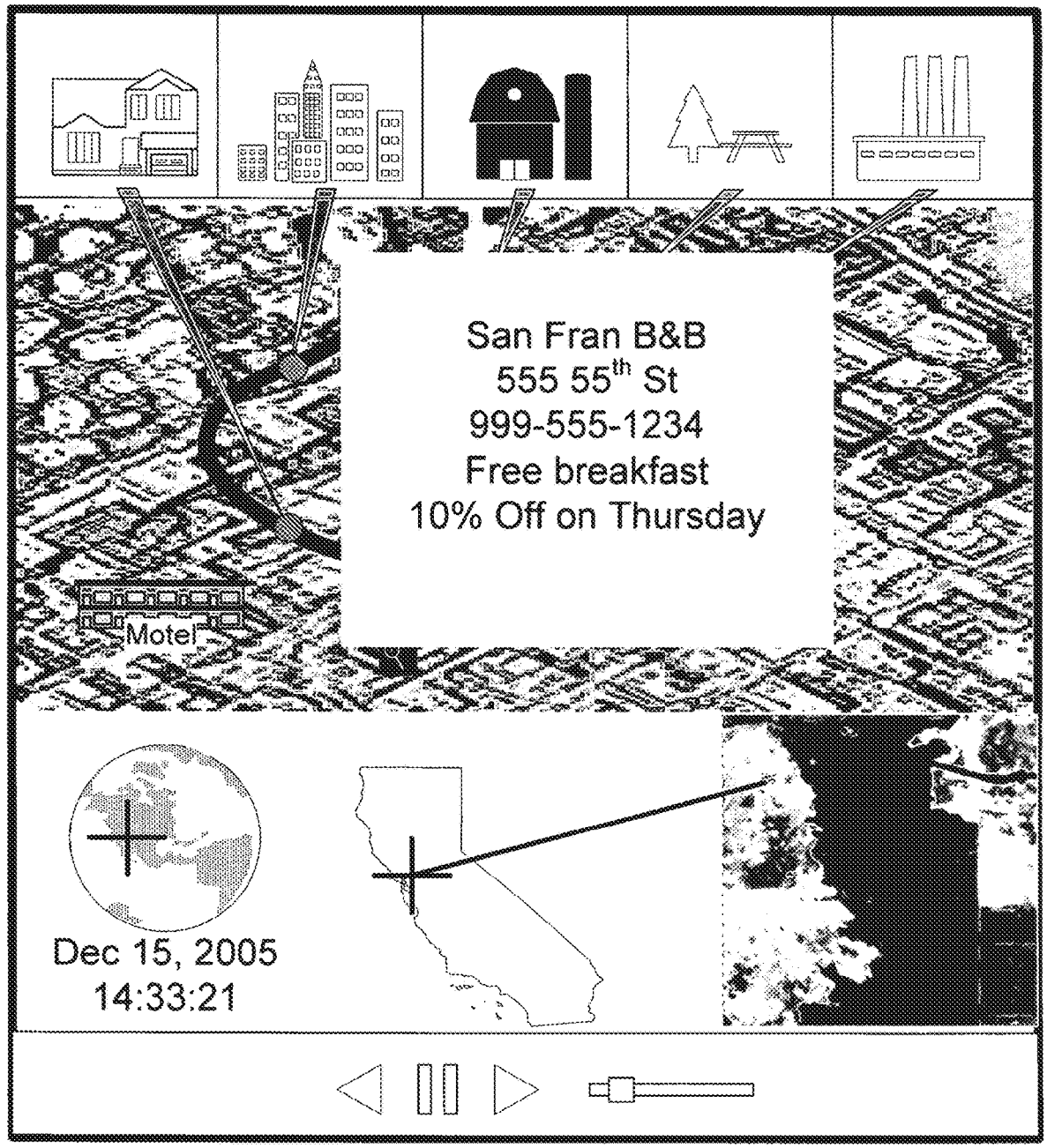

FIG. 23 shows an illustrative display with detail for a selected Point of Interest.

Figure 24:
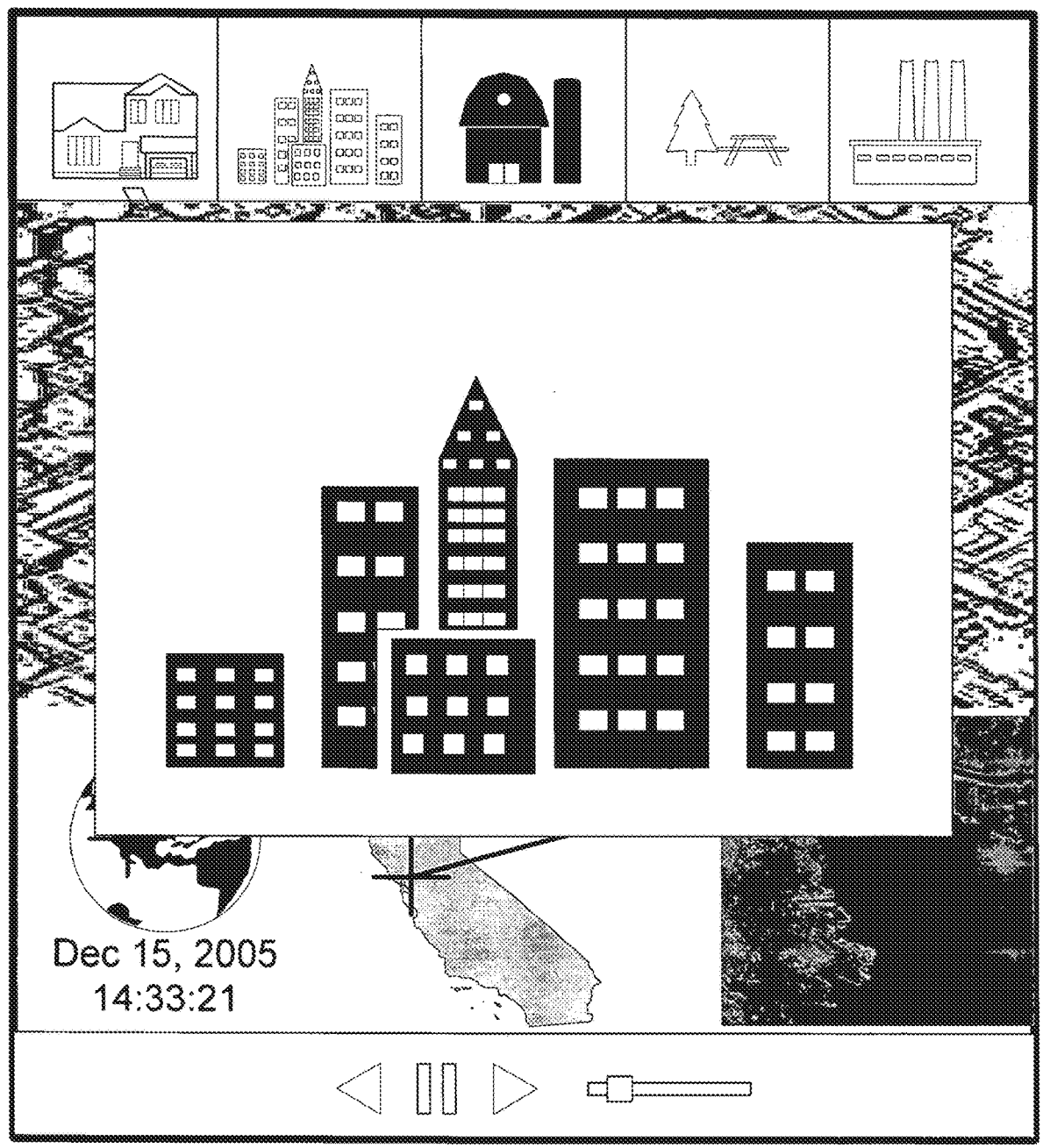

FIG. 24 shows an illustrative display of a selected geo-located image.

Figure 25:
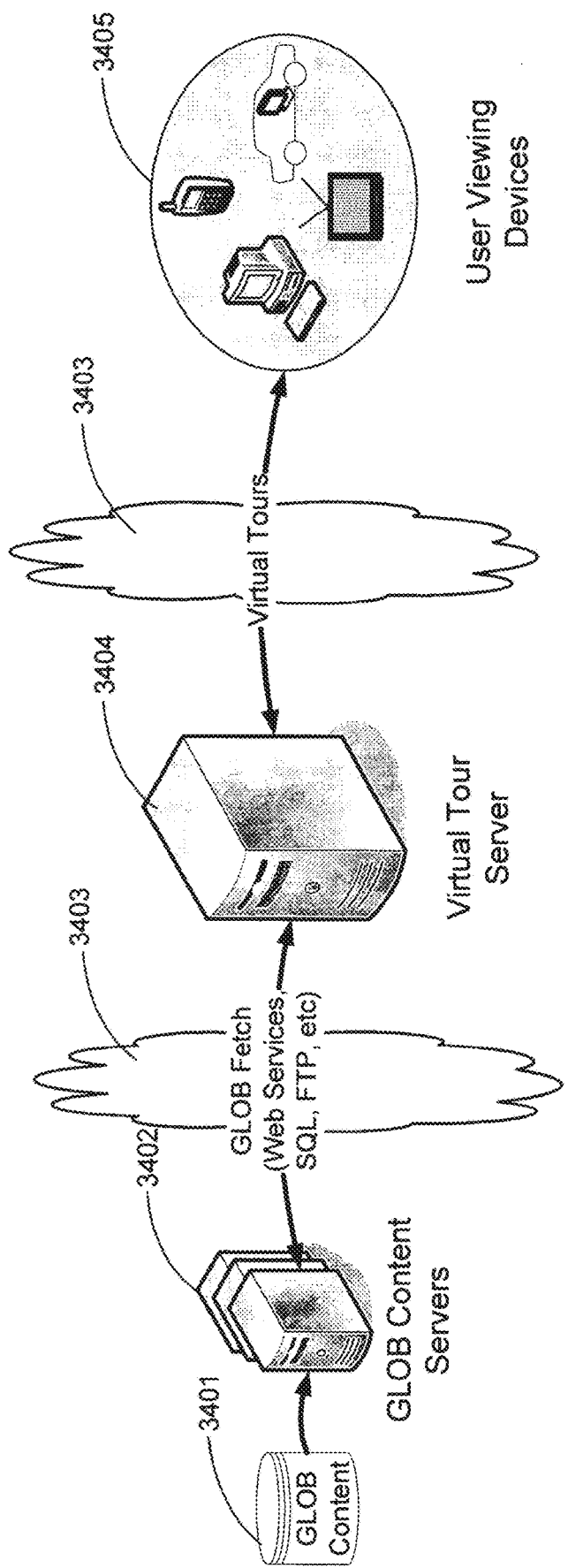

FIG. 25 presents an illustrative system architecture for an illustrative virtual tour server.

Figure 26:
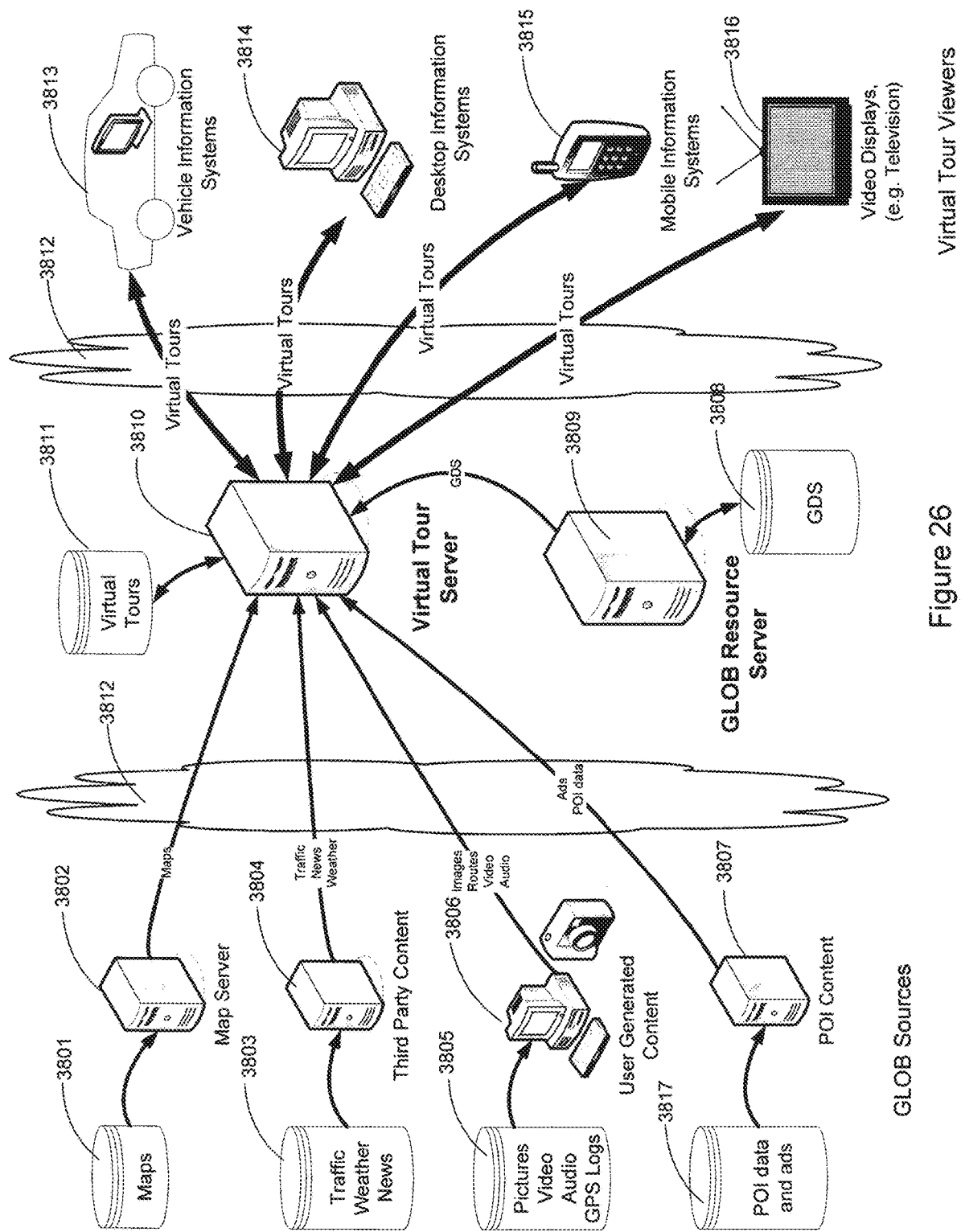

FIG. 26 presents an illustrative system architecture for a more detailed virtual tour server architecture.

Figure 27:
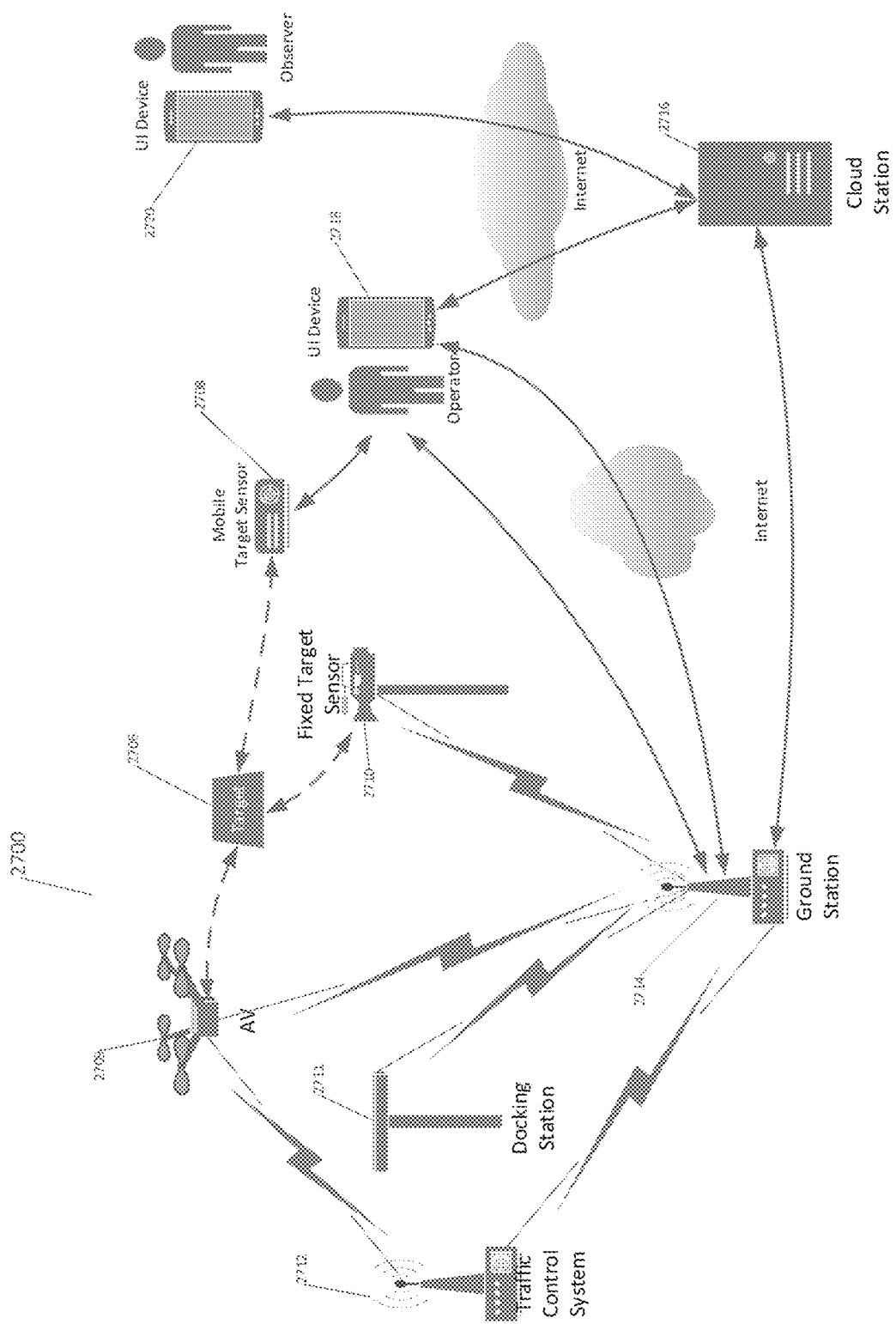

FIG. 27 illustrates, in accordance with various embodiments, a system for collecting object data.

Figure 28:
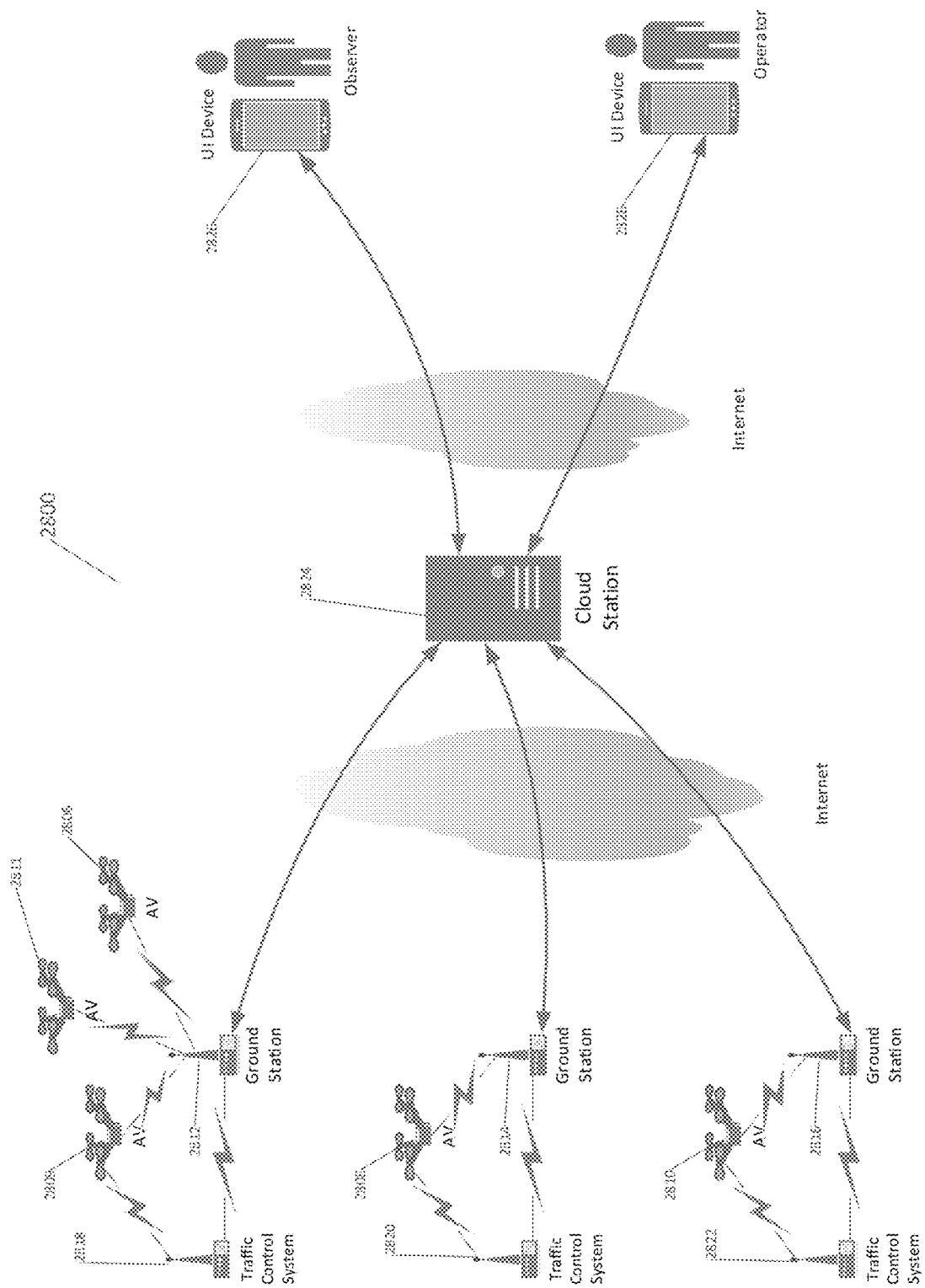

FIG. 28 illustrates, in accordance with various embodiments, a system for collecting object data.

Figure 29:
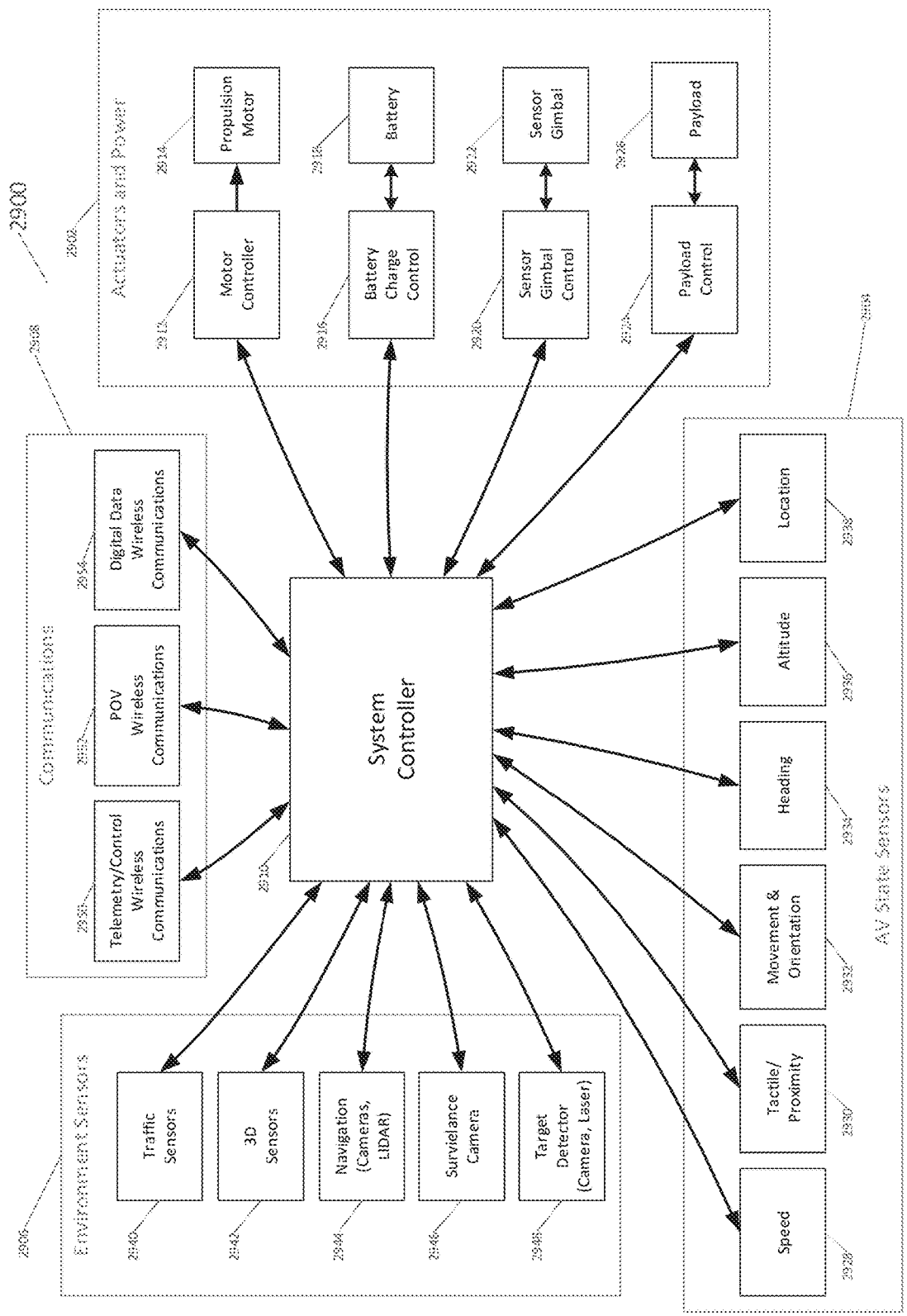

FIG. 29 illustrates, in accordance with various embodiments, a block diagram for an example automated vehicle.

Figure 30:
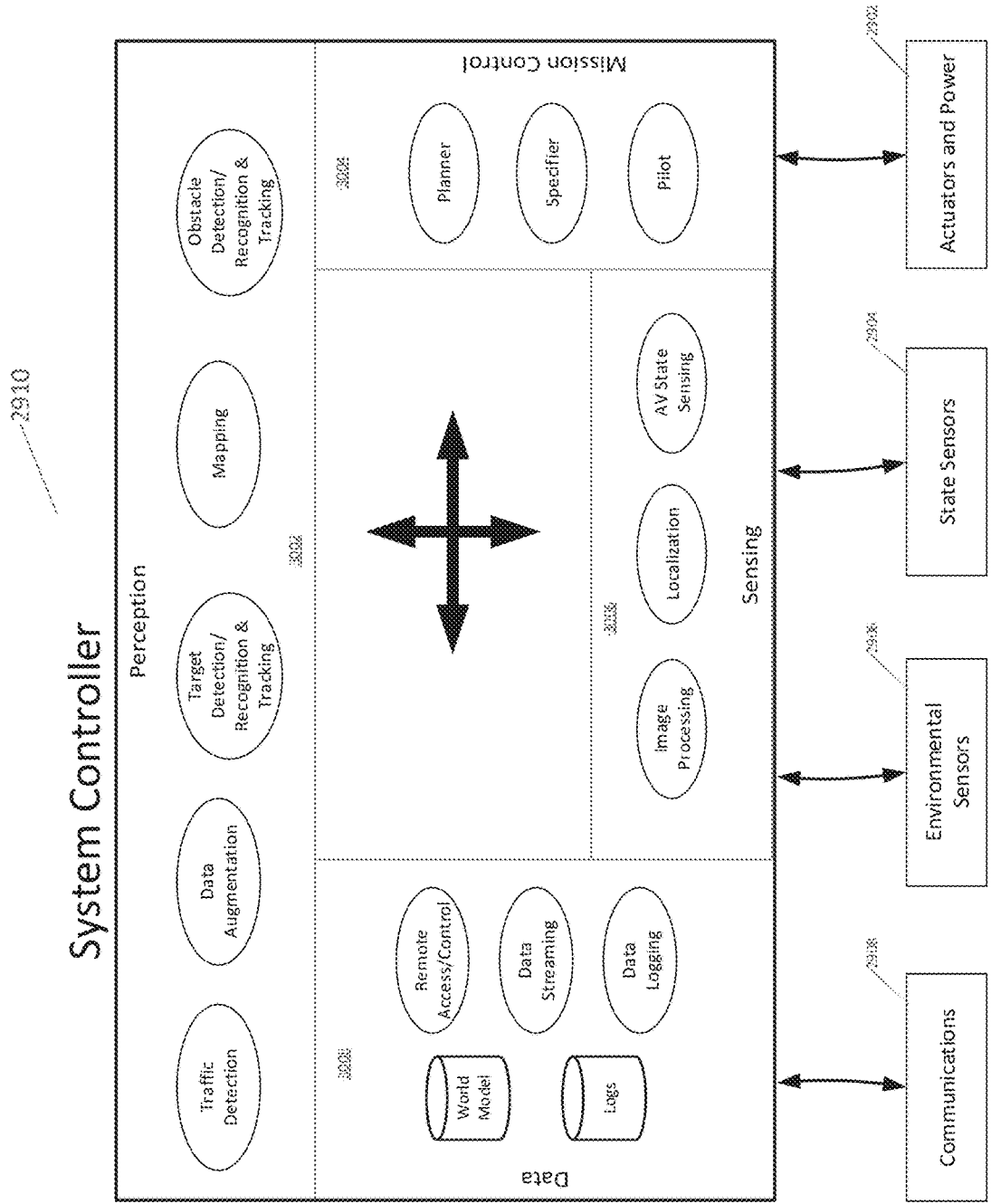

FIG. 30 illustrates, in accordance with various embodiments, a block diagram for an example system controller of an AV.

Figure 31:
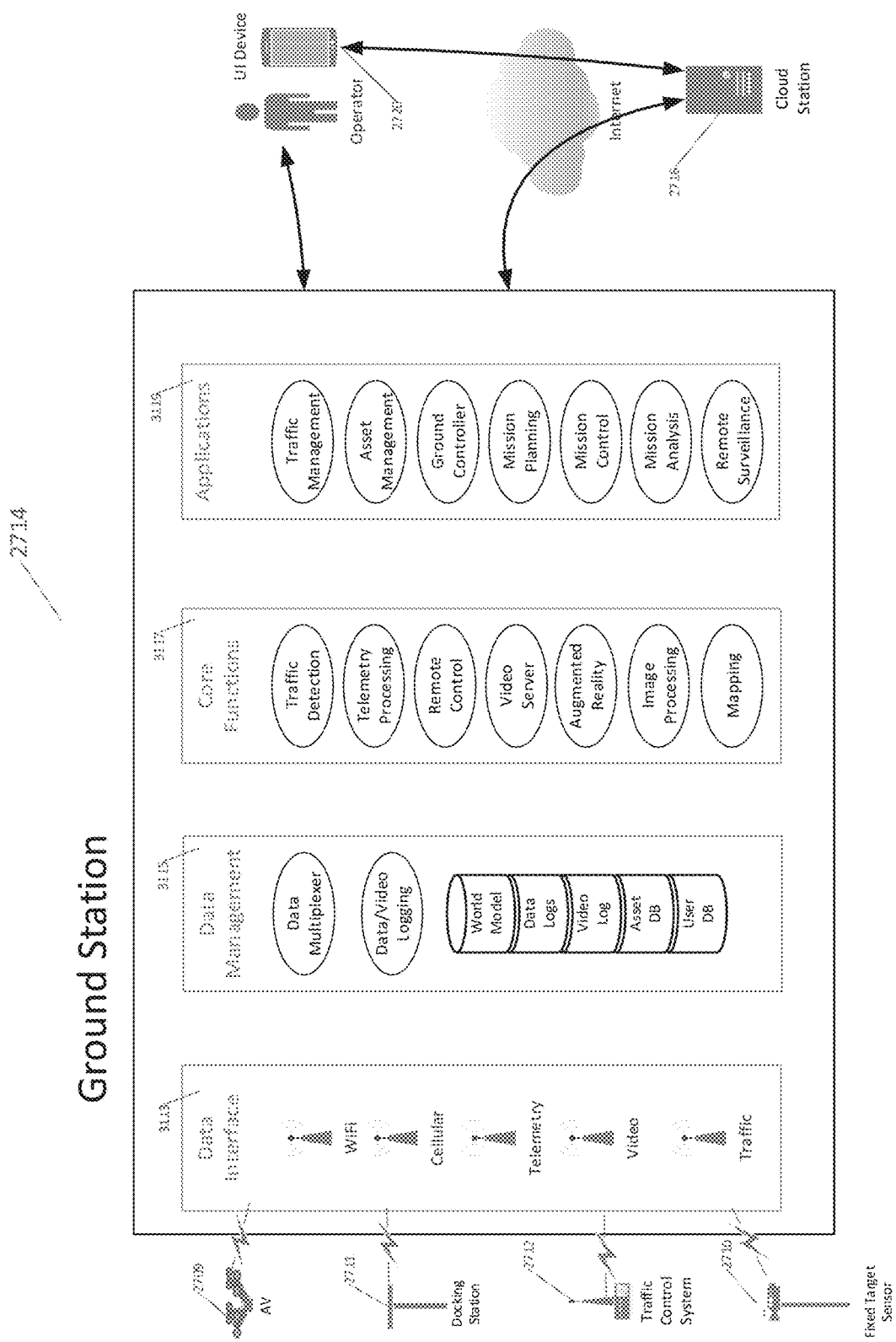

FIG. 31 illustrates, in accordance with various embodiments, a block diagram for an example ground station.

Figure 32:
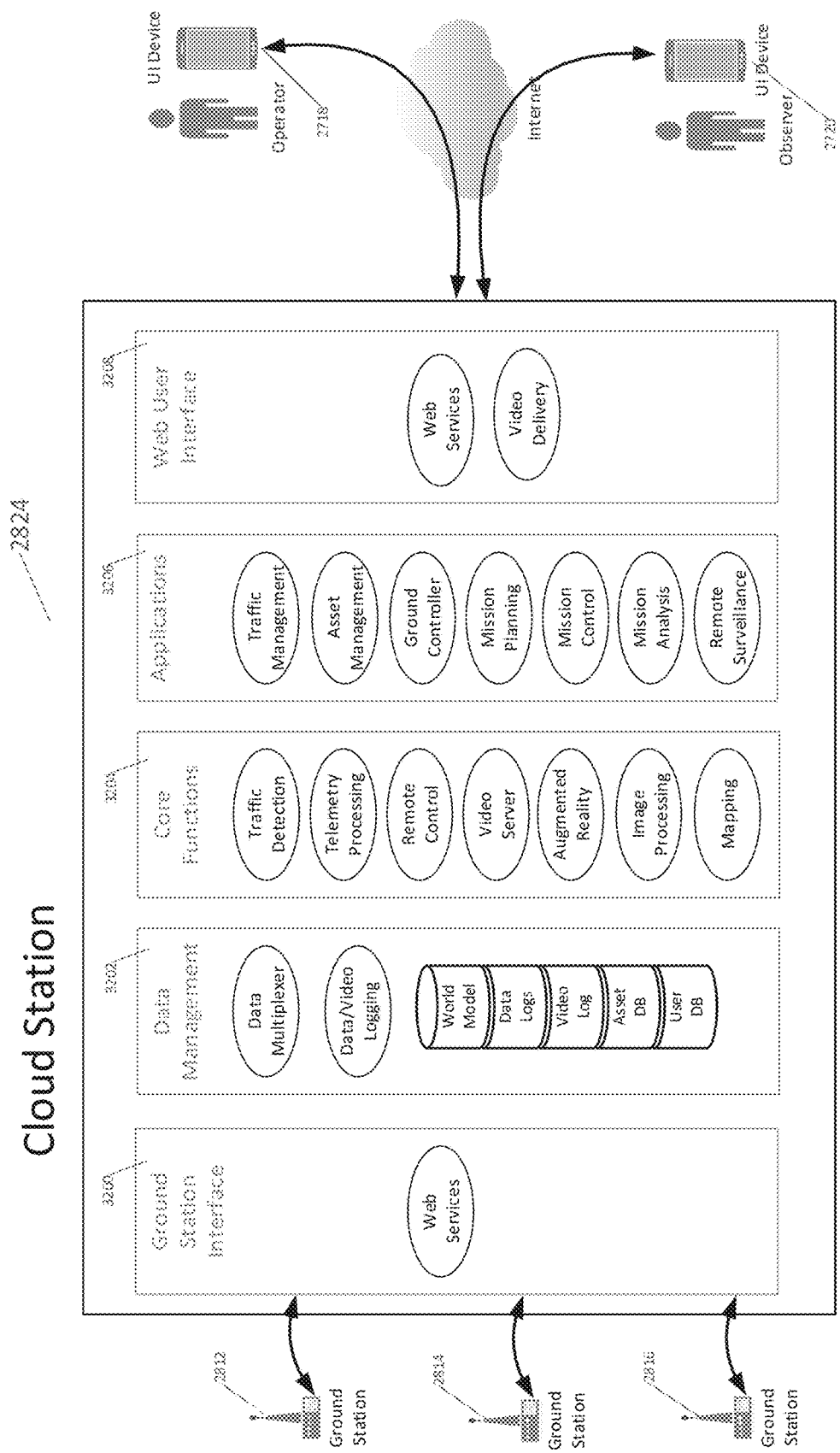

FIG. 32 illustrates, in accordance with various embodiments, a block diagram for an example cloud station.

Figure 33:
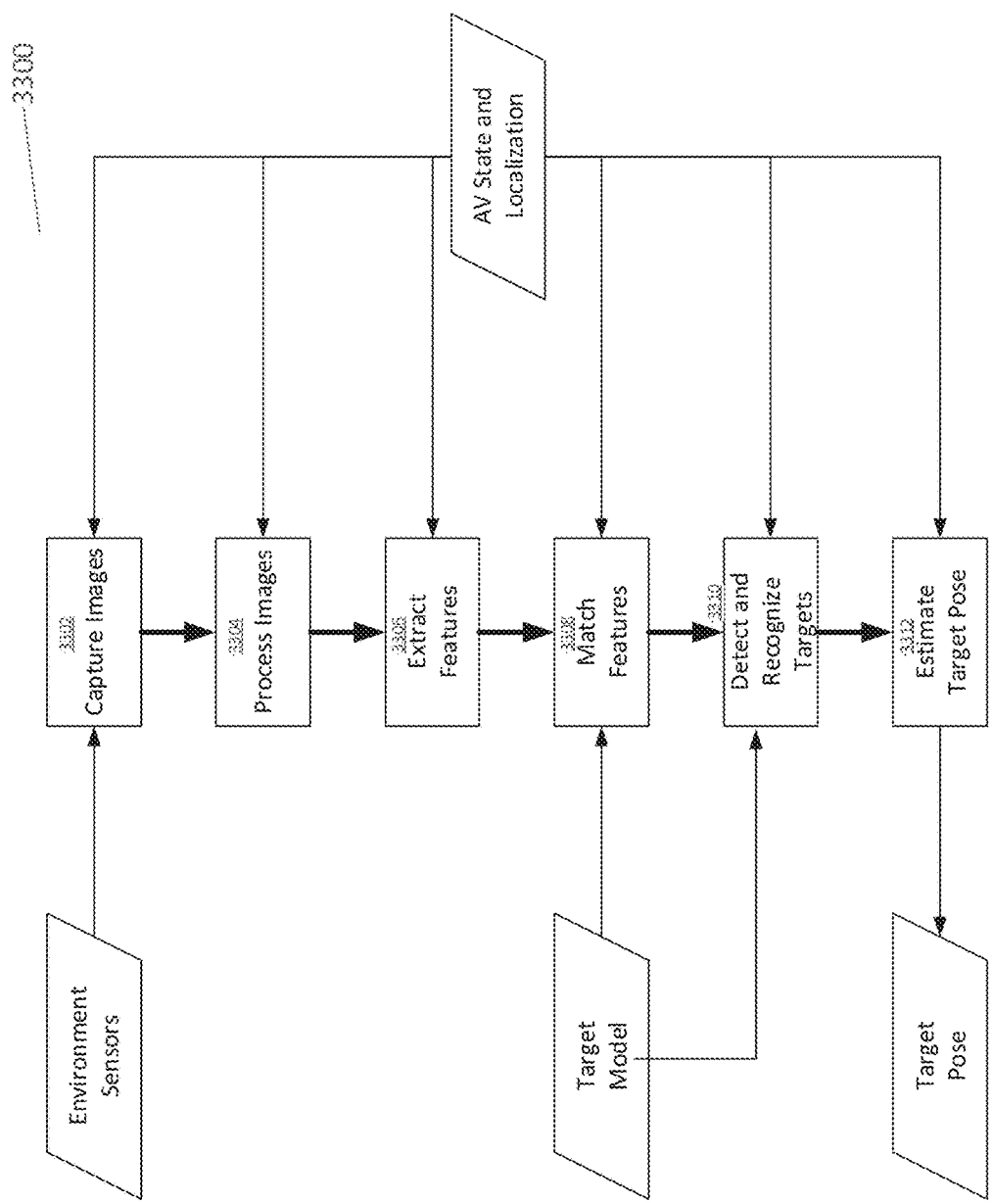

FIG. 33 illustrates, in accordance with various embodiments, a process for target detection and recognition.

Figure 34:
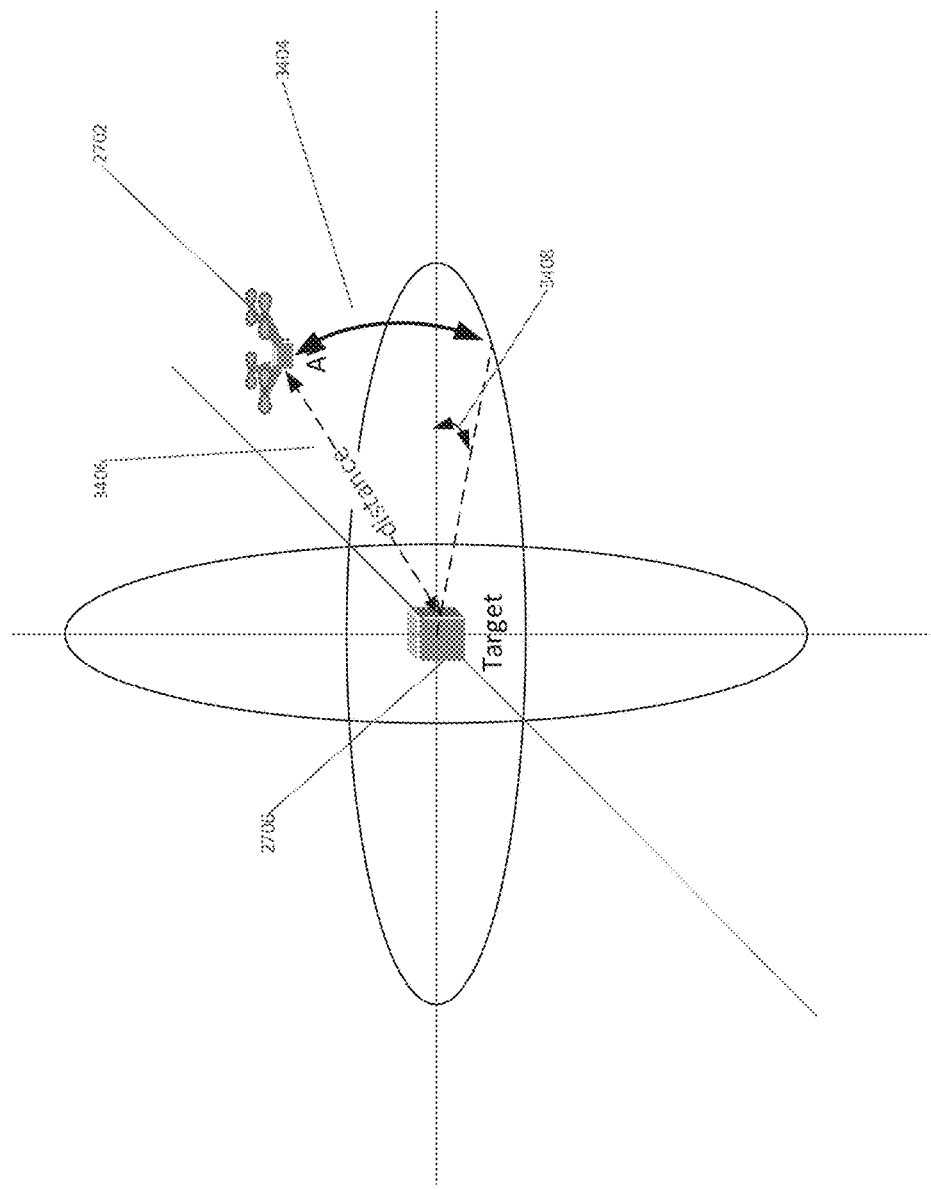

FIG. 34 illustrates, in accordance with various embodiments, an example automated vehicle and target.

Figure 35:
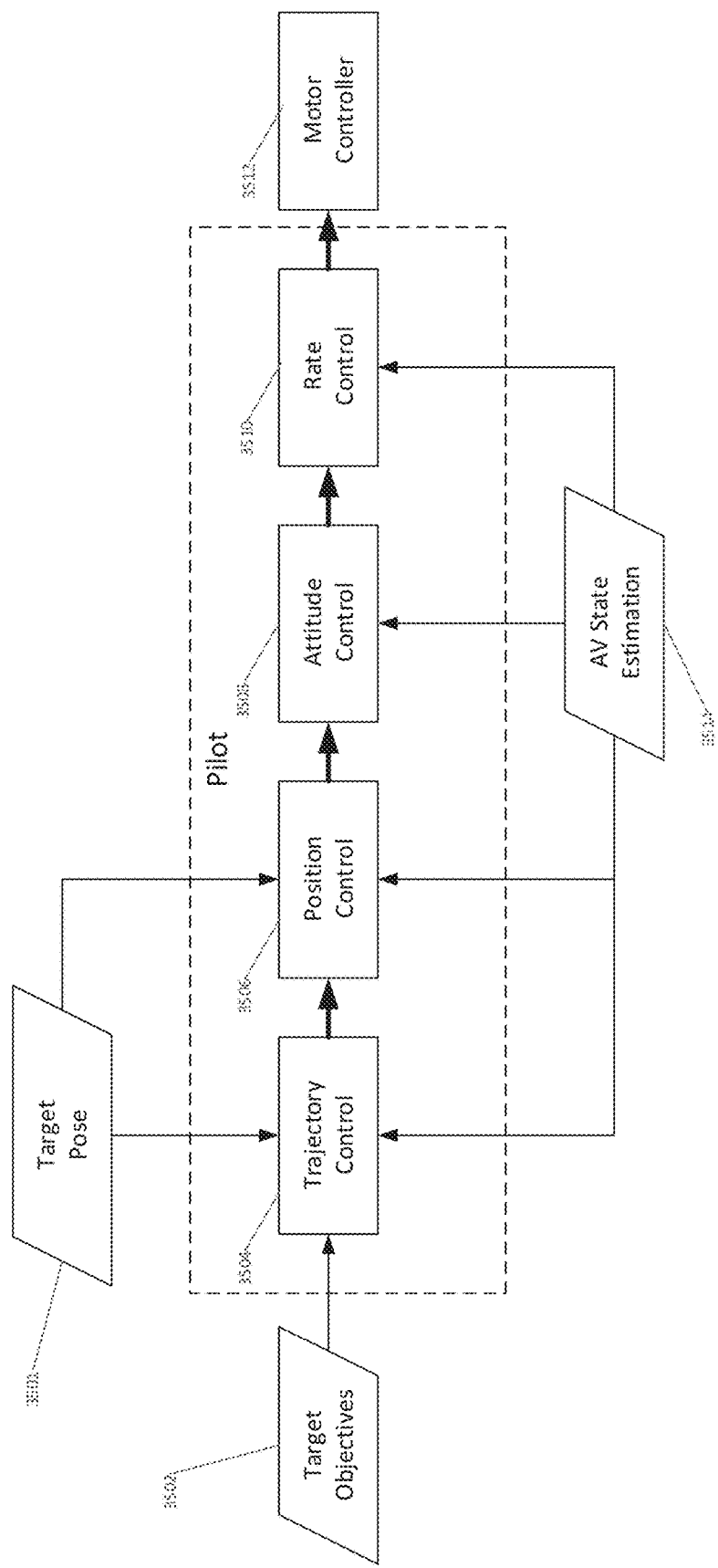

FIG. 35 illustrates, in accordance with various embodiments, a control system diagram for a pilot submodule of a mission control module.

Figure 36:
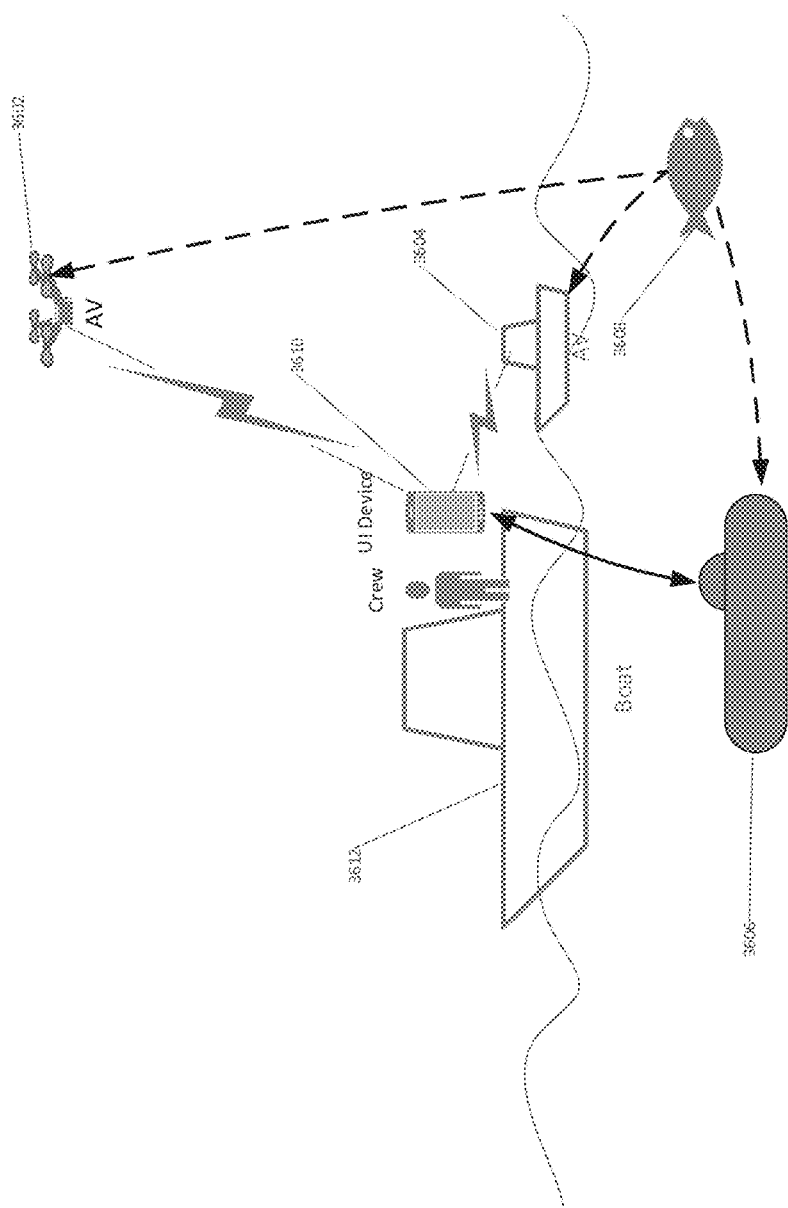

FIG. 36 illustrates, in accordance with various embodiments, a system comprising a plurality of automated vehicles configured to detect one or more targets.

Figure 37:
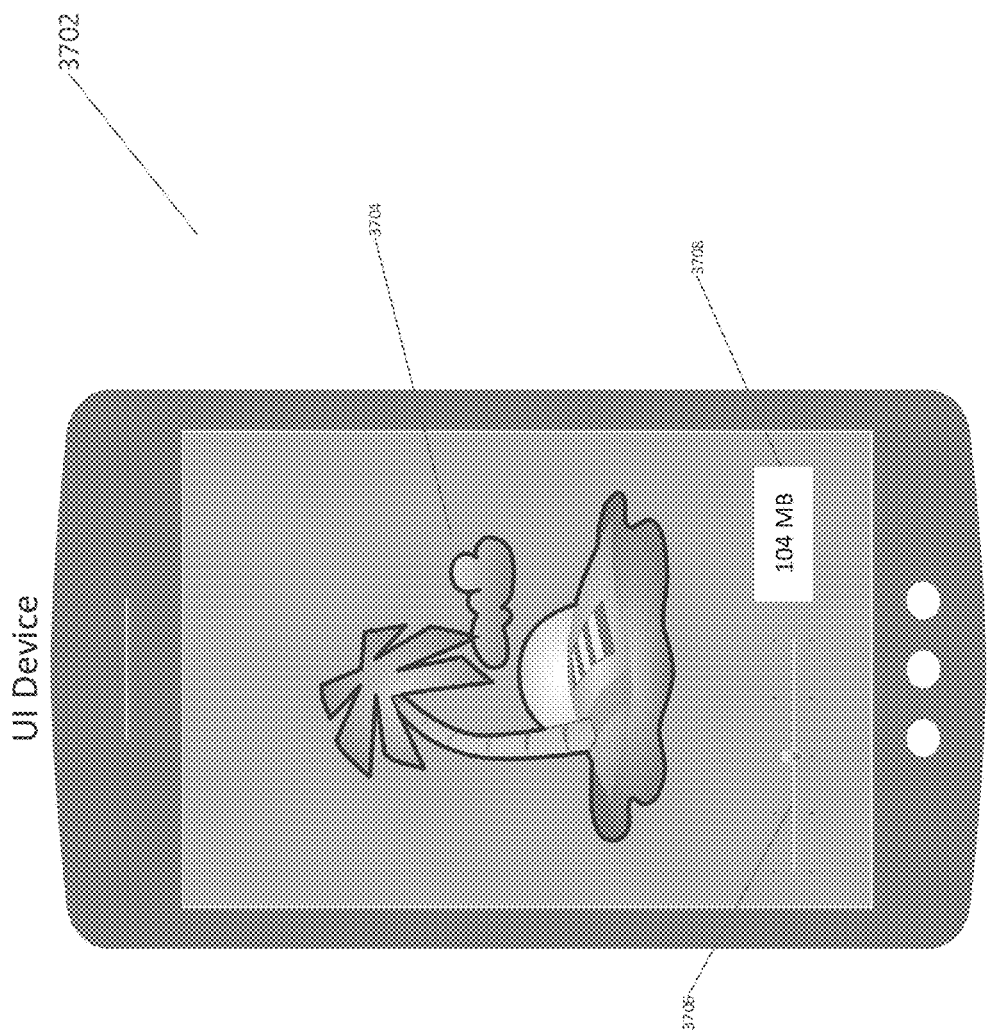

FIG. 37 illustrates, in accordance with various embodiments, a device having a user interface configured to receive a data transfer speed input.

Figure 38:
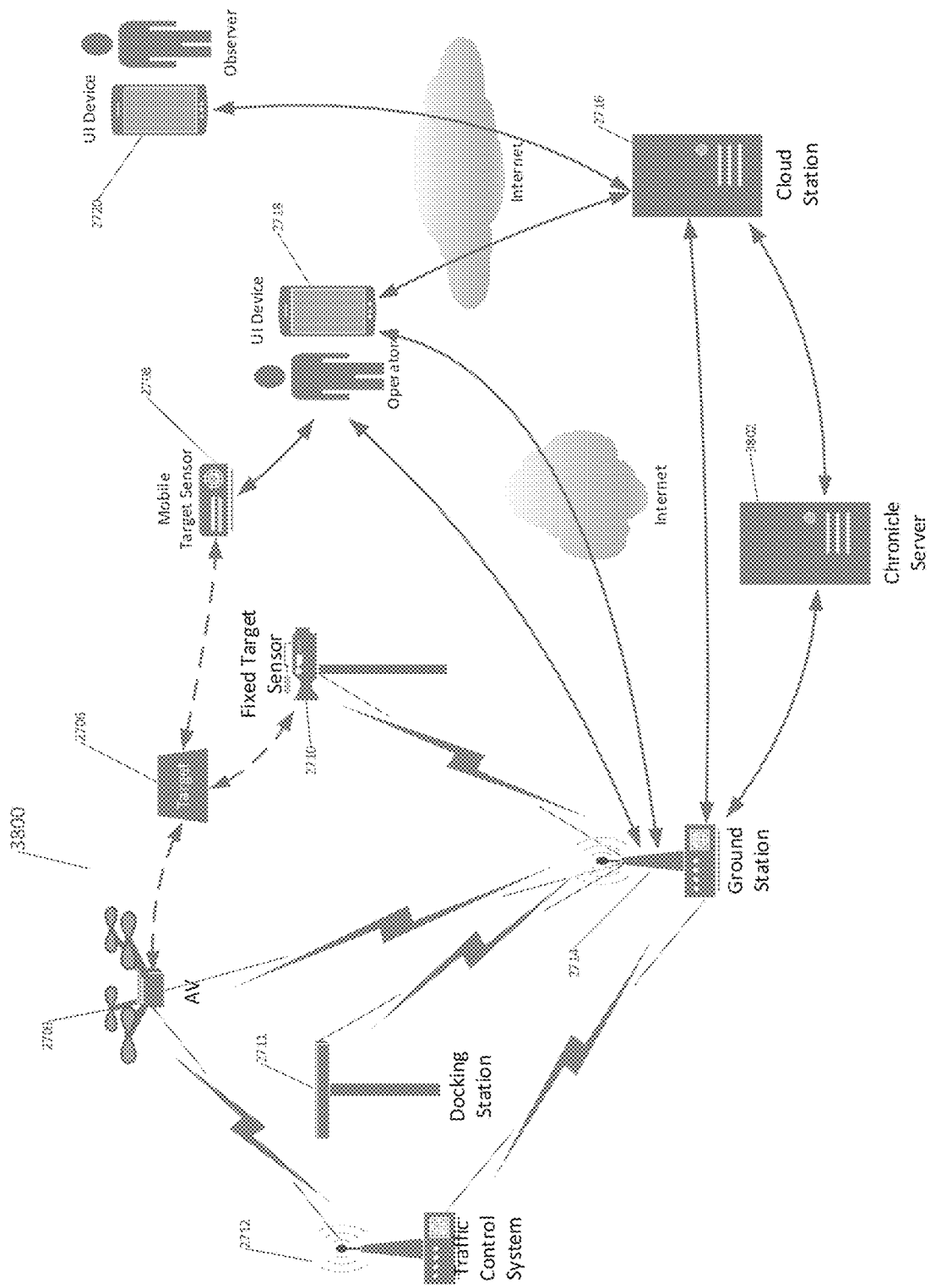

FIG. 38 illustrates, in accordance with various embodiments, a system for collecting and geocoding object data comprising a chronicle server.

Figure 39:
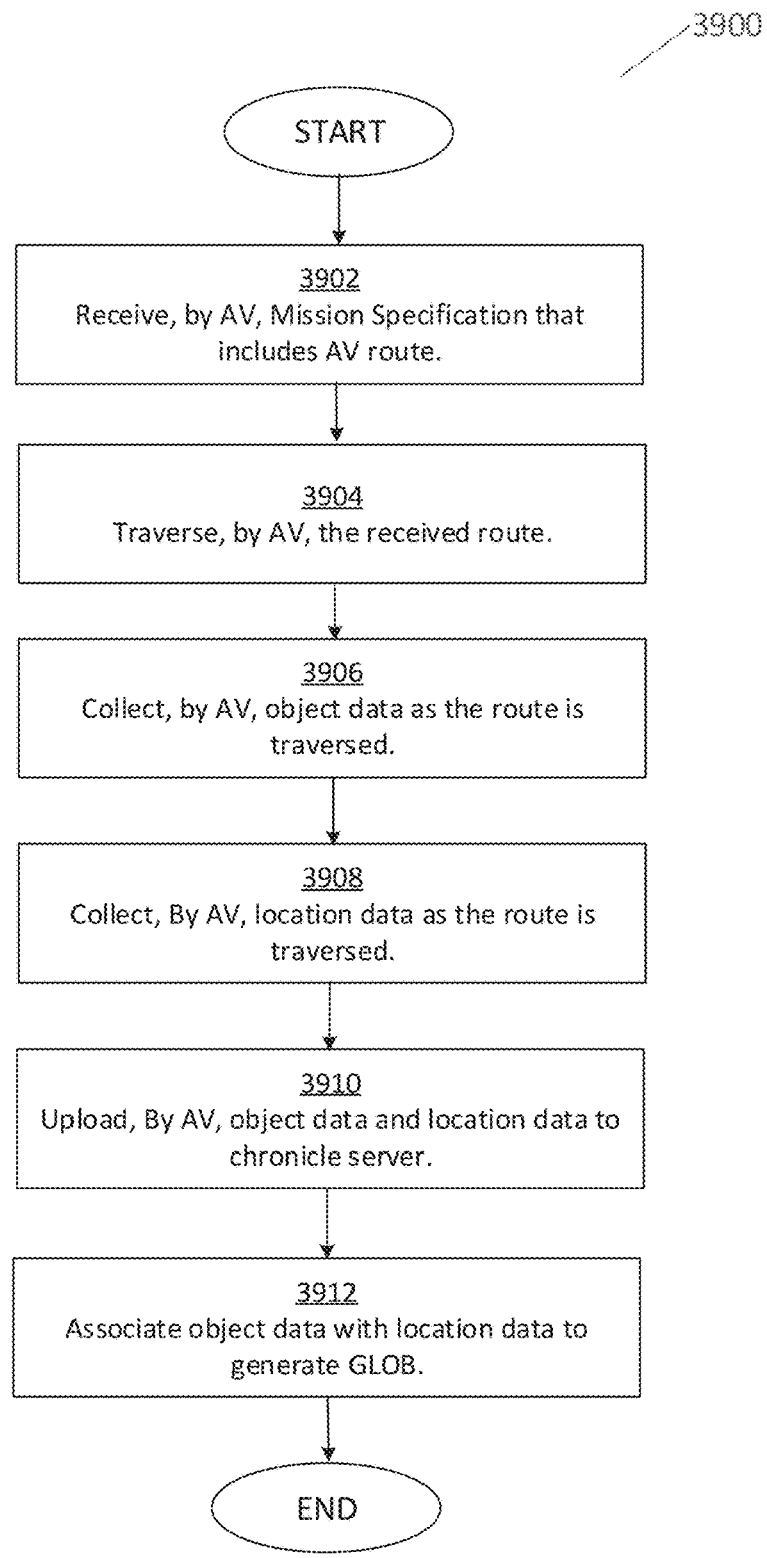

FIG. 39 illustrates, in accordance with various embodiments, a process for collecting and geocoding object data.

Figure 40:
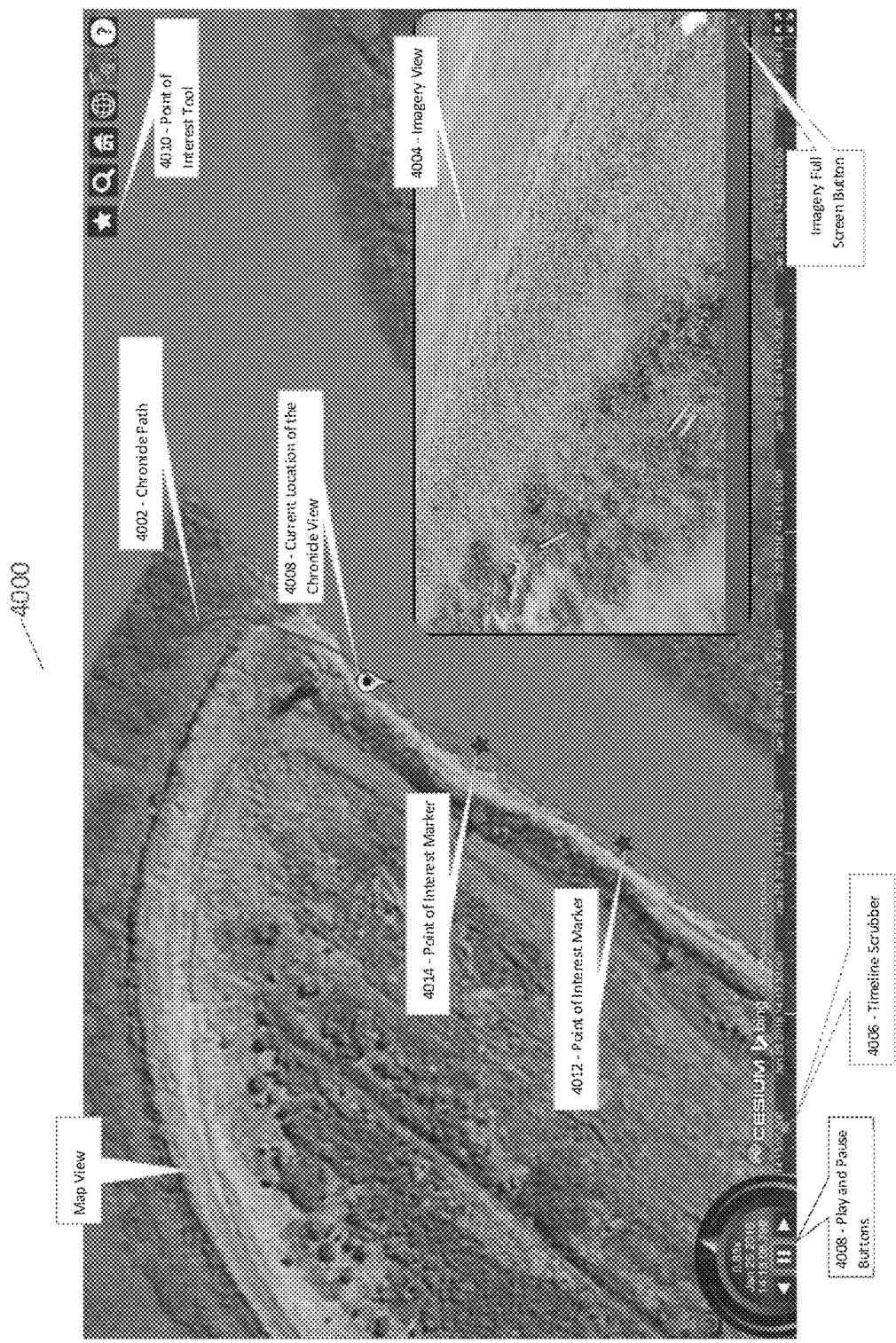

FIG. 40 illustrates, in accordance with various embodiments, a map display of a system for collecting and geocoding object data.

Figure 41:
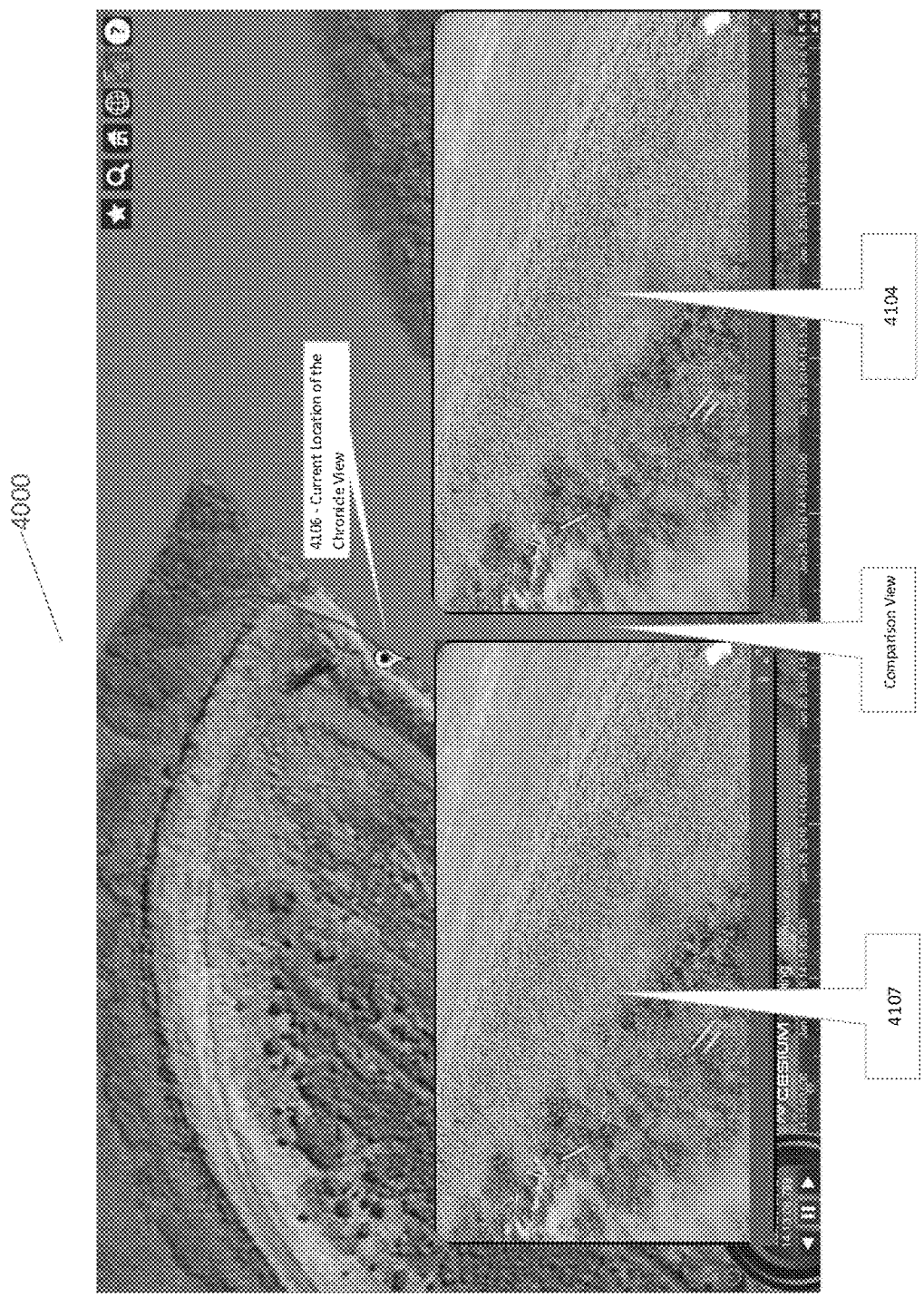

FIG. 41 illustrates, in accordance with various embodiments, a map display of a system for collecting and geocoding object data performing a comparative analysis.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems described hereinafter may vary as to configuration, as to details, and as to the functionality of system elements. Additionally, the method or methods may vary as to details, partitioning, repetition, act inclusion, order of the actions, or other variations without departing from the illustrative method disclosed herein.

As described above, geocoding an object refers to associating location or geographic information, i.e. a geocode, with the particular object. Geocoded objects are also referred to as geo-located objects.

For purposes of this patent application, an "object" may comprise content that may be geocoded or associated with a location, such as a human being, any manmade object (e.g., a structure, a building, a bridge, equipment, and the like), any natural object (e.g., a landscape feature, such as a river, a geologic formation, a forest or a tree, and the like), and the like. An object may be associated with object data or information, such as a photograph of the object, a picture of the object, audio data associated with the object, a map associated with the object, a text or document associated with the document, a GPS log associated with the object, mobile telemetry associated with the object, a location of the object, and the like. In various embodiments, an object may comprise a "target," in that the object may be the subject of a search performed by an automated vehicle, such as an unmanned automated vehicle, as described in greater detail below.

As described herein, object data may be geocoded (i.e., associated with a geographic location). Geocoded object data is referred to herein as a geocoded or geo-located object (or a GLOB).

Figure 1:
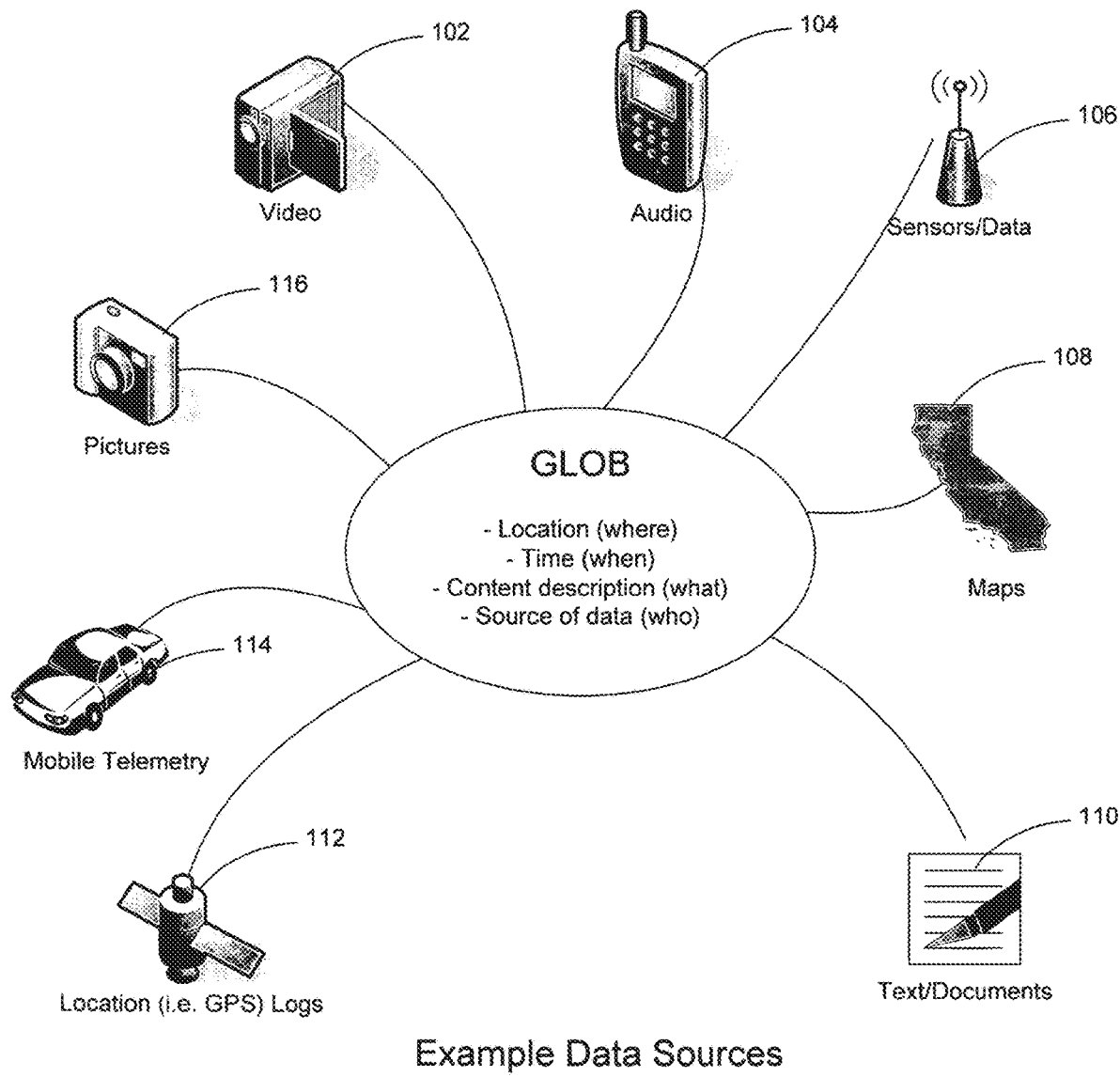
FIG. 1 shows illustrative examples of information converted to a geo-location object ("GLOB").

Referring to FIG. 1 there are shown illustrative examples of object information or data that may be converted to a GLOB. More particularly, FIG. 1 shows an illustrative example of a plurality of sources of information that may be turned into a GLOB such as video 102, audio 104, sensors/data 106, maps 108, text/document 110, location, e.g. GPS logs 112, mobile telemetry 114, and pictures 116. Additionally, the attributes associated with each GLOB are shown: location (where); time (when); content description (what); and source of data (who).

A description of an illustrative system that may be used to present one or more GLOBs is described. Additionally, a system to animate GLOBs that are indexed by time and that include geographic information is also described. Furthermore, GLOB information may be presented in a synopsized form that allows the user to obtain detail about a particular object. Further still, a plurality GLOBs may be generated from a plurality of different sources of information. The systems and methods described herein may also be used to geocode multiple objects and to organize the GLOBs. For example, geocoding of multiple objects that are sequenced in relation to one another is described. The systems and methods take advantage of the objects belonging to the same group. Further yet, the systems and methods may be used to generate virtual tours where the virtual tour is a visual and/or audio presentation of what one might experience when visiting a particular location.

By way of example and not of limitation, a GLOB could be a digital photograph that is tagged with the time and location at which the photograph was taken. The content of the photograph is the photographic image itself. There may also be tags which describe who took the photograph and the subject matter of the photograph.

Other illustrative information that may be converted to a GLOB includes, but is not limited to, maps, videos, recorded location logs (e.g. GPS logs), audio recordings, weather reports, news items, sensor measurements, automotive telemetry such as location, speed, camera images, and any other apparatus, systems and methods for generating content. The examples of information presented herein are referred to as "generated content" or sometimes just "content" for short. The content described may be grouped together into sets of related objects. For example, in the case of photographs, a user might decide to group together a collection of photographs that were taken around the same time frame as a particular trip or event.

In addition to location information and possibly temporal information, GLOBs may be tagged with other state information such as altitude, heading, and azimuth. GLOBs may also be tagged with motion state parameters such as speed, acceleration, and bearing. The location may have a further qualifier that specifies the accuracy and resolution of the location.

Figure 2:
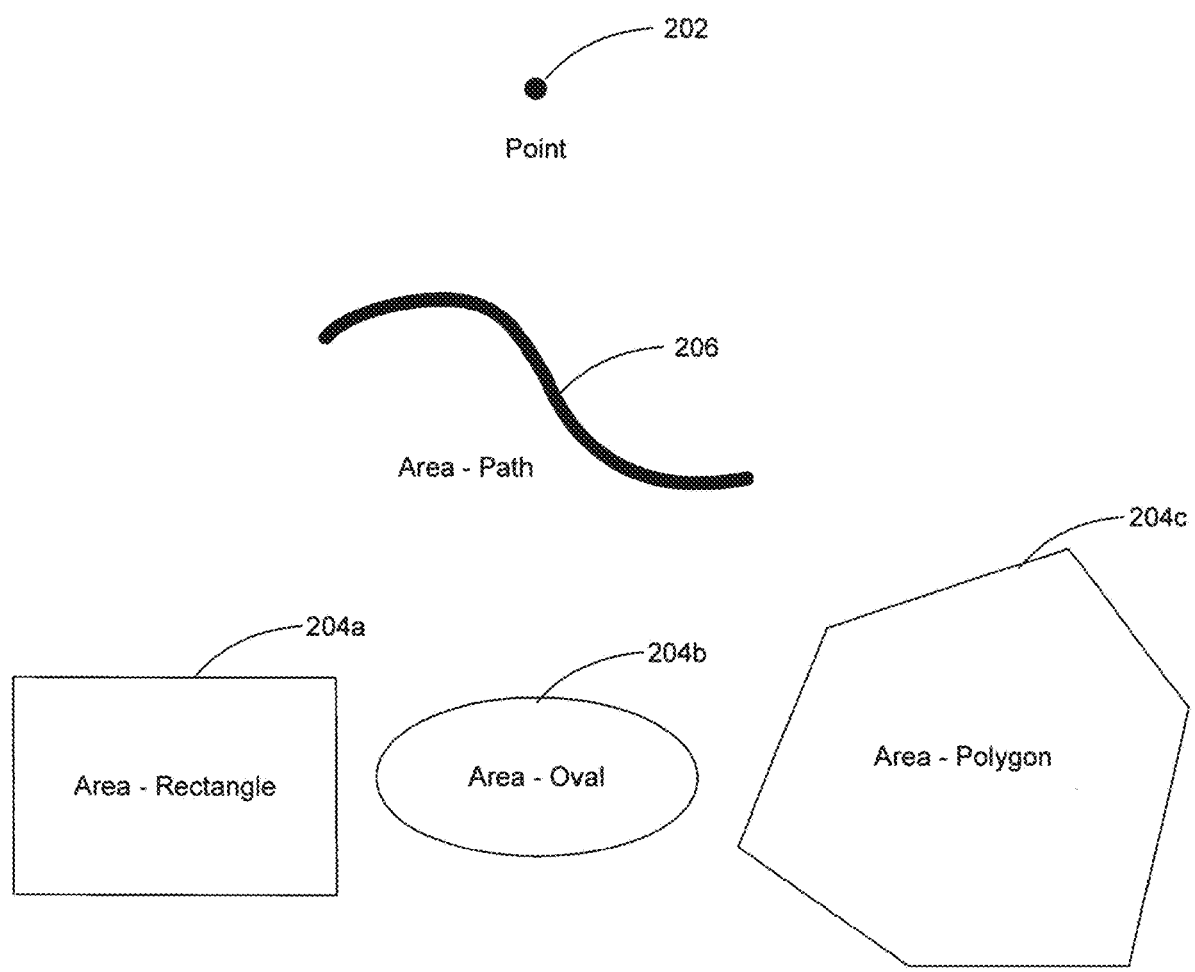
FIG. 2 shows illustrative location descriptors.

Referring to FIG. 2 there are shown illustrative location descriptors, which shows the topological forms that a location attribute of a GLOB may take. The different forms may range from being a single point 202 to some defined area. A location area represents the bound within which the GLOB may exist such as an area 204a, an area oval 204b, an area polygon 204c. Additionally, a location area includes an area path 206. There may also be some statistical distribution which may be used to determine the probability of the GLOB existing in a particular point. It is also important to note that the resolution and accuracy of the location may vary widely and is dependent upon the resolution and accuracy of the location information source.

For example, if the location was derived from a GPS fix then it will have a high degree of resolution, but if the location was derived from some annotation that simply says "Montana" then it will only have a resolution that corresponds to the state of Montana. Either of these situations maybe modeled using one or the topological forms shown in FIG. 2.

Information that is geocoded may be stored or associated with a particular digital file. For example, many digital recording formats such as JPEG have facilities built into their specification that allow for the addition of location information. Digital formats which do not may require some sort of auxiliary data file that can be stored with the content.

There are a number of ways content may be geocoded in order to be turned into a GLOB. The first and most straightforward method is for the device that generates the content to geocode it when the content is generated. This requires that the device have access to location information such as an embedded GPS receiver or perhaps some sort of remote server that can locate the device and transmit its location information to the device. Examples of the latter approach include wireless devices which have so called E-911 capabilities.

If the device that generates the content is not able to geocode the content when it is generated, then it is necessary to perform some sort of processing step after the content is generated in order to geocode it. Most digital recording devices in use today such as digital cameras have a systems and methods for associating the content that it generates with the time in which the content was generated. The geocoding step may be automated if another collection of GLOBs exists that were collected at the same time and within the same area as the content that is not geocoded. It is then possible to geocode the content by time correlating with the collection of GLOBs that have already been geocoded. For example, a user could carry around a GPS logger that periodically recorded location and geocode a set of pictures that were taken at the same time.

Another method of geocoding is simply for the user to manually specify the location of the content. This could be done when the content was generated by allowing the use to enter some location data with the content. Examples of this could be text or even voice recordings. Another way the user may specify the location of the content is by displaying maps on a computer screen and allowing the user to simply point and select where the was generated on the map. Additionally, it is not necessary to specify where all the content was generated, but only a select few that provide location landmarks. If the content has a time code that specifies when it was generated, then it is possible to interpolate where the content was generated from the landmarks that the user has created. Furthermore, a GLOB may represent a historical event and includes a time code for a future event such as a predictive model of traffic flow where data is generated that represents what is to be expected at a certain location and at a certain time.

In the illustrative embodiment, all content that is geo-located will use an additional data structure referred to as a GLOB Data Sheet (hereinafter "GDS"). The GDS supports two main functions, namely, a data structure that holds auxiliary information about the content such as location, and a data structure that facilitates the searching for content based upon certain attributes such as location.

Figure 3:
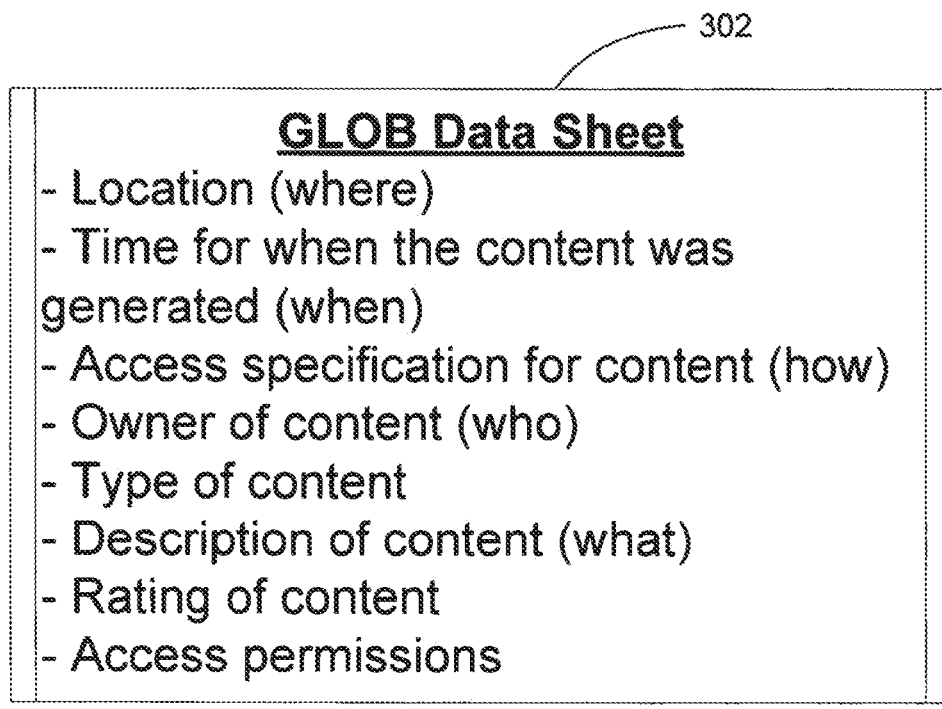
FIG. 3 shows illustrative attributes of a GLOB data sheet.

Referring to FIG. 3 there is shown illustrative attributes of a GDS. The illustrative GDS 302 including a data record that contains the following pieces of information: location, time when the content was generated, owner of content, access specification for content, type of content, description of content, rating of content, and access permissions. By way of example, the location information is provided as longitude and latitude. An illustrative time period associated with the content may also be provided, e.g. time when was a photograph taken. An illustrative data field may also identify who or what is responsible for generating and/or owns the content, e.g. an individual, an organization, or perhaps even a Web site from which the content originates.

Another piece of information that is contained in the GDS may include a specification that allows the GLOB content to be accessed, which can be in the form of an identifier that specifies where the content is located as well as a specification that dictates how to access the content from the specified location. Examples of specifications that support this are Uniform Resource Identifiers (URI's) which are well known methods for doing this on the World Wide Web.

Additionally, the GDS may include a data record having a description of the type of content, i.e. photograph, video, audio, etc. Furthermore, the GDS may include some sort of annotation that describes the content where the illustrative annotation is in the form of text, but can take many forms including audio, video, or images. Further still, the GDS may include a rating of the content so that higher rated GLOBs are more likely to be included in Chronicles, Narratives, or Virtual Tours, which are described in further detail below; the rating may be derived from a variety of sources including third parties who have viewed the content.

GDS records are placed into a geo-spatial database and searched according to any of the GDS attributes mentioned above. Thus, it should be possible to create queries such as "give me all the photographs taken by John Smith along a route specified by the coordinates X, Y . . . Z." Such queries would return all the GDS records that satisfy the parameters and the GDS records could be then be used to access the content.

Figure 4:
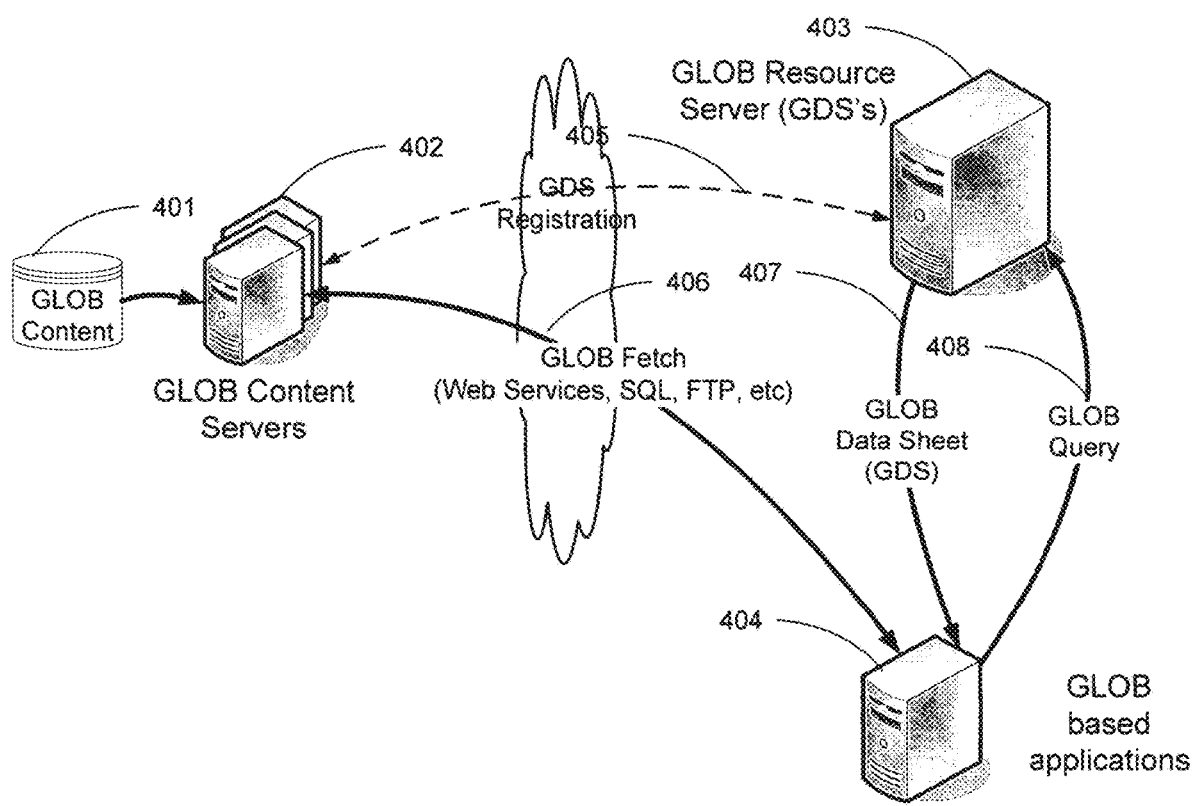
FIG. 4 shows an illustrative system configured to query GLOB data sheets.

Referring to FIG. 4 there is shown an illustrative system configured to query GLOB data sheets. The illustrative GLOB content is stored in some location 401, which may be a database or a file system that is managed by servers 402. Furthermore, the illustrative GLOB data sheets are stored in servers 403. A GDS may be stored in server 403 via a registration request 405. Application computers 404, which need to locate and use specific GLOB content, proceed to submit a GLOB query 408 to GDS server 403. The GDS server 403 would respond with a set of GLOB data sheets that satisfy the query 407. The application computer 404 may then use the GDS to access the GLOBs 406 from the servers 402 that manage the GLOB content. The accessing of the GLOB content may be performed using a variety of technologies including FTP, SQL, and Web Services, to name a few.

There are many sources of information that can be used to geocode content to create GLOBs and the corresponding GDS that are used to search and access the GLOB content. A "multi-modal" approach to exploit as many sources of location information as possible is described.

As previously discussed, one of the two functions of GDS is for the GDS to control location information. The process of transforming content into a GLOB with a GDS takes advantage of multiple sources of information that determine the content's location. The sources of location information can be categorized as explicit location information, annotations, implicit location information, and association with location logs.

Explicit location information is embedded in the content when it is generated and is easily extracted from the content without any processing or transformation of the information. Thus, the explicit location information is stored with the content when the content is generated. By way of example, the device that generated the content has access to location information such as an embedded GPS receiver. In one illustrative embodiment, a digital camera has an embedded GPS receiver that can be used to store latitude and longitude coordinates in the EXIF header of the images taken and stored by the digital camera.

Another example of explicit location information would include a camera phone with E-911 capabilities that receives location from a remote server. The remote server can track the location of the phone and wirelessly send that information to the camera phone so that it can use it to tag any photographs that it is taking. It could use the location information to store latitude and longitude coordinates in the EXIF header of the images that it generates and saves.

Annotations are added to the content after it is generated and typically require some sort of data entry step that is separate from the actual generation of the content itself. Annotations are created as a separate step, whereas the explicit location information is captured simultaneously with the content. Examples of annotations include text entry and voice recordings. Annotations are typically stored separate from the content, but it may be embedded in the content itself. For example the JPEG image standard allows for some simple annotations to be stored with the JPEG file itself.

Annotations may contain information that can be used to determine the location of the content. Examples are text annotations that contain addresses or simply location key words such as "Eiffel Tower" or "Montana." These location references can be compared to a database of address or location references in order to resolve them to a specific set of geo-spatial coordinates. Databases that contain addresses or well known points of interest that can be used to translate descriptions or references into geo-spatial coordinates are in common use today.

It is also possible to perform voice recognition on audio annotations to extract location key words and then cross reference them to a locations database in much the same way that text annotations are resolved.

In some cases the annotations are only for the purposes of location and are explicitly added for that purpose. For example, it is possible to create map and text based tools for the user to type in addresses and display maps that allow the user to point and click on the map to specify where it was located. The locations that are specified by using the map based tools become location specific annotations to the content. The annotations in this case would be a set of coordinates that were added by the user.

Implicit location information is embedded in the content itself and requires some amount of processing to extract. Implicit location information includes information within the content that may be processed to identify where the content was generated. Additionally, any information that can be uniquely matched to something that does have a known location or can be translated into another form such as text can be used to implicitly encode location information by comparing it to a database of known locations.

For example if someone takes a picture of the Eiffel tower it is possible to perform image recognition that identifies the Eiffel tower which by implication means that the picture was taken near the Eiffel tower. Thus if the location of the Eiffel Tower is known then the picture's location is also known. The location of the Eiffel Tower may be part of a database that can be used to resolve well known references or landmarks to a specific set of coordinates.

Another example of this technique is where the user takes pictures of signs in the area that give information such as city and/or street names. It is possible to perform optical character recognition on such images to extract the location information in the form of text. These location references can then be compared to a database of address or location references in order to resolve them to a specific set of geo-spatial coordinates.

A location log is a history of locations that are specific to a person or object. A location log contains a time sequenced series of records with at least the following information: a specification for a location; an identifier for whom or what the location refers to; and a time stamp. Therefore, if there exists a log of locations that specify where an individual is located at particular times, then it is possible to correlate the times that the individual generates content to the locations inside the location log to geocode the content.

In a location log, the specification for a location may include a variety of units including latitude/longitude or a description of the location such as an address. In short, the location specification is used to determine where on the earth something is located. The location may have a further qualifier that specifies the accuracy and resolution of the location. For example some records may be derived from GPS locations which have a high degree of resolution and accuracy while other records my be derived from auxiliary documents such as travel itineraries which may only have resolution down to the city, but not where in the city.

The identifier includes information related to whom or what the location refers to. Typically, this is an individual where the identifier may simply be the individual's name.

The time stamp designates when the above mentioned person or thing was located at the above mentioned location. The time may be specified in a variety of units as long as it may be translated or converted into a date and time. Additionally, the time stamp may have varying degrees of accuracy.

The location log takes of advantage of the capabilities of digital recording devices in use today, e.g. digital cameras, which have a system and method to tag the content with the time. The geocoding step may be automated if a set of location logs exist that specify where the person that is generating the content is located at times that correlate to the time when the content is being generated. In the illustrative instance where the time the content is generated does not match a record in the location log, it is still possible to estimate the location by extrapolating the location from one or two locations in the location log that are close in time.

As previously mentioned, location logs are stored in a geo-spatial database that supports the querying of entries either by their location or by their time and identifiers. By way of example and not of limitation, there are a variety of technologies and information sources that may be used to generate location log records. For example, wireless devices with embedded GPS receivers or that adhere to the E911 directive may be used, and it is possible for enterprise servers to query and log the location of Wireless devices. Additionally, location trackers such as GPS loggers that record the latitude/longitude of the person carrying the device, and TV-GPS and/or Wi-Fi location technologies may be used; these location logs can later be uploaded and added to the user's overall location log. Furthermore, the explicit location information embedded in content as described above may be used where the location information can be extracted from content and added to the user's location log. Further still, the implicit location information derived from content as described above can be extracted from content and added to the user's location log. Further yet, content annotations as described above can be converted to locations that can be added to the user's location log.

Other illustrative examples include, but are not limited to, vehicle navigation systems, RFID technology, financial transactions, user schedules, travel itineraries, and Internet Protocol (IP) addresses. Vehicle navigation systems are used to track a vehicle's location and give directions and they use a variety of methods including GPS to track the location of the vehicle; these systems could be used to provide location information that could be loaded into a user's location log. RFID technology such as that used in toll tags in automobiles may also be used. Financial transactions of the user could be mined for information that specifies where the user was located when the transaction occurred. Schedules from a user's calendar or personal information management system can be mined to determine if a location was specified as part of a meeting appointment. Travel itineraries such as those stored on online travel services contain information about where a user was at certain times. Finally, Internet protocol (IP) address location may be used since it is possible to locate where a particular IP address is physically located based upon whom or what organization was assigned that address, so that when a person accesses on line services from some remote location it may be possible to determine where they were when they accessed those services.

The general concepts of a GLOB were introduced above. A discussion of GDS followed that described the two GDS functions, namely, a data structure that holds auxiliary information, and a data structure that facilitates searching. The GDS information includes one or more sources of location information such as explicit location information, annotations, implicit location information, and location logs.

Now attention is directed to the software modules that collect geocodes and content from multiple sources, and combines the content and geocodes to produce GLOB data sheets. This process may be described as "multi-stage" geocoding and GDS generation.

Figure 5:
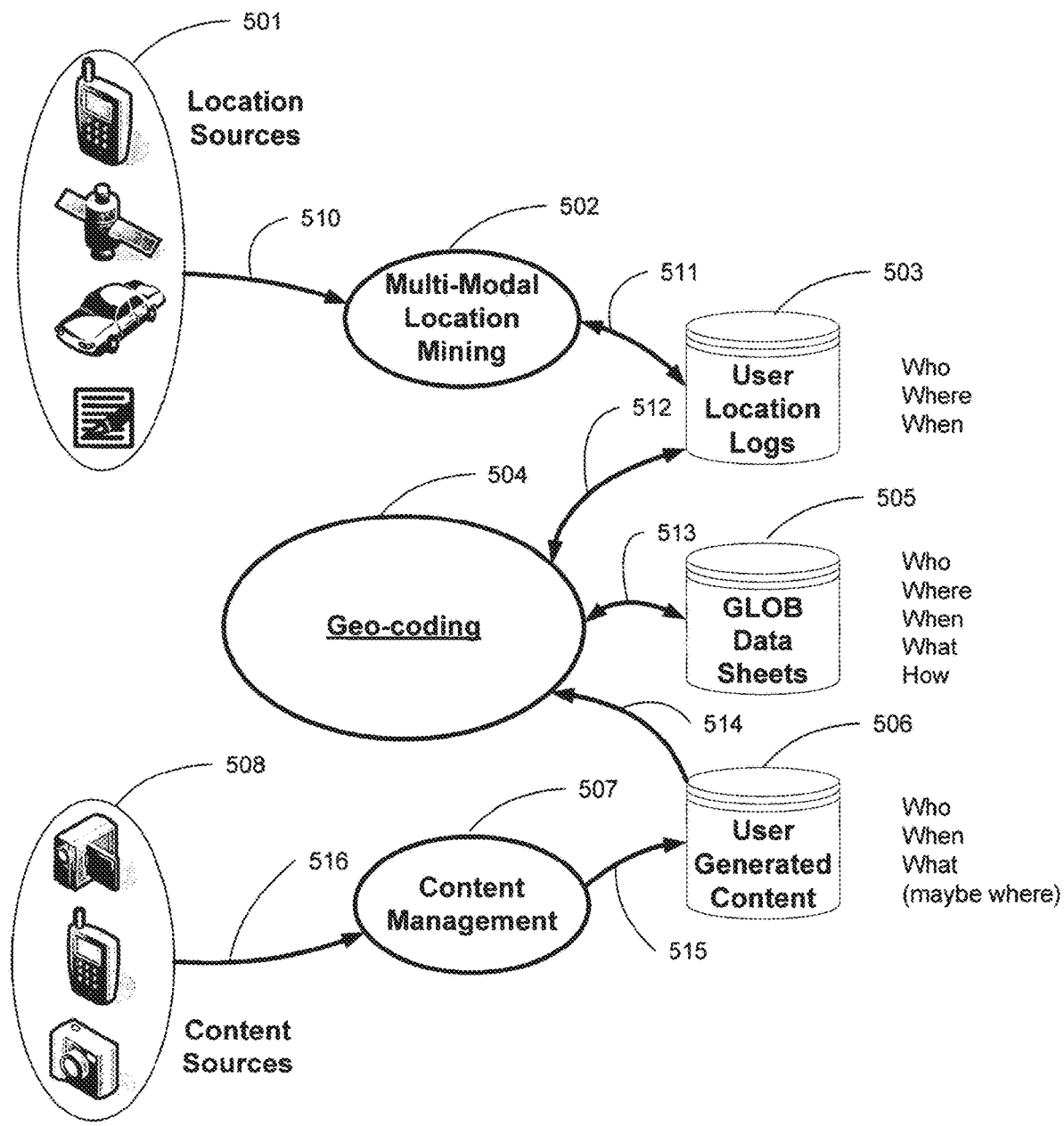
FIG. 5 shows an illustrative diagram of software modules that generate GLOB data sheets.

Referring to FIG. 5 there is shown an illustrative diagram of software modules and processes that generate GLOB data sheets. More particularly, FIG. 5 shows the various functions and modules involved in the process of geocoding content to generate at least one GDS. There exist numerous sources of content 508 including digital cameras. This content is collected and stored within repository 506 and managed using a variety of third party and vendor specific tools 507. The management of the content includes downloading 516 the content 518 from the sources to a content management system 507 and storing 515 the content in some repository 506. In one embodiment, the repository 506 may be local and stored on the user's computer. In another embodiment, the content is uploaded to some third party server on the internet. The repository 506 may be simply a file system on some computer or perhaps a database and access to the repository 506 may be via some server (not shown).

Additionally, there exist a number of sources of user location information 501 such as GPS loggers, Wireless devices, and personal information as described above within the context of the location logs. Each of these sources is processed at arrow 510. Additionally, the multi-modal location mining function 502 is performed where the location information that is extracted or mined is stored 511 in a location log repository 503. The repository 503 is a geospatial database and typically resides on a network that is publicly accessible. The location log database server is able to handle queries 512 in order to select specific log entries that correspond to specific users and time spans.

The geocoding process 504 uses all available sources of location information in order to create a GDS for each entry in the content repository 506. Each GDS that is created is stored 513 in a GDS repository 505. As previously described, the GDS contains a reference to the content in the content repository 506 as well as location information about where the content is located. The geocoding process 504 uses multiple stages to resolve the content's location as shown in FIG. 6.

Figure 6:
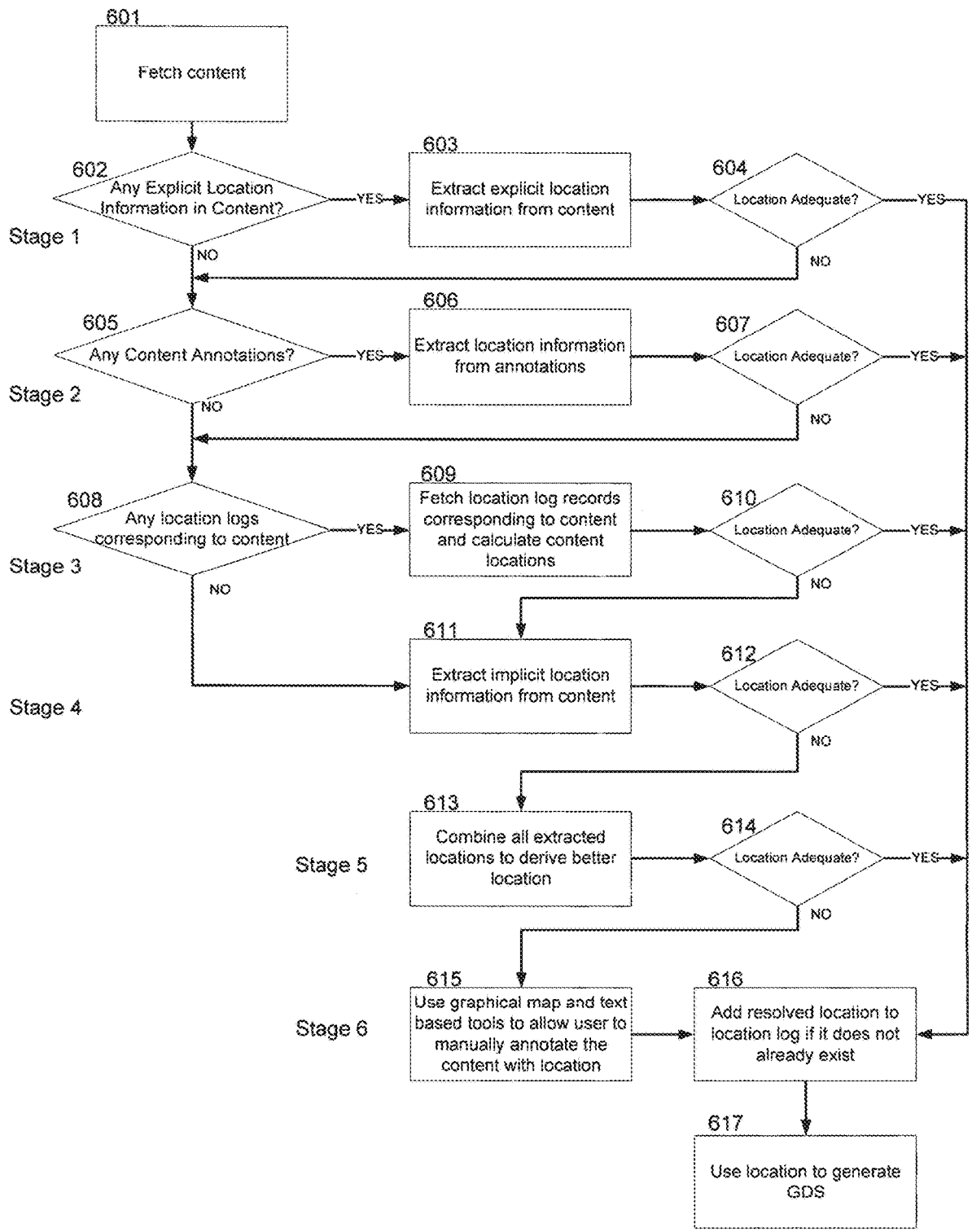
FIG. 6 shows an illustrative flowchart of a geocoding process.

Referring to FIG. 6, there is shown an illustrative geocoding process. The first step, 601, is to fetch some content from the content repository 506. Decision diamond 602 is then executed to determine if there is any explicit location information stored with the content. If YES then process 603 is used to extract the explicit location information from the content. Extracting the location information is dependent upon the type of content and how the location information is stored with the content. A variety of formats and content types can be supported.

Decision diamond 604 is then executed to determine if the location information that was extracted is adequate. Locations are deemed to be inadequate if their resolution and accuracy do not meet certain minimum standards or if there simply is no location record. If decision diamond 604 is YES (i.e. location data is adequate) then it is not necessary to do any more geocode processing to resolve the content's location and process 616 is executed. Process 616 adds location information to the location log 503 if it does not already exist; this is performed so that the location information may be used in the future to geocode other content. Process 617 is then executed and uses the location information to generate a GDS and add it to the GDS repository 513 and geocoding is complete.

If decision diamond 602 was NO (i.e. no explicit location information in content) or decision diamond 604 is NO (i.e. locations inadequate) then further geocoding needs to take place and decision diamond 605 is executed to see if there are any content annotations. If YES then the annotations are processed by process 606 to extract any location information from the annotations and decision diamond 607 is executed to see if these locations are adequate. Decision diamond 607 is then executed to see if the locations are adequate (analogous to 604 as described above) and if the answer is YES then process blocks 616 and 617 are executed as described above and geocoding is complete.

If decision diamond 605 was NO (i.e. no content annotations) or decision diamond 607 is NO (i.e. locations inadequate) then further geocoding needs to take place and decision diamond 608 is executed to determine if there are any locations in the log that correspond to the content. This decision is based upon the owner of the content and the time period that the content was generated. If there are records in the location log that correspond to the content (i.e. have the same owner and similar time stamps) then the answer to decision diamond 608 is YES and process 609 is executed. Process 609 uses the records from the location logs to calculate locations for the content. This may require extrapolation of the locations from the location log depending upon how closely the time stamp of the content matches the time stamps of the location log records. Decision diamond 610 is then executed to see if the locations are adequate (analogous to 604 as described above) and if the answer is YES then process' 616 and 617 are executed as described above and geocoding is complete.

If decision diamond 608 was NO (i.e. no corresponding records in the location log) or decision diamond 610 is NO (i.e. locations inadequate) then further geocoding needs to take place and process 611 is executed to extract any implicit location information from the content itself. Decision diamond 612 is then executed to see if the locations are adequate (analogous to 604 as described above) and if the answer is YES then process' 616 and 617 are executed as described above and geocoding is complete.

If decision diamond 612 is NO (i.e. locations inadequate) then a further processing step 613 is performed to try and combine all the locations from the previous stages together to see if the location can be further resolved. One example of this step would be to simply take the intersection of all the previous locations as see if it results in a more refined location. Decision diamond 614 is then executed to see if the locations are adequate (analogous to 604 as described above) and if the answer is YES then process' 616 and 617 are executed as described above and geocoding is complete.

If decision diamond 614 is NO (i.e. locations inadequate) then process 615 is executed. Process 615 is a final stage in which various graphical map and text based tools are used to allow the user to specify addresses and point and click on a map to manually specify the contents location. After this step it is assumed that the location has been specified to the level of accuracy and resolution necessary and process' 616 and 617 are executed to generate the GDS and place it in the GDS repository 505 and geocoding is complete.

In summary, the algorithm associated with FIG. 6 describes six distinct location resolution stages: explicit locations in content, i.e. process blocks 602, 603, and 604; content annotations, i.e. process blocks 605, 606, and 607; location log association, i.e. process blocks 608, 609, and 610; implicit location information, i.e. process blocks 611, and 612; combine all previous results, i.e. process blocks 613, and 614; and tools to allow the user to manually annotate the content with location, i.e. process block 615.

It shall be appreciated by those of ordinary skill in the art that the last stage is the only one which is not completely automated and may require the user to perform some manual task, and is only required if none of the previous stages are successful in generating an adequate location. Those skilled in the art shall also appreciate that the algorithm is not dependent upon the order in which stages 1 through 4 are executed. Thus, if it is found that it is more efficient to perform stage 3, i.e. check the location logs, before performing stage 2, i.e. extract location information from the content annotations, then process blocks 610, 611, and 612 may be performed before process blocks 605, 606 and 607. This algorithm is in fact designed so that stages 1-4 can be re-ordered or even omitted to increase efficiency.

Up to this point a description of GLOBs, GLOB Data Sheets (GDS), and the process for geo-coding content to generate at least one GDS has been described. The resulting GDS, which is described above, may be used to organize the GLOB content as shown in FIG. 7.

Figure 7:
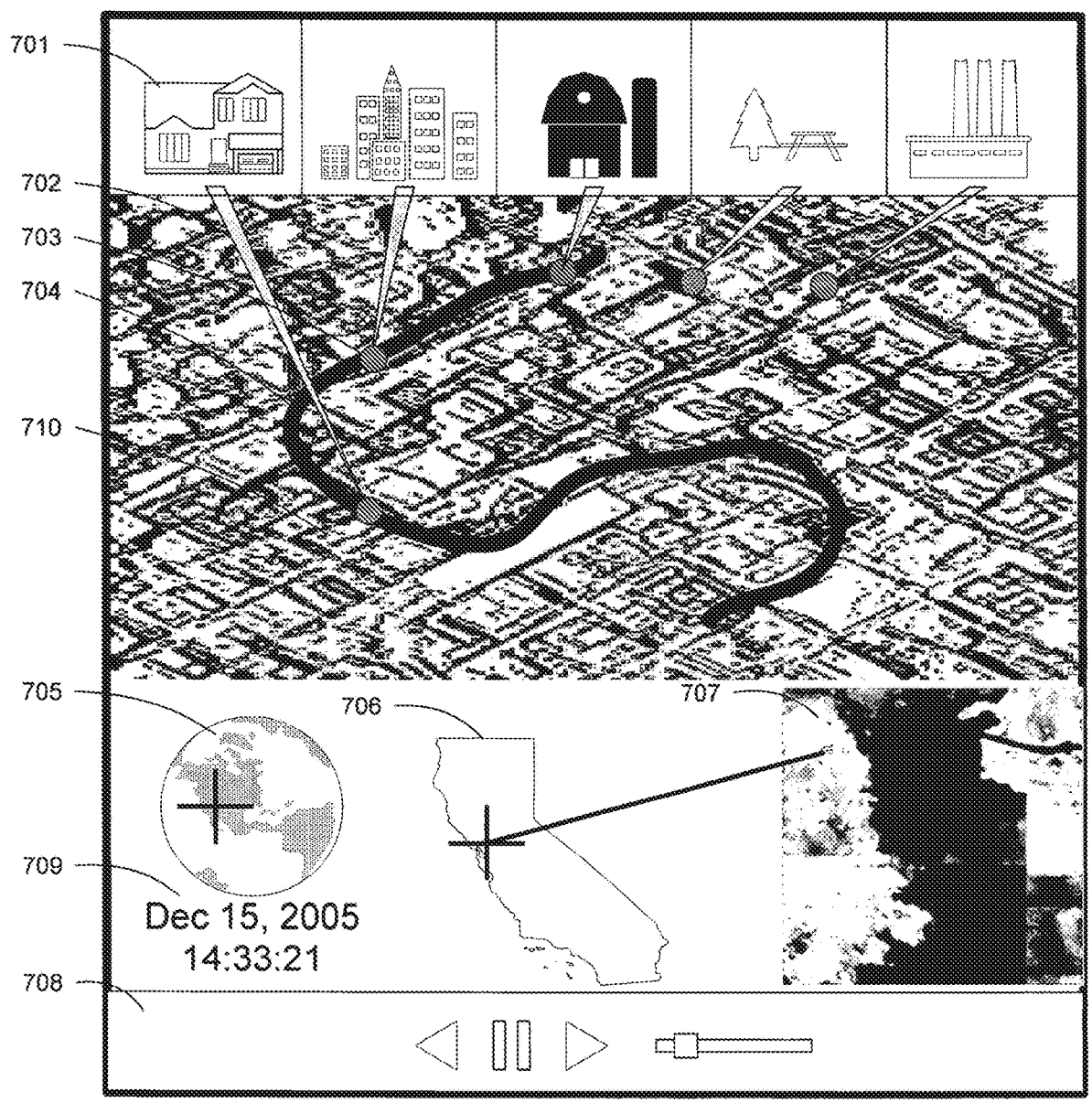
FIG. 7 shows an illustrative example of a Chronicle of GLOBs.

Referring to FIG. 7 there is shown an illustrative example of a "Chronicle" or "Narrative" of GLOBs that are displayed to a user. Note, for purposes of this patent the terms Chronicle and Narrative are used interchangeably. A Chronicle or Narrative is a collection of GLOBs that are organized according to time and location, and may then be animated. The Chronicle is a multi-resolutional depiction of the GLOB data with respect to time and location. The illustrative Chronicle includes a map display where the time sequenced GLOB content is displayed in order to show the geographic location that the content refers to. A synopsis of the GLOB content as it changes over time can also be shown in the illustrative Chronicle.

The Chronicle has a notion of time that is displayed to the user 709. This notion of time is in relation to the GLOB content that is being animated, i.e. the pictures 701. In the illustrative example, the time being displayed corresponds to the time at which the pictures were taken. The illustrative images or pictures are animated in the form of a slide show that is time sequenced. By way of example, the pictures are being animated by thumbnails that are scrolling smoothly across the screen. For example, there are multiple levels of map display 705, 706, 707 and 710. Each map shows a different level of detail ranging from the entire planet 705 to the local area 710. It shall be appreciated by those of ordinary skill in the art that the multiple levels are not required as long as there is at least one level. It shall also be appreciated that the illustrative maps include maps generated using aerial imagery, or computer generated street maps, or any combination thereof.

The illustrative maps show the location of the images that are currently being displayed in the slide show 701. In the case of the highest resolution map 710, the location of the GLOB pictures are shown by both markers on the map 703 and pointers 702 which point to those markers. This allows the user to easily see where the GLOBs are geographically located.

In addition to the picture GLOB animation there is a route GLOB animation being drawn on the map 704. A route is simply a time sequenced collection of geo-locations and can be animated by drawing the route on the map as the Chronicle's time elapses. Note, the route could represent a route that was taken when the pictures were generated or could represent a route that is to be followed in the future and the pictures represent what is expected to be seen along the way. Therefore, a Chronicle can either represent something that is either currently happening, has happened in the past, or is expected to happen.

The Chronicle may include a set of player controls 708 that allow the user to control various aspects of the Chronicle such as playing/pausing, forward/reverse and a method to quickly move to certain time indices of the Chronicle that is similar to a videotape player.

Figure 8:
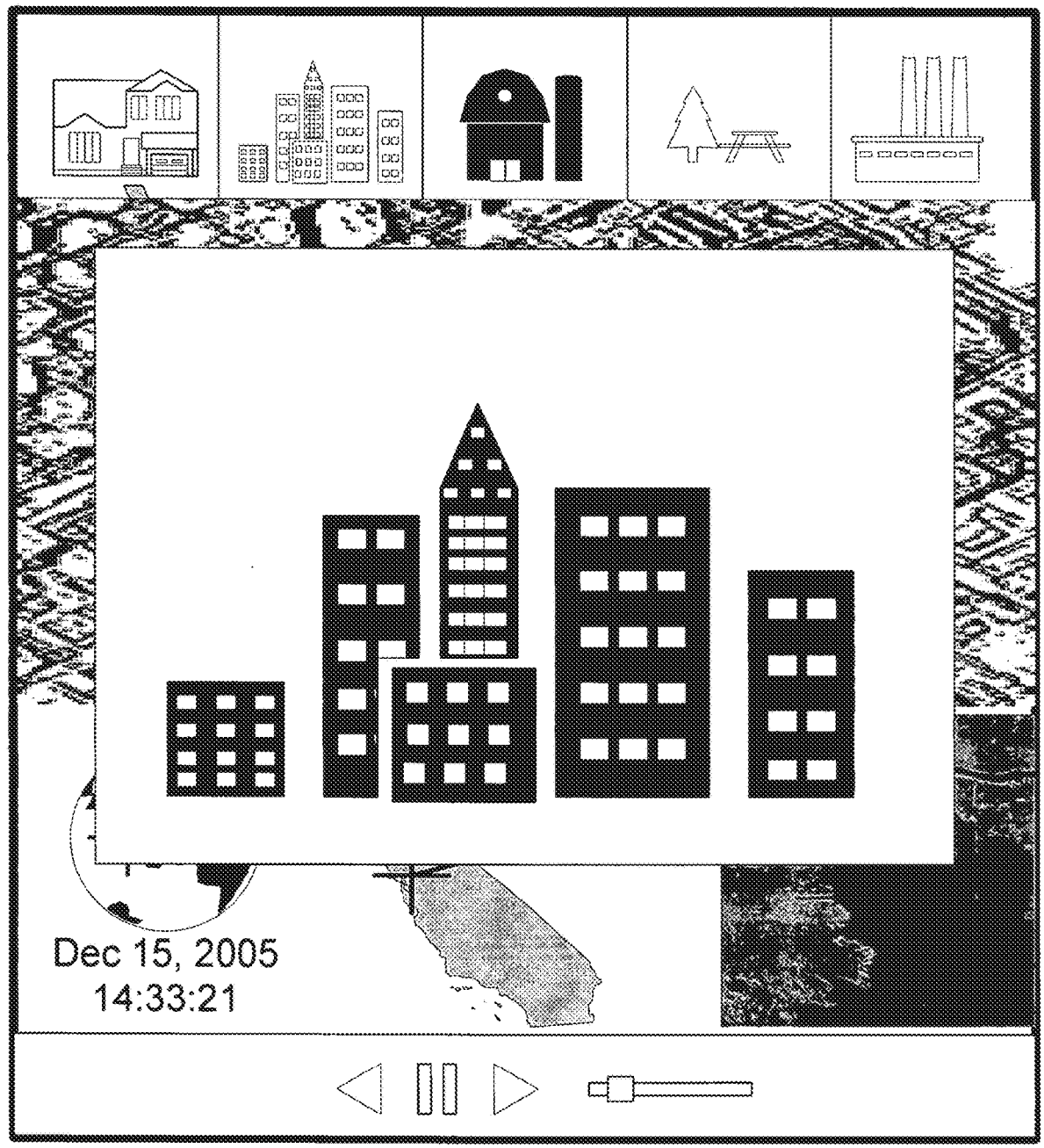
FIG. 8 shows an image with more detail of a particular GLOB.

The illustrative Chronicle may animate a synopsis of GLOB sequences in order to allow the user to quickly and easily view the information represented by the GLOB. Additionally, the user may "drill down" and view more detail associated with a particular GLOB, which may entail getting a more detailed view of a particular picture. The user could do this by simply selecting the thumbnail of the picture and then the Chronicle would pause and a more detailed view of the picture may be displayed. An illustrative example of this is shown in FIG. 8, which displays a more detailed view of the selected GLOB.

The Chronicle is generated using the attributes and features associated with GLOB Data Sheets, which were described above. However, the method for generating Chronicles may require processing third party content and including this third party content in the Chronicle.

Figure 9:
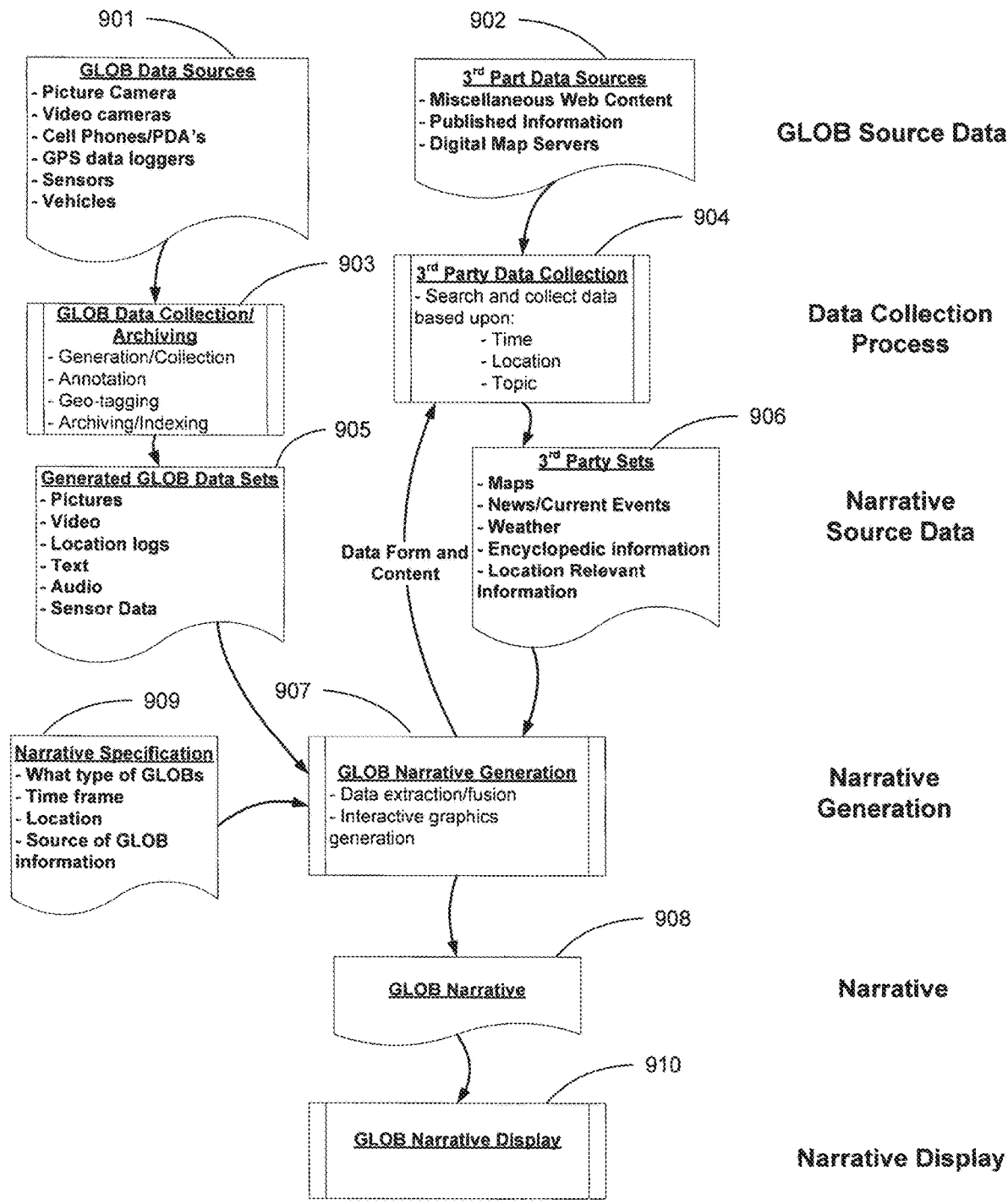
FIG. 9 shows a flowchart for generating an illustrative Chronicle or Narrative that integrates third party information.

Referring to FIG. 9 there is shown the process of generating a Chronicle or Narrative that integrates third party information. The process for generating a Chronicle involves combining GLOB data that has been generated with maps and other third party content. Initially there exist a set of data content that is generated for the purpose of using as a GLOB 901. Note, when the data is generated it may or may not be geocoded. There also exists various third party content such as Maps, documents, etc., which may be used in conjunction with the generated GLOB data to create a Chronicle.

The first process step 903 is for the generated date to be collected and turned into GLOBs by adding geo-location information when necessary. Process step 903 may also entail annotating the GLOBs with additional information such as textual description of the content of the GLOB. The information is indexed and archived in some fashion so that it may be retrieved later; this may entail the use of well known database technologies. The result is a set of GLOB data sets 905 that can be used for the Chronicle generation.

The actual Chronicle generation process 907 entails using a Chronicle specification 909 to collect all the data, namely, both GLOBs 905 and third party date 906. The Chronicle specification may include the type of GLOB data desired, the location, the time frame, and source of the GLOB data. The collection of the third party data may interface with various map servers and other databases and possibly Internet based information servers 904 to collect all the information that is relevant to each GLOB and its associated content 906. The information that is retrieved is dependent upon the specification of the Chronicle. Note, a Chronicle specification may refer to the past, present or future time frames.

Once the data sets 905 and 906 have been collected, a graphical representation is generated where the GLOB data is animated in time and shown geographically, as described above. The manner in which the Chronicle is generated and displayed is discussed in more detail below.

Note, the Chronicle or Narrative specifications 909 can specify various types of information such as the following: show traffic and roadside images for a specific route taken at a specific time; show a photographic travel log of a trip; shows the states of various sensors located in a particular region; show additional third party information such as weather; or any combination thereof.

Once a Chronicle is generated it may be stored in a variety of formats including the following: source GLOB data and Chronicle specifications that allows the Chronicle either be regenerated or viewed; video files on servers or computers that can be played in a variety of ways; video files on local store media such as DVD's, hard disks, flash memory, or other such storage media.

Additionally, Chronicles can be stored with only synopsis information, e.g. skinny Chronicle as described below, where the detailed GLOB information is stored separately and accessed on an as needed basis. Chronicles that have been generated can be viewed in a number of different ways including the following: using a computer like PC or possible even a mobile device that runs a special Chronicle viewer application and uses the specification and GLOB information in the Chronicle to generate and display it; using any sort of digital video capable device such as computer or mobile device that can play video files that are stored either locally or remotely on the computer; using a television and DVD player where there is an interactive video of the Chronicle stored on some type of local media such as DVD or video recorder; using a network, e.g. Internet, capable device that is capable of receiving and displaying streaming video. Illustrative examples of such devices include, but are not limited to, desktop computers, mobile PDAs, navigation devices, wireless devices, cable television, and similar network capable devices.

Figure 10:
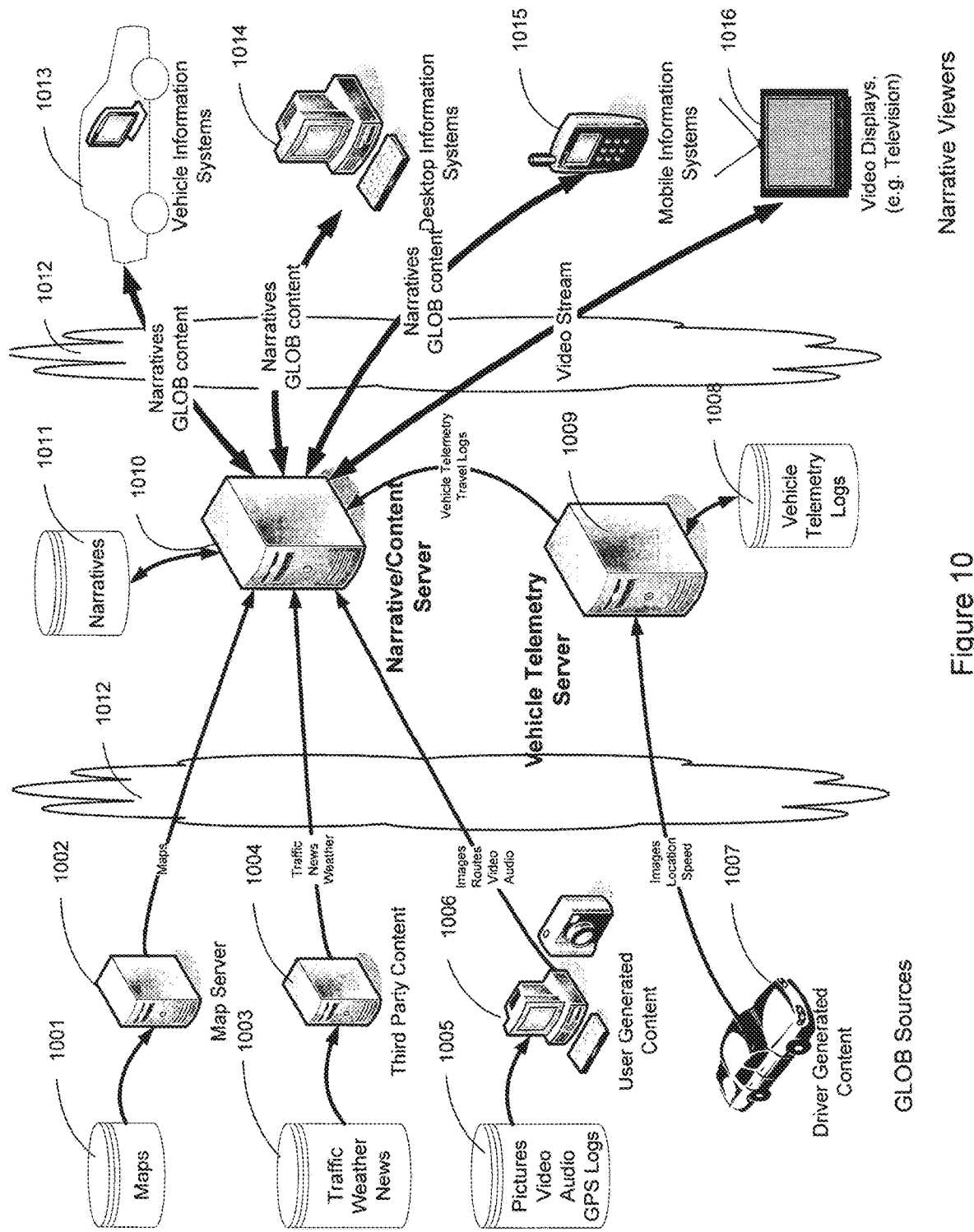
FIG. 10 shows illustrative system architecture for generating a Chronicle or Narrative.

Referring to FIG. 10 there is shown a general overall architecture for Chronicle generation. As shown in FIG. 10, the generation of Chronicles requires gathering GLOB information from various sources 1001, 1003, 1005, and 1007 that are served up from a variety of servers 1002, 1004, and 1006 that may be distributed and interfaced via some sort of wide area network 1012 such as the Internet and the World Wide Web. The vehicle telemetry server 1009 is an example of a server that continuously collects data from a potentially large number of sources (vehicle probes 1007) and stores the information in a database 1008. It shall be appreciated by those skilled in the art that servers such as 1008 and 1009 do not necessarily apply only to vehicles, but could apply to any data sources which may be numerous and continuously generate information such as sensors that are part of some large sensor network.

Chronicles or Narrative may be viewed by a number of different devices 1013, 1014, 1015, 1016. These devices may be normal desktop systems 1014, mobile devices 1615 such as PDA's or wireless devices, special embedded systems such as navigation or vehicle information systems inside vehicles 1013 or even video display systems such as televisions 1016. Like the GLOB sources, these devices are network via some sort of WAN 1012 that includes such systems as cable television.

FIG. 10 also shows a server 1010 which aggregates information from the various GLOB sources and both generates the Chronicle and serves them to the devices used to view the Chronicles. Typically, the Chronicle server 1010 will store the generated Chronicles in a database 1011. The Chronicle server 1010 can therefore include a "multimodal" Chronicle server, in the sense that the server 1010 aggregates information from a plurality of GLOB sources.

Referring to FIG. 11 through 15, there is shown a plurality of different system configurations for the various servers, GLOB sources, and Chronicle viewing devices that are depicted in FIG. 10. These system configurations are provided as illustrative examples and those skilled in the art shall appreciate that there may be different combinations that perform the same of similar functions.

Figure 11:
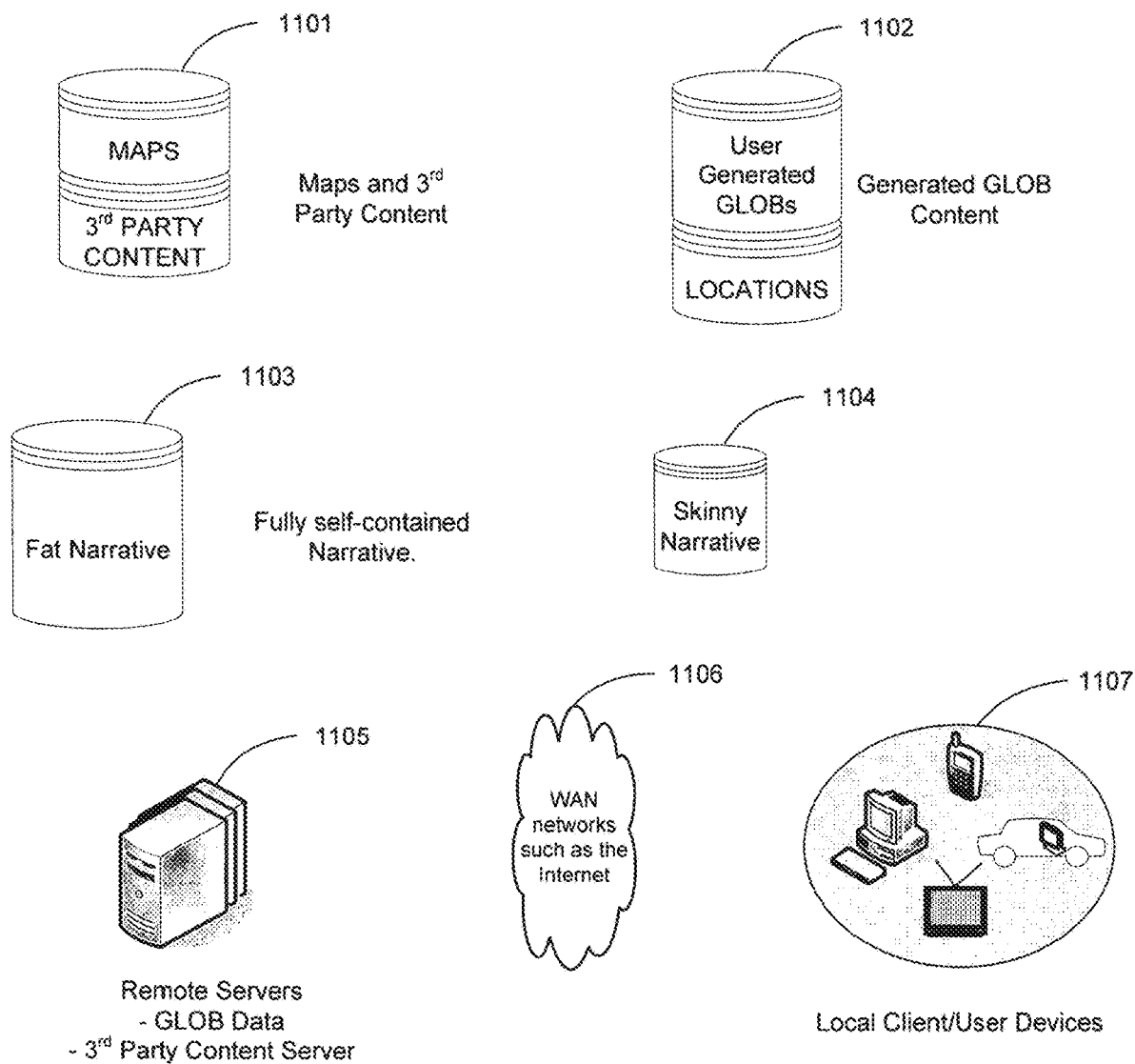
FIG. 11 shows the various components of the Chronicle or Narrative presentation systems.

Referring to FIG. 11 there is shown the various components of the Chronicle or Narrative presentation systems. More particularly, FIG. 11 shows the various components that are used to describe the various scenarios. There exist third party content datasets 1101 that contain GLOB information such as maps and other readily available information such as traffic reports, weather, news, and other such information that may come from various third party vendors or sources. This information may be stored in traditional databases or simple files and made available through standard interfaces such as web services.

There also exist user generated GLOB content and potentially location logs 1102. This data may also be stored either in files or in a database of some sort.

There exist a variety of user devices 1107 which represent the various platforms that the end user will use to view the generated Chronicles. In some scenarios, these same devices may also store the GLOB content and generate the Chronicles.

There also exist a number of remote servers 1105 that are used to either serve up GLOB content or generate and serve Chronicles.

There exist so called "Fat Chronicles" 1103 that provide fully self-contained Chronicles in which all the GLOB content of the Chronicle is stored with the Chronicle. Fat chronicles do not require additional information, but are very large and thus more difficult to move around over WAN's.

There also exist so called "Skinny Chronicles" 1104 that contain only enough content for the previewing of the GLOB data, but not the detailed GLOB information. Skinny Chronicles are much smaller and easier to move around, but require that detailed content be served up on an as needed basis.

FIGS. 12 through 15 describe a number of system architectures that may be used to manage the GLOB content and generate the Chronicles. Each of these scenarios may be used depending on system design and limitations. The main differences between the various scenarios revolve around the following design parameters: how much GLOB content is managed and stored locally versus remotely; and how much of Chronicle is generated locally versus remotely.

Referring to FIG. 12 there is shown an illustrative Chronicle architecture with fat servers and thin clients. In this architecture, all the GLOB content is managed remotely; and this may entail users to transfer any GLOB content that they have generated to the remote servers. Additionally, the Chronicles are generated by remote servers and served up to the user's computers. The Chronicles may be served up as simple web based application or there may exist as a custom application on the user's computers that allow the Chronicle to be viewed. In FIG. 12, the Chronicles are accessible from anywhere and thus easier to share among various users. Additionally, the Chronicle may be served up as a web application thus the user utilizes a browser based interface, thus no custom program is needed to view the Chronicles.

Referring to FIG. 13 there is shown an illustrative Chronicle architecture with no remote servers. In FIG. 13 all the GLOB content and Chronicles are generated and managed locally on the users computers so that everything is self-contained and so there is no Wide Area Network (WAN) required and no remote servers are required.

Referring to FIG. 14 there is shown an illustrative Chronicle architecture with remote servers having generated skinny chronicles. In FIG. 14, the remote server serves up skinny Chronicles while the locally generated GLOB content is stored and managed on the user's local computer, and there is less of a burden to upload all locally generated GLOB content. All that needs to be uploaded are the GLOB synopsis. There is less storage required on the remote servers.

Referring to FIG. 15 there is shown an illustrative chronicle architecture where the server serves remote content and clients generate the chronicle. In FIG. 15, the remote servers serve up remote GLOB content and user's computers manage locally generated GLOB content and generate the Chronicles. This scenario does not require transferring all locally generated GLOB content to a remote server, and there is less storage required on the remote servers.

Up to this point, a description of GLOBs and GLOB Data Sheets has been provided. Additionally, attention has been directed to the software modules that collect geocodes and content from multiple sources, and combines the content and geocodes to produce GLOB Data Sheets (GDS), which may be described as "multi-stage" geocoding and GDS generation. Subsequently, an illustrative example of a "Chronicle" or "Narrative" of GLOBs that are displayed to a user was discussed. Furthermore, an illustrative process for generating a Chronicle or Narrative, which integrates third party information, was also described. A plurality of different system architecture for Chronicle generation was also presented.

Since there are many sources of information that can be used to geocode content to create GLOBs, a method for implicitly calculating location based on limited explicit location information is described below. This method is also referred to as geocoding groups of sequenced object wherein location information is used, regardless of its source, to geocode groups of sequenced objects. The method requires that there exist enough location information to individually geocode each object in the group and does not rely on the fact that the objects in the group are sequenced. In operation, the method describes explicitly geocoding a subset of the objects in a group and then implicitly calculating the locations of the other related objects in the group by exploiting their relationship to the explicit location information for one or more GLOBs.

In one illustrative embodiment, the first and simplest way to geo-locate a group of related objects is to group them all together and assign the same geocode to them all. Therefore, when one of the objects is geo-located all the objects can be assigned the same geocode. For example, there may be a collection of photographs that all have the same annotation of "May field trip" and are thus related in this fashion. If any of the photographs in that collection can be geo-located, then by using the associated annotation of "May field trip" all the photographs can be located in the same place. Although this may be adequate for many applications, it does not allow for the differentiation by location of the individual objects in the group.

Additionally, when the objects in the group are sequenced it is possible to exploit their sequential relationship to extrapolate their locations when one or more objects in the group are explicitly located.

For example, in FIG. 16 there is shown a group of related objects such as photographs 2301, 2302, 2303, 2304, and 1205 that have specific time stamps. As shown in FIG. 16, it is possible to order the pictures into a sequence based upon their time stamps. In FIG. 16, they are ordered from left to right according to their time stamps as indicated. FIG. 17 shows the display of an example graphical based tool that some user can use to geocode the photographs from FIG. 16. Such a tool is a computer program that could be a stand-alone program or a web based application that runs within an internet browser. It contains a map display 2406 that the user can use to explicitly geocode photographs. An example of how this could be done would be for the user to select a photograph and then click on the map where the photograph is located. Another illustrative method would be to enter a textual address which gets resolved to a location on the map. These are just two examples of how to explicitly geocode a photograph, but in fact any of the location sources mentioned above may be used for this purpose.

FIG. 17 shows the location on the map where photographs 2301 and 2305 were explicitly located as described above, and this is depicted by locations 2401 and 2405, respectively. Between points 2401 and 2405 there exists an implicit linear path 2407 that can be used to implicitly geocode the remaining photographs 2302, 2303, and 2304. Assuming the remaining photographs lie somewhere on this path we can use the time stamps of the photographs and their relationships to the explicitly located photographs to determine their location on the path 2407. FIG. 17 shows implicit locations 2402, 2403, and 2404 that lie on path 2407 and whose relative locations are a linear interpolation along the path based upon time. For example, implicit location 2403 lies on the midpoint of path 2407 because the time stamp of photograph 2303 is midway between the time stamp of 2301 and 2305 which form the endpoints of path 2407.

To further illustrate this process, FIG. 18 shows a case where photographs 2301, 2303, and 2305 have been explicitly located at locations 2401, 2503, and 2405, respectively. In this instance, there are two paths generated, namely, path 2506 between 2401 and 2503 and path 2507 between 2503 and 2405. In FIG. 18, location 2502 is implicitly calculated as a linear interpolation based upon time along path 2506 and likewise location 2504 is implicitly calculated as a linear interpolation along path 2507 based upon time.

In general, the list of related objects is sorted according to time then each successive pair of explicitly located objects in the list determine a path along which the other objects may be implicitly located by extrapolating their locations along the paths formed by the two objects that are greater than and less than they are according to time.

The examples above used a linear path between successive explicitly located objects, but it is possible to use other types of paths and extrapolate along them. For example, if the actual path taken by the person generating the content (i.e. taking the pictures) is known it is possible to extrapolate along that path instead of using a linear path. For example, it may be known that the person taking the pictures took a certain route through a street network, in which case that route should be used to extrapolate the implicit locations; such a route may be defined by a sorted list of line segments.

Furthermore, the examples presented above include performing a linear interpolation along the path based on time, but it is possible to use alternative distributions and/or rules that are not linear. For example, it is possible to use a rule wherein all pictures that are taken within 10 minutes of an explicitly located photograph are assumed to be in the same location.

FIG. 19 shows examples of using non-linear paths and non-linear time interpolation along those paths. In FIG. 6, photographs 2301 and 2305 have been explicitly located at locations 2601 and 2605. Additionally, it is known that during this time the person traveled along route 2606. Furthermore the implicit locations 2602, 2603, and 2604 are extrapolated along path 2607 using the rule that all photographs taken within 10 minutes of an explicitly located photograph are assumed to be in the same location as the explicitly located photographs.

It is important to note that the general method described above relies on the fact that the objects are sequenced and not upon the fact that they have time stamps. In the examples above the time stamps of the objects were used to create the sequence and to also extrapolate locations along paths, but it is possible to perform similar operations even if the objects did not contain time stamps. For example, it is possible for a user to create a sequence of pictures that are based upon personal choice and not upon any time stamps associated with the picture. In this case it is still possible to explicitly locate a subset of the pictures and implicitly generate locations for the other objects.

FIG. 20 shows an example of geocoding pictures that do not have time stamps, but are still part of a user defined sequence. In the illustrative example of FIG. 20, the pictures are related by the sequence, but they do not have any additional information (such as time) that allows the location to be extrapolated other than by distance along the path. Thus the implicitly located photographs 2702, 2703, and 2704 are evenly spread between the explicitly located photographs 2701 and 2705 based upon their distance along the path 2707 from 2701 to 2705.

If there does exist additional information that allows the photographs to be further related then it is possible to use this information to further refine their location extrapolation. FIG. 21 provides an illustrative example where the user has specified that photographs 2801, 2802, and 2803 were taken in the same place. In FIG. 21, photographs 2801 and 2805 are explicitly located and photographs 2802, 2803, and 2804 are implicitly located along path 2807. Since photographs 2802 and 2803 were related to 2801 to be in the same place they are located in the same place as 2801. Since 2804 does not contain any additional relation information it is located midway between 2801 and 2805 along the path 2807.

It shall be appreciated by those of ordinary skill in the art having the benefit of this disclosure that a number of different paths and extrapolations rules and/or equations could be used to generate implicit locations. It shall also be appreciated by those of ordinary skill in the art that the process of explicitly geocoding some subset of the photographs could use any of the sources of location information described above and that in principle the implicit geocoding process would still be the same. Thus, as long as there is some system or method to explicitly geocode some subset of related objects the remainder of the objects can be implicitly geocoded by generating paths between the explicitly geocoded objects and extrapolating locations along those paths based upon time.

In the illustrative example of a Chronicle or Narrative having a plurality of GLOBs that are displayed to a user, which is described above, the process of data collection and animation is not automated. An animated system and method for viewing a Chronicle, which is referred to as a "Virtual Tour", is described below.

A "Virtual Tour" is a visual and/or audio presentation of what one might experience if they were to visit some location. This presentation is typically rendered on some sort of electronic display or screen that is connected to a computing device such as a desktop or handheld computer.

Referring to FIG. 22 there is shown an illustrative Virtual Tour. The Virtual Tour shows one or more maps at various levels of scale 3105, 3106, 3107, and 3110 that clearly show to the user the geographic location of the tour. Although multiple scale levels are shown, only one scale level is required. The maps may be from aerial imagery, computer generated street maps, or any combination thereof.

The Virtual Tour contains images in the form of pictures and/or videos that show what the user might see and/or hear if they were to actually go to the locations indicated in the map. The images are being animated in the form of a slide show that is time sequenced. The pictures are being animated by thumbnails that are scrolling smoothly across the screen.

The maps show the location of the images that are currently being displayed in the slide show 3101. In the case of the highest resolution map 3110 the location of the images are shown by both markers on the map 3103 and pointers 3102, which point to those markers. This allows the user to easily see where the images are geographically located and what they might expect to see if they were at those locations.

In addition to the image animations there may be a route being drawn on the map 3104. A route is simply a time sequenced collection of geo-locations and can be animated by drawing the route on the map as the images scroll by (i.e. time elapses). It is important to note that the route could represent a specific tour and correspond to the sequence of images being shown.

The Virtual Tour may have a notion of time that is displayed to the user 3109. This notion of time is in relation to the content that is being animated, i.e. the images 3101. In this example the time being displayed corresponds to the time at which a proposed tour may be taken.

The virtual tour may contain a set of player controls 3108 that allow the user to control various aspects of the tour presentation such as playing/pausing, forward/reverse and a method to quickly move to certain time indices of the Virtual Tour. This is much like one might find on a Video player. In addition there may be keys or controls which allow the user to pan and zoom the various maps.

The Virtual Tour may contain icons or images superimposed on the map 3111 and 3112, which represent "Points of Interest" (POI). These points of interest may be businesses such as hotels and gas stations or they may be places which have some attraction such as a museum or a tennis club. Businesses such as hotels or restaurants may be sponsored by the business establishment and any images or information may be provided by the business itself. This might even include promotional items such as discounts or coupons.

As shown in FIG. 23, if the user selects one of the POI icons it may bring up additional information or even another Virtual Tour that is associated with the business or location represented by the icon.

Virtual Tours animate a synopsis of image sequences in order to allow the user to quickly and easily view the images and their locations. If the user so desired they could "drill down" and view more detail associated with a particular image or location. In the illustrative example provided in FIG. 22 this might entail getting a more detailed view of a picture. The user could do this by simply selecting the thumbnail of the picture and then the Virtual Tour would pause and a more detailed view of the picture displayed, as shown in FIG. 24.

The illustrative Virtual Tour is generated automatically by a remotely located Virtual Tour Server in response to a user specifying the type of tour they are interested in seeing.

FIG. 25 shows a Virtual Tour Server 3404 that creates a Virtual Tour that can be viewed on a variety of user viewing devices 3405 including mobile devices, desktop computers, video monitors (TV's), and in-vehicle systems such as navigation systems. The Virtual Tour Server 3404 is accessed by the user via some sort of wide area network such as the Internet 3403. The user specifies the type of Virtual Tour they want to view by indicating one or more factors that they are interested in such as: location of the tour such as a city or country; route to be taken; type of activities desired such as surfing, and other well-known activities; type of attractions, e.g. museums; specific events; date and time of the tour; and new tour based upon previous Virtual Tour.

A Virtual Tour is generated by the Virtual Tour Server by bringing together and displaying GLOBs such as images, maps and POI data 3401 from a variety of sources. This GLOB content is accessed via GLOB servers 3402 that are accessible via a wide area network 3403 such as the internet. The Virtual Tour Server combines all the GLOB content together and presents it to the user in a manner as described previously.

FIG. 26 shows is a more detailed depiction of the full architecture where there exists a Virtual Tour Server that generates the Virtual Tours. Users access the Virtual Tour Server from a variety of devices such as vehicle information systems 3813, desktop computers 3814, mobile devices 3815, and streaming video displays 3816. The Virtual Tour Server may be accessed over a variety of public networks 3812 such as the Internet.

Upon receiving a request from a user for a Virtual Tour the Virtual Tour Server collects a variety of GLOB content from various sources and dynamically generates the Virtual Tour. As previously discussed there exists a variety of GLOB content such as maps 3801, third party content 3803, user generated content 3805, and POI data and advertisements 3817. This content is managed by a variety of servers 3802, 3804, 3806, and 3807 and accessed via a network 3812. The Virtual Tour Server 3810 locates the GLOB content by submitting requests to the GLOB Resource Server 3809 and 3808. Upon getting a collection of GLOB Data Sheets from the GLOB Resource Server, the Virtual Tour Server accesses the GLOB content and uses it to produce a Virtual Tour. The Virtual Tour is then served up to the user that made the request for the Virtual Tour.

It is important to note that in some case it may not be necessary to dynamically generate a Virtual Tour if one satisfying the request has previously been generated and is stored in a Virtual Tour database 3811. In this case the Virtual Tour Server need only access and serve up the Virtual Tour without generating it. Such pre-produced Virtual Tours may exist as the result of users generating and storing their own Virtual Tours or perhaps as the result of a business related to a POI generating one to help promote their business. For example, a hotel may produce a Virtual Tour that can be shown to potential customers that are interested in staying at their hotel.

Turning now to FIG. 27 through FIG. 41 an automated vehicle (AV), such as an unmanned aerial system, an unmanned terrestrial system, an unmanned aquatic system, and/or the like (e.g., a "drone") can collect or geocode object data. For instance, the AV can be programmed to traverse a specific route or mission path and, as the AV traverses the route, the AV may collect object data (e.g., object photos, object video, etc.). Additionally, the AV may collect location data in association with the collected object data as the AV traverses the route. Thus, the AV may geocode the collected object data in real-time as the AV traverses the mission path. Furthermore, the AV may upload the collected object and location data to a data processing system, such as a chronicle server, as described herein, and the data processing system may geocode the object data.

Referring to FIG. 27, an illustrative AV system is described. More particularly, a system 2700 for collecting object data is shown. The system 2700 may include an AV 2709, an AV docking station 2711, a target 2706, a mobile target sensor 2708, a fixed target sensor 2710, a traffic control system 2712, a ground station 2714, a cloud station 2716, and at least one user interface (UI) devices, e.g., UI devices 2718 and 2720.

As used herein, an AV 2709 may include any type of vehicle that can move within the environment and which is capable of performing one or more tasks. An AV 2709 may perform tasks autonomously, with the assistance of a human operator or under the control of a human operator. AVs may include aerial vehicles, terrestrial vehicles, aquatic vehicles, and the like. By way of example and not of limitation, an AV 2709 may propel itself so that it is capable of autonomous operation, operating under the direction or control of a human operator, or operation based upon a specified, determined, or calculated trajectory or mission path.

An illustrative AV 2709 may interact with the environment, sense environmental conditions and objects, or recognize environmental objects. An AV 2709 may further communicate with one or more human operators or observers over a wireless or wired network. The AV 2709 may transmit in real time and receive a variety of information that includes, but is not limited to, an AV location, an AV operational state, environmental readings (e.g., detected objects, ambient conditions, and the like), a variety of AV data store information such as AV system logs, AV data logs, AV world model data, AV control commands, updates to various AV operational parameters, updates to various AV data stores such as AV world model data, or other such AV related information. An AV 2709 may, in various embodiments, utilize the data and instructions described herein to execute one or more mission plans.

An AV docking station 2711 may include a location or launch/landing pad from which an AV 2709 can depart and to which an AV 2709 can return. In various embodiments, a docking station 2711 may house an AV 2709 when the AV 2709 is not in operation. Moreover, in various embodiments, an AV docking station 2711 may provide shelter from the outside environment (e.g., an AV docking station 2711 may function as an AV hangar or garage). An AV docking station 2711 may include recharging systems for the AV 2709 as well as network interface systems that support uploading or downloading object data, mission data, location data and other such data.

An illustrative target 2706 may be an object that can be detected, identified, or tracked by the AV 2709. Illustrative targets 2706 may include human beings, various natural and manmade objects (such as levees, buildings, bridges and other structures), various types of equipment, various flora and fauna (such as trees, forests and animals) and other such targets that can detected, identified and tracked. In various embodiments, a plurality of targets may be tracked by the AV 2709.

In some instances, an AV 2709 may interact with or manipulate the target 2706. As described herein, an AV 2709 may detect or track a target with a variety of sensors suitable to permit the AV 2709 to distinguish the target 2706 from the environment, in which the target 2706 is disposed; such sensing system include cameras operating at visual wavelengths, sonar, LIDAR, infrared monitoring system, and other such sensing systems.

The mobile target sensor 2708 and fixed target sensor 2710 include illustrative target sensors that are apart from the target sensing systems carried onboard the AV 2709. The mobile target sensor 2708 may be mobile (e.g., movable by a human being, for example). The fixed target sensor 2710 may include a stationary target sensor, such as a camera or other sensor system fixed near a permanent or semi-permanent target.

The illustrative traffic control system 2712 may include any system that communicates with the AV 2709 or illustrative ground station 2714. More particularly, the traffic control system 2712 may be configured to provide traffic control information or instructions to AVs within its observation and communication range. By way of example and not of limitation, the traffic control system 2712 includes an air traffic control system.

The ground station 2714 may include any system capable of communicating with the AV 2709, the docking station 2711, the mobile target sensor 2708, the fixed target sensor 2710 or the traffic control system 2712. The ground station 2714 may communicate with the AV 2709 during operation of the AV 2709 or when the AV 2709 is docked in the docking station 2711. The ground station 2714 can communicate over a wired or wireless network with the AV 2709, depending, for example, upon the operational status of the AV 2709. Wireless communications protocols may include WiFi communications, cellular communications or any other suitable analog or digital wireless communications.

The AV 2709 can, in various embodiments, communicate with the ground station 2714 to transmit or receive any information necessary or useful to the performance of the AV 2709. Information collected by the AV 2709 includes, but is not limited to, telemetry information, mission information, control information, application specific information (such as photographs and/or video data collected by the AV 2709) or other such information that may be collected by the AV.

In an illustrative embodiment, the ground station 2714 may also communicate with the docking station 2711. The ground station 2714 may communicate over a wired or wireless network with the docking station 2711. The docking station 2711 may communicate with the ground station 2714 to transmit or receive any information necessary or useful to the performance of the AV 2709. Additionally, the docking station 2711 may also receive information collected by the AV 2709, such as telemetry information, mission information, control information, application specific information (such as photographs or video data collected by the AV 2709) or other such relevant information.

The ground station 2714 may also communicate with the mobile target sensor 2708 or the fixed target sensor 2710. More particularly, the ground station 2714 may communicate over any wired or wireless network with the mobile target sensor 2708 or the fixed target sensor 2710. The docking station 2711 may communicate with the mobile target sensor 2708 or the fixed target sensor 2710 to transmit or receive any information related to the performance of the mobile target sensor 2708, the fixed target sensor 2710 (e.g., target information), which may include photographs or video data collected by the mobile target sensor 2708 or the fixed target sensor 2710.

In various embodiments, the ground station 2714 may include a communications bridge between various system components (e.g., between the AV 2709 and a cloud station 2716, as described below). However, the ground station 2714 may implement one or more software applications; and these applications may be accessed directly by a systems operator at the ground station 2714 itself. The applications may also be accessed remotely by a systems operator via a cloud station 2716 or illustrative UI device 2718 or UI device 2720.

The cloud station 2716 may include any system capable of communicating with the ground station 2714 or the UI devices 2718 and 2720. In various embodiments, the cloud station 2716 implements wired or wireless communications, as described elsewhere herein. The cloud station 2716 may provide a web-based interface to each of the UI devices 2718 and 2720 so that the UI device 2718 and 2720 can communicate with the cloud station 2716. The cloud station 2716 can, like the ground station 2714, implement one or more software applications.

The UI devices 2718 and 2720 may include any device capable of interfacing, as described herein, with the ground station 2714 or the cloud station 2716. The UI devices 2718 or 2720 may include any mobile or wireless electronic device, such as one or more smart phones, one or tablet computers, and the like. The UI devices 2718 and 2720 may display a web-based user interface, which can include a software application hosted by the ground station 2714, the cloud station 2716 or resident on the UI devices 2718 or 2720.

In one illustrative embodiment, the UI device 2718 may be associated with an operator of the AV 2709, while the other illustrative UI device 2720 may be associated with an observer. The observer may interface with the UI 2720 to receive AV 2709 collected object data such as photographs or video associated with the target 2706. The operator may also interface with the UI 2718 to receive AV 2709 collected object data and to manage the AV 2709, to update or review a mission plan of the AV 2709, to monitor and control the AV 2709 during a mission, to analyze an AV 2709 mission, to analyze AV 2709 collected object data and location data, and to perform other similar operations.

Referring now to FIG. 28 there is shown an illustrative system 2800 having multiple AVs, namely, AVs 2809, 2811, 2806, 2808, and 2810 is shown. In general, although five AVs are shown at FIG. 28, any number of AVs may be implemented in the field to survey, track, and collect object data for any number of targets. Accordingly, each of the AVs 2809, 2811, and 2806 may communicate with the ground station 2812 or the traffic control system 2818.

In certain illustrative embodiments, the AV 2808 may communicate with the ground station 2814 or the traffic control system 2820. Additionally, the AV 2810 may also communicate with the ground station 2816 or the traffic control system 2822. The illustrative ground stations 2812, 2814, or 2816 may communicate with the cloud station 2824, which communicates with the observer or operator via UI devices 2826 or 2828. Thus, the illustrative system 2800 may include multiple AVs, multiple ground stations, multiple air traffic control systems, multiple cloud stations, multiple UI devices, multiple observers or operators, and the like. The cloud station 2824 may be communicatively coupled to each of the one or more ground stations, such as ground stations 2812, 2814, and 2816. Additionally, the cloud station 2824 may aggregate object data, location data, and other information provided to each of the ground stations 2812, 2814, and 2816 by the plurality of AVs 2809, 2811, 2806, 2808, and 2810.

Referring to FIG. 29 there is shown an illustrative block diagram of an AV subsystem 2900. The AV subsystem 2900 may include a variety of subsystems and sensor suites, such as an actuators and power subsystem 2902, an AV state sensors suite 2904, an AV environment sensors suite 2906, a communications subsystem 2908, or a system controller 2910. The AV system 2900 may be mounted to a mechanical frame, which includes a variety of AV components, such as AV propulsion mechanisms.

In various embodiments, the system controller 2910 executes instructions and processes data to operate the AV 2709 as well as all of the AV subsystems. By way of example and not of example, the system controller 2910 may process input data as well as perform a variety of AV control, AV mission execution, and data collection functions. In the illustrative embodiment, the communications subsystem 2908 can interface with the AV and other external systems and subsystems. Additionally, the AV state sensors suite 2904 can include all of the necessary components and/or sensors for sensing or detecting the state of the AV 2709, while the AV environment sensors suite 2906 can include all of the necessary components or sensors for sensing the environmental conditions surrounding the AV 2709. The actuators and power subsystem 2902 may include components for actuating AV mechanical components, such as propulsion devices and systems as well as components for powering the AV 2709, such as battery and other power systems. Each of the actuators and power subsystem 2902, AV state sensors suite 2904, AV environment sensors suite 2906, communications subsystem 2908, and system controller 2910 are described in greater detail below.

Actuators and Power Subsystem

To interact with and move within the environment, the illustrative AV 2709 may include a variety of actuators. The AV 2709 may also include one or more power or other energy sources; these power sources can supply power to various AV systems and subsystems. Illustrative systems and subsystems include, motor controllers 2912 and propulsion motors 2914 which can operate so that the AV 2709 is enabled to move within the environment. For example, where the AV 2709 includes a rotary aircraft, the actuators and power subsystem 2902 can include motors that drive propellers. With respect to terrestrial vehicles, the actuators and power subsystem 2902 can include motors for drive wheels and a steering mechanism. The motor controller 2912 can receive motion and attitude commands from the system controller 2910 and translate these into actual motor commands for various motors.

In various embodiments, the battery charge control subsystem 2916 and battery 2918 can power and control the charging of the battery 2918 as well as provide information to the system controller 2910 concerning the state of the battery 2918. The battery 2918 may include any suitable battery, such as a rechargeable battery and/or a disposable battery.

In various embodiments, the sensor gimbal controller 2920 and sensor gimbal 2922 can control a direction of focus for one or more environment sensors such as, for example, one or more cameras. The sensor gimbal controller 2920 can receive sensor attitude commands from the system controller 2910 and translate those commands into actual motor commands.

In various embodiments, the payload controller 2924 can control any payload 2926 the AV 2709 may be carrying. The AV 2709 can thus pick up or drop payloads 2926. The payload controller 2924 can receive commands from the system controller 2910 concerning payload 2926 disposition as well as translate those commands into an appropriate actuation event.

AV State Sensors Suite

The AV state sensors suite 2904 gives the AV 2709 the ability to sense its own state and can include a speed function 2928, a tactile/proximity function 2930, a movement and orientation function 2932, a heading function 2934, an altitude function 2936 or a location function 2938.

In various embodiments, the speed function 2928 can enable a speed measurement of the AV 2709 using any of a variety of speed measuring systems, such as air speed indicators or encoders on wheels. The tactile/proximity function 2930 can measure the proximity of the AV 2709 to various barriers, obstacles, surface, and the like. The tactile/proximity function 2930 can utilize various sensors, such as sonar, infrared, and/or other light detection and/or ranging (LIDAR) sensors. In some cases, a camera can be used.

In various embodiments, the movement and orientation function 2932 can enable a determination of the motion and orientation of the AV 2709. The movement and orientation function 2932 can employ various accelerometers and gyroscopes.

In various embodiments, the heading function 2934 can enable a determination of the heading of the AV 2709 within the environment. The heading function 2934 can utilize a compass.

In various embodiments, the altitude function 2936 can enable a determination of the altitude of the AV 2709. The altitude function 2936 can utilize an altimeter.

In various embodiments, the location function 2938 can enable a determination of the location of the AV 2709. The location function 2938 can utilize a Global Positioning System (GPS) or other positioning system, such as a beaconing or triangulation system.

AV Environment Sensors Suite

The AV environment sensors suite 2906 gives the AV 2709 the ability to sense and/or analyze the environment and can include traffic sensors 2940, 3D sensors 2942, navigation sensors 2944, surveillance sensors 2946 or target detectors 2948.

In various embodiments, the traffic sensors 2940 can be used to sense vehicle traffic in the vicinity of the AV 2709. In some cases, the traffic sensors 2940 can include one or more transponders configured to facilitate the communications with a local traffic system.

In various embodiments, the 3D sensors 2942 can be used to sense and create 3D profiles of the objects around the AV 2709. To this end, one or more "point clouds" can be created within the field of view of the 3D sensors 2942. A point cloud is simply a point (or area which may include a plurality of points) in 3D space with respect to the AV 2709 where it is known that some sort of object exists. The 3D sensors 2942 may include LIDAR, sonar, stereo cameras, and the like. The 3D sensors 2942 may be used for a variety of purposes including target detection, obstacle avoidance, navigation, location or mapping.

The illustrative navigation sensors 2944 may include any sensors suitable to enable the AV 2709 to accurately and safely navigate a trajectory. The navigation sensors 2944 may include the 3D sensors as well as any other sensors that can be used to detect and recognize certain landmarks within the AV environment.

In various embodiments, the surveillance sensors 2946 may be used to capture images which may be used by an operator and observer as part of a mission. The surveillance sensors 2946 may include one or more cameras and may use spectrums other than visible light such as infrared and ultraviolet depending upon the application. In various embodiments, the surveillance sensors 2946 and the navigation sensors 2944 may be bundled, or they may include a singular sensor or sensor suite.

In various embodiments, the target detectors 2948 may include any sensor or sensors suitable to identify specific targets in the AV environment. In some cases the target detectors 2948 may include the 3D sensors 2942. However, in some cases, the target detectors 2948 may be specific to target identification, such as sensors that are used to detect targets that have been "painted" with a laser pointer by an operator.

Communications Subsystem

As described herein, the AV 2709 is a mobile system and therefore supports a variety of wireless and wired communications systems and subsystems. The communications subsystem 2908 may support a variety of communications operations, such as for example, WiFi, cellular, or another analog or digital communications protocol suitable for the type of data being communicated. Wired communications protocols may include Ethernet, USB, and the like. The communications subsystem 2908 may also support a telemetry/control wireless communications channel 2950, a point of view (POV) wireless communications channel 2952 or a digital data wireless communications channel 2954.

In various embodiments, the telemetry/control wireless communications channel 2950 may be used to communicate AV telemetry and/or control information. The telemetry information includes any AV state information ranging from sensor values to vehicle parameters and state. This channel may also be used to send control information to the AV 2709 such as motion commands and mission parameters. This communications channel may also be used to transmit local traffic control information. The number of data points being transmitted over this channel may not be very large, so lower bandwidth wireless communications may be used for this channel.

In various embodiments, the POV wireless communications channel 2952 can be used to transmit sensor information that is used to sense the environment by the AV 2709 and is sent to the ground and cloud stations as part of a mission. The sensor information may include imaging data, such as data which might be produced by a camera that provides operators and observers the POV of the AV 2709 as part of a mission. This channel can be used to transmit analog video data. An illustrative use of this data might be remote surveillance by the operator or observer.

In various embodiments, the digital data wireless communications channel 2954 can include any channel suitable to support higher bandwidth digital data and may be used to transmit any type of information including telemetry/control and/or POV data.

System Controller

Referring to FIG. 30 there is shown a block diagram of an illustrative system controller 2910. The illustrative system controller 2910 may include one or more customized or customizable integrated circuits/processors or can be implemented using standard processors and off the shelf electronics. The system controller 2910 may run any suitable operating system, such as, for example, an Ubuntu OS and/or the Robot Operating System (ROS). The software functionality of the system controller may be partitioned into one or more groups of software functionality or software modules, such as a perception module 3002, a mission control module 3004, a sensing module 3006, and/or a data functionality module 3008.

Perception Module

The system controller 2910 can receive information from the various sensors as well as preprocessing data from, for example, the sensing subsystem 3006. The system controller 2910, or a perception module 3002 of the system controller 2910, can further process the received data to perform processes or functions such as data augmentation, target detection, recognition, and tracking, mapping, obstacle detection, recognition, and tracking, and/or traffic detection.

In various embodiments, data augmentation can include generating and adding additional visual information to images and video that may be streamed to the operator and observer. Examples of data augmentation may include superimposing other data on images or video.

In various embodiments, target detection, recognition, and tracking can include identifying and tracking targets of interest within the field of view of the AV 2709. Various software and data processing techniques can be used, such as, for example, OpenCV or OpenVX.

In various embodiments, mapping can include updating the world model of the AV 2709 using data from the environment sensors 2906. Mapping can include simultaneous localization and mapping (SLAM) techniques.

In various embodiments, obstacle detection, recognition, and tracking can include detecting obstacles within the vicinity of the AV 2709. This can be similar to target detection, recognition, and tracking, except that it may not be necessary to recognize the obstacle as a target of interest. Physical objects that may impact the performance of the AV 2709 during one of its missions can be identified. In various embodiments, it may not be necessary to identify such objects however, because all that may be needed is to recognize the existence and location of an obstacle. Thus, this process may use simpler sensors and techniques than the target detection, recognition, and tracking processes described herein.

In various embodiments, traffic detection can include detecting other vehicle traffic in the vicinity of the AV 2709.

Mission Control Module

As used herein, a "mission" may include the following general tasks: (1) route planning and navigation, (2) tasks performance along routes including payload management, and (3) data acquisition along routes, wherein data may be both logged and streamed to one or more ground stations in real time and/or pursuant to a timing delay.

Mission control functions may be executed by the mission control module 3004 and may include executing a mission plan and the management of various AV 2709 activities during a mission. A mission may be specified by processes or occurring (or submodules executed) in the following hierarchical fashion: (1) planner process/submodule, (2) specifier process/submodule, and (3) pilot process/submodule. The planner process specifies objectives to be achieved by the AV 2709, including dates and times for achieving specified objectives. By way of example and not of limitation, the objective is to travel to location X and perform task Y at time T.

The specifier process may generate a detailed specification that indicates how mission objectives generated in the planner process are to be achieved. An example specifier process is the generation of a specific trajectory for the AV 2709 to get to location X.

The pilot process can generate detailed AV specific instructions that indicate how to execute the specification generated in the specifier process. These instructions can be dependent upon specific dynamics and capabilities of the AV 2709 and can require a detailed model of the AV 2709 in order to be executed.

In addition to information flowing from the planner process, to the specifier process, and on to the pilot process, information may also flow from the pilot process up to the specifier process or up to the planner process. Upward flow can indicate whether various milestones and tasks are being achieved. If objectives are not being met, then the mission control module 3004 takes appropriate action to change the mission plan. Some of the scenarios that may cause a plan to change include unforeseen obstacles, vehicle traffic in the vicinity of the AV 2709, inability to perform various tasks, malfunction of AV 2709, and the like. In various embodiments, the mission control module 3004 can coordinate activity with a third party traffic control system.

Sensing Module

The system controller 2910 can include a sensing module 3006 which may be configured to perform sensing functions. Sensing functions may be based upon received sensory data, such as sensory data from the internal operations of the AV (e.g. remaining AV battery charge) or sensory data captured by the AV (e.g. video captured by AV camera). The system controller 2910 may perform various processes in association with the sensing functions 3006 such as a localization process, an image processing process, or an AV state sensing process.

The localization process may include locating the AV 2709 within some frame of reference outside the AV 2709. For example, localization can be based upon an earth reference and GPS coordinates, but in other cases it can be part of a SLAM process in which the AV 2709 is localized with respect to objects within its environment. An example localization process is identification of a target, such as a landing pad and localization of the AV 2709 with respect to the landing pad. In various embodiments, there may be beacons installed in the AV 2709 environment, and triangulation or trilateration can be performed to localize the AV 2709 with respect to the beacons.

The image processing process may include performing one or more image processing steps on one or more images, such as images received from the various environment sensors (i.e. cameras), as described herein. Image processing can include the application of various low level filters, transforms, and/or feature extraction processes. Image processing can be performed using software such as OpenCV or OpenVX.

The AV state sensing process may process data received from one or more AV sensors, as described herein, to determine or analyze a state or condition associated with the AV 2709. AV state sensing may include sensor data filtering and sensor data fusion between multiple sensors.

Data Management and Memory Modules

The AV 2709 can store a variety of information. The data stores or memory modules 3008 onboard the AV 2709 may be implemented as tangible, non-transitory, computer-readable storage media. The memory modules 3008 may be communicatively coupled to the system controller 2910, which can include one or more processors. The memory modules 3008 can include instructions that, in response to execution by the processor (or system controller) cause the processor/controller to perform operations and processes as described herein.

In an illustrative embodiment, the AV 2709 may include various memory modules 3008, such as a world model data store and/or log data stores. World model data stores can include a representation of the environment in which the AV 2709 operates. World model data stores can include 2D and/or 3D map databases of the AV 2709 environment. The world model data stores can also include a model of the AV 2709 itself including its operational capabilities and constraints. Log data stores may include the data the AV 2709 generates or collects, such as landscape data or object data (e.g. object photographs). Log data may include AV state information, system operation logs or sensor data such as images and video.

Data management tasks can, in various embodiments, include remote access/control, data streaming or data logging. Remote access/control can include management of data originating with the AV 2709, such as remote control commands or data and parameters which are sent to the AV 2709. Data streaming may include streaming data such as telemetry and/or images/video to the ground station. Data logging can include logging of data to the AV memory modules 3008.

Ground Station

Referring to FIG. 31 there is shown a block diagram of an example ground station 2714 is shown. The illustrative ground station 2714 includes a data interface module 3113, a data management module 3115, a core functions module 3117 and an applications module 3119.

Data Interface Module

The data interface module 3113 provides communications to the AV 2709, docking station 2711, traffic control system 2712, and/or fixed target sensor 2710. These communications can include wireless (or wired) communications, as described herein, and may utilize readily available wireless technology such as WiFi, cellular, low bandwidth telemetry and/or analog video communications.

Data Management Module

In various embodiments, the ground station 2714 can manage a wide range of data. The data management module 3115 can include one or more database, such as a world model database, a data logs database, a video logs database, an asset database, and/or a user database. The ground station 2714 can process routing data between a variety of components, and in some instances, this may be the only function performed by the ground station 2714.

In various embodiments, the world model database can include a representation of and/or data about the environment in which the AV 2709 operates. The world model database can include a 2D and/or 3D map database of an AV environment as well as a model of the AV 2709 itself (including, for example, AV operational capabilities and constraints)

By way of example and not of limitation, the data logs database can include telemetry data from the AV 2709 and system operation logs. Additionally, the video logs database may include image and/or video data streamed from the AV 2709 to the ground station 2714. Furthermore, the asset database can store attributes of the various assets or objects, including, for example, AV 2709 data, docking station 2711 data, and the like. In various embodiments, the user database stores operator information.

Core Functions Module

The ground station can perform various core functions (e.g., via the core functions module 3117), such as traffic detection functions, telemetry processing functions, remote control functions, video server functions, augmented reality functions, image processing functions, or mapping functions.

In at least one illustrative embodiment, the traffic detection functions can include detecting vehicle traffic in the vicinity of the ground station 2714. The telemetry processing functions may include receiving and processing telemetry data from one or more AVs. The remote control functions may include processing data to allow an operator to remotely control an AV 2709. In various embodiments, the video server functions can include streaming images (from one or more video servers) and video from the AV 2709 and/or ground station 2714 to operators and/or observers.

Augmented reality functions include superimposing additional information on images and/or video collected by the AV 2709 for review by one or more operators and/or observers. Image processing functionality includes processing data (e.g., images) received from one or more AVs. Various image processing techniques can be applied, including, for example, application of various low level filters, transforms, and/or feature extraction processes. Mapping functions may include updating the world model using data collected by one or more AVs. For instance, mapping functions can include compiling mapping data collected by one or more AVs into a centralized world model for all AVs.

Applications Module

The ground station 2714 may include an applications module 3119, which can provide one or more applications that may be used by the operator or the observer. For example, the applications module 3119 may provide traffic management functions, asset management functions, ground controller functions, mission planning functions, mission control functions, mission analysis functions, and/or remote surveillance functions.

Traffic management functions can include coordinating the movements of one or more AVs in the vicinity of the ground station 2714. Traffic management functions can attempt to avoid vehicle collisions as well as to optimize and coordinate vehicle movements.

Asset management functions may include managing the physical assets, such as at least one AV, at least one ground station, at least one docking station, and the like. Asset management may include managing the configuration of such assets. Ground controller functions may include an application that can be used to by an operator to control or monitor one or more AVs.

Mission planning functions may include various planning activities that can be performed by an operator in preparation for a mission. Mission control functions can include executing and/or monitoring a mission. For example, mission control functions may include monitoring AV state information, viewing streams of images or video from at least one AV. Mission control functions may also include some remote control and input by an operator. Mission analysis is performed after a mission is complete and can include analysis of the mission or replaying various telemetry data streams that were collected during the mission.

Remote surveillance may include viewing streams of images and video from one or more AVs. Remote surveillance can occur in real time and/or after a time delay, such as in response to completion of a mission.

Cloud Station

Referring to FIG. 32 there is shown a block diagram of an illustrative cloud station 2824. The cloud station 2834 may include many of the same functions (e.g., data management functions 3202, core functions 3204, and applications functions 3206) that are included in the ground station 2714 as described above.

The illustrative cloud station 2824 includes a ground station interface 3200 and a web user interface 3208. The ground station interface 3200 can open and maintain a communications interface between the cloud station 2834 and one or more ground stations, e.g., ground stations 2812, 2814, and/or 2816. A web-services interface (e.g., a web-based interface methodology or program module) can be implemented in the ground station interface 3200 to facilitate communications with the one or more ground stations 2812, 2814, and/or 2816. The web-services interface may be implemented using methodologies such as SOAP, REST, JSON, and the like. The web-services interface can further implement a web-based security mechanism.

The cloud station 2824 may aggregate information received from the multiple ground stations 2812, 2814, and/or 2816. The cloud station 2824 may include a web-based interface 3208, which can open and maintain a communications interface between the cloud station 2834 and one or more UI devices, e.g., UI devices 2718 and 2720.

Target Detection and Recognition

As described herein, a target can include any object within the vicinity of the AV 2709 that can be detected by the AV 2709. Such objects can be human beings, specific pieces of equipment, manmade structures (such as buildings, bridges, levees, etc.), natural features (such as trees, rivers, shorelines, etc.), and the like. Accordingly, with reference now to FIG. 33, a basic process 3300 for target detection and recognition is shown.

In various embodiments, the AV 2709 can receive data from one or more environment sensors (e.g., environment sensors 2906). The data received from the environment sensors 2906 can, as described herein, include target or object data, such as one or more images and/or video data associated with an object. The AV 2709 can therefore capture or collect the object data (step 3302). The AV can further communicate the captured or collected target data to a ground station (e.g., ground station 2714) and/or a cloud station (e.g., cloud station 2716). The AV 2709 can process the received target data, such as with one or more image processing techniques and/or using software modules, as described herein (step 3304).

The AV 2709 can, in various embodiments, and as described herein, extract features from the target data, such as edges, corners, various shapes, various identifying information, and the like (step 3306). The AV 2709 can further, in various embodiments, and as described herein, match various features extracted from the target data (step 3308). For example, the AV 2709 can receive target model data (e.g., target model data describing established target model data characteristics) and, in response to receiving the target model data, compare the features extracted from the collected target data to the target model data to detect and/or identify one or more targets and/or target features (step 3310).

Any of the data produced at steps 3302-3312 can be communicated to and/or logged in the AV 2709. Moreover, AV state and localization data (as described with respect to AV sensing module 3006) can be fed into any of the steps 3302-3312, as appropriate.

In various embodiments, AV 2709 can further estimate the target pose (step 3312). As used herein, a target "pose" includes the target location in space with respect to the AV 2709, the target attitude and orientation with respect to the AV 2709, and/or the target motion vector with respect to the AV 2709. Target pose can be detected and/or identified by any sensor disposed onboard the AV 2709 that is capable of discerning the target pose (e.g., the target location in space and/or the orientation of the target with respect to the AV 2709). For example, the target pose can be detected, recognized, and/or identified by any of the sensors included in the environment sensors suite 2906, such as, in various embodiments, a surveillance camera or cameras 2946 and/or a target detector 2948. One or more computer vision algorithms (or image processing techniques) can be applied to detect, recognize, identify, and/or track targets and/or target pose as well.

It should be apparent to one skilled in the art that the functions described above can be implemented using a variety of well-known computer vision and image processing techniques including Convolutional Neural Networks (CNN).

Target Specification

To assist the AV 2709 in detecting and recognizing targets, a target specification can be generated. The target specification can include a target model, which can be stored as part of a target model database or store (which can, in various embodiments, be stored as part of the data module 3008). As described above, a target model can include a variety of target data, such as data about target dimensions, target properties, target resolution, model target images associated with various sensor readings (e.g., model target pictures or photographs, model target video), and/or any other data that can be used to detect and/or identify a particular target, such as, for example, by comparing the model target data to collected target data.

The target specification can further include a specification of or parameters for the area within which the target can be located by the AV 2709. The target specification can be very precise (e.g., the target coordinates can be specified or a range of target coordinates can be specified) or more general (e.g., the target coordinates can include a number of possible target locations, such as a probability distribution associated with a variety of possible target locations and identifying the likelihood or probability that a particular target location will include the target). Target locations or coordinates can be specified in earth and/or AV 2709 frames of reference. The target model store can, in various embodiments, include a variety of target models, where each target model is associated with a particular target or targets.

A target specification can be provided as part of a mission plan and/or based upon a selection input by an operator. An operator can specify a target prior to and/or during AV 2709 operations. A mission plan can include additional information related to the location of a particular target (e.g., the mission plan can include information about the location of a target that is input by the operator).

In various embodiments, an operator can select a target from an image or video stream provided by the AV 2709 during operation. An operator can further select a target from an image or video stream collected form a mobile target sensor (such as the mobile target sensor 2708). The mobile target sensor 2708 can include any device having one or more cameras and data processing capability, such as a mobile phone, a tablet, and the like. An operator can, in various embodiments, identify or "paint" a target by shining a device such as a laser on the target. The AV 2709 can detect the reflection from the painted target to identify the target. The target painting device can be a handheld device and/or part of a fixed targeting station within the vicinity of the AV 2709.

Where an operator wishes to select a target from an image or video stream, a computer vision or image processing algorithm can identify possible targets within the image or video stream for selection by the operator. Possible targets can be displayed for the operator at the operator's UI device 2718. A computer vision and/or image processing algorithm can run on any of the fixed target sensor 2710, the mobile target sensor 2708, the ground station (e.g., the ground station 2714), and/or the cloud station (e.g., the cloud station 2716).

The AV 2709 can receive a variety of data in response to selection of a target (e.g., selection of a target by an operator and/or within a predefined mission plan). For instance, the AV 2709 can receive a target identifier that will allow the AV 2709 to match collected target data (e.g., data collected by an environment sensor on the AV 2709) to a specified target model. The AV 2709 can further receive a target location and/or an area or list of locations within which the target may be located. The AV 2709 can further receive specific target attributes, such as, for example, in addition to one or more generic target attributes which may already be stored in the target model store. Where a selected target is not associated with a particular target model in the target model store, the target model for the selected target can be derived using the image processing and/or computer vision algorithms used to identify the target, and this model can be provided to the AV.

AV Control Based upon Target Specification

The position and trajectory taken by the AV 2709 may be based upon one or more target objectives. Target objectives represent a desired spatial relationship between the AV 2709 and the target. Target objectives may include a location or orientation of the AV 2709 in relation to the target, a particular time, or at a particular location in the AV 2709 trajectory or mission path. Target objectives can further include speed, heading, or any other spatial or desired physical relationship between the AV 2709 and the target. The location of the AV 2709 can be specified in a number of different coordinate systems including, but not limited to, in Cartesian coordinates and polar coordinates. A trajectory can be described by a plurality of locations. Thus, an AV 2709 can follow a trajectory by moving from one specified location to the next in a series of specified or consecutive locations. Additional target objectives may include an attitude of the AV at each location, an indicia of motion (e.g., a directional velocity vector or non-directional magnitude of speed), which can include roll, pitch and/or yaw at each location, or an altitude.

Target objectives may be specified as part of a predetermined mission plan or they may be sent as real time commands to the AV 2709 by the operator as part of a remote control operation. In various embodiments, an operator can provide an instruction to the AV 2709 to follow a preselected or predetermined trajectory or path, such as in response to detection of a target.

Referring now to FIG. 34 there is shown an illustrative AV 2702 and target 3404, in which an operator can provide remote instructions to an AV 2709 to fly in a certain relation to a target 3404. The illustrative AV 2709 may receive instructions to maintain a particular distance 3406 from the target 3404, a particular angle of approach 3408 in relation to the target 3404, a particular spatial orientation in relation to the target, a particular speed or heading in relation to the target, and the like. Moreover, target objectives can be based upon, or updated based upon, a target pose. For instance, it may be desirable to instruct the AV 2709 to approach a particular target from a selected angle. The target pose can be detected, and if the AV 2709 is approaching the target from an angle that is not the desired angle, the target objective for the AV 2709 can be adjusted or selected such that the AV 2709 is maneuvered to approach the target from the selected angle.

By way of example and not of limitation, an operator may utilize a plurality of joysticks to provide such instructions to the AV 2709. In various embodiments, the pilot submodule in the mission control module 3004 can supply these parameters to the AV 2709 for execution.

Referring to FIG. 35 there is shown an illustrative control system diagram 3500 for the pilot submodule in the mission control module 3004. Accordingly, one or more target objectives 3502 may be input to a trajectory control module 3504. The trajectory control module 3504 can establish a set of positions within the frame of reference of the AV 2709 based upon one or more target objectives, as described herein, and/or based upon the target pose 3501. The trajectory control module 3504 can further compare the target pose 3501 with the target objectives to establish a desired AV trajectory. For example, where the target is stationary with respect to the AV 2709 and the target objectives indicate that the AV 2709 is desirably situated 20 meters from the target 3408, the trajectory control module 3504 can calculate the trajectory to be taken by the AV 2709 such that the target objectives are met based upon the measured target pose 3501.

The position control module 3506 may receive an output generated by the trajectory control module 3504 (e.g., the calculated trajectory) and/or the target pose 3501, and in various embodiments, can determine an AV 2709 attitude suitable to achieve the mission objective or objectives. The attitude control module 3508 can receive an output generated by the position control module 3506 (e.g., the calculated attitude), and in various embodiments, can determine a desired rate of change for the attitude of the AV 2709. The rate control module 3510 can receive an output generated by the attitude control module 3508 (e.g., the calculated rate of attitude change) and can translate the calculated rate of change of the attitude of the AV 2709 into one or more specific motor control commands. The one or more motor control commands can be output to the motor controller 3512 of the AV 2709.

In various embodiments, any of the trajectory control module 3504, the position control module 3506, the attitude control module 3508, and/or the rate control module 3510 can receive feedback, such as AV state data, from an AV state estimation module 3514. AV state data can be updated on a periodic basis by a variety of sensors, such as the sensors included in the AV state sensor suite 2904. Furthermore, each of the modules 3504 through 3510 can compare its input signal (received from the preceding control module) to the AV state data to determine an appropriate output signal. Each control module can further implement any suitable feedback model or control methodology, such as proportional-integral-derivative (PID) control, linear-quadratic-regulator (LQR) control, extended Kalman filter (EKF) control, and the like.

Thus, the AV 2709 can be programmed or controlled such that the AV 2709 is physically situated relative to a target based upon one or more target objectives and the target pose. For instance, the AV 2709 can be programmed or controlled to approach a target at a selected angle, at a selected velocity or speed, at a selected altitude (if the AV 2709 is airborne), and the like. The AV 2709 can therefore collect target data (or object data) in conformity with mission objectives and target pose. For example, where a target includes a structure having side A and side B, and where side B includes the target objective, an operator can program or control the AV 2709 to approach the structure from side B for target data collection. Moreover, where, for some reason, the AV 2709 approaches the structure from side A (as a result, for example, of changing mission parameters), the AV 2709 can be programmed or controlled, based upon the detected target pose and updated mission objective, to circle the structure until side B is in view and can be photographed or otherwise surveilled.

Example: AV Control Based upon Target Specification

Referring now to FIG. 36, an example is provided in which a plurality of AVs 3602, 3604, and/or 3606 can be used to detect one or more targets 3608. Accordingly, in various embodiments, the AVs 3602, 3604, and/or 3606 can be used to detect targets under the surface of a body of water, such as one or more fish 3608 under the surface of a body of water.

The AV 3602 may include an airborne AV. The AV 3604 can include a surface vessel, such as a boat. The AV 3606 may also include a submersible vessel, such as a submarine.

As described above, each AV 3602, 3604, and/or 3606 can communicate (e.g., wirelessly) with a UI device 3610, which can be in the possession and control of an operator. The operator can be located on a boat 3612, such as a fishing or other target tracking boat.

A target specification can be provided to each of the AVs 3602, 3604, and/or 3606. As described above, the target specification may include one or more target models and/or one or more target locations (or possible target locations). The target locations can, in various embodiments, include all of the locations within a specified range or radius of the boat 3612.

The target model for a fish may describe the shape of a fish or a profile of a fish. The profile of the fish may include a variety of profile views, such as a profile view of a fish viewed from a variety of angles or distances by an AV that is under the surface of a body of water with a fish. The profile view of a fish may also be viewed from a variety of angles and/or distances by an AV that is floating on the surface of a body of water above a fish. Additionally, the profile view of a fish may be viewed from a variety of angles and/or distances by an AV that is airborne and looking down through the surface of a body of water at the fish. Thus, each AV 3602, 3604, and/or 3606 can have available a plurality of profile views of a fish.

As described above, each of the AVs 3602, 3604, and/or 3606 can utilize the fish target models to detect, recognize, and/or identify one or more fish. This is accomplished by scanning the body of water within the specified location(s) and comparing, using computer vision techniques or image processing algorithms, the collected target or object data to the one or more fish target models. A fish (or a plurality of fish) can therefore be identified.

In response to identifying one or more fish, the AV 3602, 3604 or 3606 can communicate the collected target data as well as the location of the AV 3602, 3604 or 3606 to the UI device 3610 or to a ground station or cloud station (such as a ground or cloud station disposed on the boat 3612). The AV 3602, 3604, or 3606 and ground or cloud station can further geocode, as described herein, the target data. Thus, the target data (e.g., a photograph of a fish) can be geocoded with an AV location.

The geocoded target data can be displayed by the UI device 3610 for review by the operator of the device 3610. The device 3610 (and/or the AV 3602, 3604, and/or 3606 and/or a ground or cloud station) can apply one or more computer vision or image processing techniques to the target data to highlight or otherwise augment the target data. For example, the target data can be augmented by outlining the target (i.e., the fish) with a profile selected from the specification and target model store provided to the AV 3602, 3604, and/or 3606. The profile used to augment the target data can be the profile that the AV 3602, 3604, and/or 3606 matched, as described above, to the target data. A visual or audible alarm can also be sounded in response to detection of a target object.

In various embodiments, one or more of the AVs 3602, 3604, and/or 3606 can detect or identify a target pose associated with the identified target object. The target pose can include, for example, an orientation of the fish with respect to the AV 3602, 3604, and/or 3606. The AV 3602, 3604, and/or 3606 can, in response to the target pose and/or one or more target objects, maneuver to obtain a selected or programmed relationship between the target and the AV 3602, 3604, and/or 3606. For example, where the fish is swimming away from the AV 3602, 3604, and/or 3606 (such that the AV has a longitudinal view of the fish), the AV 3602, 3604, and/or 3606 can maneuver about the fish to obtain, in accordance with the target objectives, a side or latitudinal view of the fish.

In various embodiments, the one or more AVs 3602, 3604, and/or 3606 can simply relay target data to the UI device 3610, and the operator can visually inspect the incoming target data to identify fish. The AV 3602, 3604, and/or 3606 can supply its location to the UI device 3610, so that when the operator sees fish in the target data, the operator can drive the boat 3612 toward the location of the AV 3602, 3604, and/or 3606 and fish.

Communication Control

With returning reference to FIG. 27, the system 2700 includes a variety of networked devices. For example, the AV 2709 is networked with the ground station 2714 and/or the traffic control system 2712. The docking station is likewise networked with the ground station 2714, and the ground station 2714 is networked with the traffic control system 2712, the docking station 2711, the AV 2709, the fixed target sensor 2710, the cloud station 2716, the UI device 2718, and/or the UI device 2720. The cloud station 2716 is similarly networked with the ground station 2714, the UI device 2718, and/or the UI device 2720.

Therefore, and with reference to FIG. 37, a UI device 3702 having an interface 3704 configured to receive a data transfer speed input is shown. The data transfer speed input can include a specific frame rate (e.g., a frame rate specified in frames/second) and/or the data transfer speed can be selected using a slider 3706. An operator can adjust a network data speed using the interface 3704. For example, an operator can specify a particular frame rate using the slider 3706. An operator can adjust a frame rate based upon a variety of factors, such as latency or choppiness experienced in the reception of object data, a need for greater detail or faster streaming video, application requirements, and the like.

A frame rate or data transfer speed can also depend upon factors such as the location of an AV 2709 as it traverses a route, target acquisition, AV system state, date and time, and the like. For example, a data transfer speed can be increased in response to an AV 2709 reaching a target location and/or decreased prior to target location acquisition. A data transfer speed can also be increased or decreased in response to target acquisition by an AV environment sensor. A data transfer speed can also be adjusted in response to a change in AV state, such as a malfunction in a particular environment sensor. A data transfer speed can, in addition, be adjusted (e.g., increased or decreased) based upon a particular date and/or time (e.g., a data transfer rate can be increased prior to an AV launch date and time, so that the AV 2709 is prepared to stream data over the network at a preferred or selected transfer rate during a mission).

An indicator 3708 in the interface 3704 can display a variety of data, such as instantaneous frame rate, selected frame rate, total data streamed during a particular mission, and the like. In various embodiments, a frame rate and/or data transfer speed can also be specified as part of a mission plan (e.g., as part of a target specification).

In various embodiments, a frame rate or data transfer speed can vary across the network. For example, a data transfer speed can include a first speed between the ground station 2714 and cloud station 2716 and a second speed between the cloud station 2716 and the UI devices 2718 and/or 2720. Various data transfer speeds can therefore be established between various network components as part of a mission plan and/or using the interface 3704, where the interface 3704 can be configured to receive a selection of a network path and a data transfer speed for the selected path.

AV Target Chronicling

With reference to FIG. 38, a system 3800 for collecting and geocoding object data (such as target data) is shown. The system 3800 can therefore include a data object (or target) chronicling system. In various embodiments, the system 3800 includes the system 2700, except that a chronicle server 3802 is included. The chronicle server 3802 can be communicatively coupled (wirelessly or via a wired connection) to the ground station 2714 and/or to the cloud station 2716. In various embodiments the ground station 2714, the cloud station 2716, and/or the AV 2709 can function as the chronicle server 3802. Otherwise, system 3800 can function like system 2700, as described above.

As described above, a chronicle is a collection of GLOBs that are organized according to time and location and which may be animated. A chronicle is a multi-resolutional depiction of a plurality of GLOBs, each GLOB indexed in some way with respect to time and/or location. A chronicle can include a map display where a plurality of time sequenced GLOBs are displayed such that the geographic location of each GLOB is referenced on the map display. A synopsis of the GLOB content as it changes over time can also be shown as part of the chronicle.

In various embodiments, an object or, in certain cases, a target, may include an "asset." As used herein, an asset is any object which can be inspected by an AV 2709. More particularly, and in various embodiments, an asset can include any object, such as a manmade and/or natural object (e.g., a fences, a levee, a building, a bridge, a power line, a shoreline, an erosion controlled zone, a habitat, and the like) which requires or is subject to inspection and/or periodic inspection. The inspection can include a visual inspection by the AV 2709. As used herein, a chronicle associated with an asset may be referred to as an "asset chronicle."

An asset chronicle can be generated such that object data recorded by the AV 2709 (e.g., photographs and/or video) is collected, geocoded, stored, and made available to a user for review and, subsequently, asset inspection and/or evaluation. The AV 2709 can be particularly useful where an asset is in a hard to reach location, in a geographically isolated location, and/or spans a geographically extended location. For example, the AV 2709 can collect and log object data for an asset over an extended region, such as over a length of shoreline, over an expanse of a levee, over a region of habitat, about the rim of an active volcano, along a city street, and the like.

An asset chronicle can therefore include a plurality of GLOBs, where each of the GLOBs can include object data and associated time and location data collected by the AV 2709. Each GLOB can, in various embodiments, be associated with a GDS, as described above. However, in various embodiments, no GDS is included with the GLOB data comprising an asset chronicle. In either instance, each of the GLOBs comprising a data chronicle can be indexed and accessed by an operator and/or observer from a UI device 2718 and/or 2720 based upon the time and/or location associated with each GLOB.

Moreover, as described above, because an asset chronicle can include an animated series of time sequenced GLOBs (e.g., a slide show), the asset chronicle can suggest or convey a notion of time, which can be displayed for a user at the UI device 2718 and/or 2720. The notion of time can be displayed in relation to a plurality of GLOBs (or data objects, such as geocoded photographs taken by the AV 2709 during a mission). The system 3800 can, accordingly, display the asset chronicle for user as a series of time sequenced GLOBs as, for example, part of a slide show.

In addition, the map display associated with the asset chronicle can show a time and/or location associated with a particular GLOB in the asset chronicle. The map display can further include a variety of map resolutions (ranging from a world map to a variety of increasingly more localized or specific maps), and each GLOB can be represented in a map display by a marker and/or pointer, such that an operator or observer can easily perceive a geographic location associated with a particular GLOB.

An asset chronicle can be further animated in terms of the route taken by the AV 2709 during data object collection. For example, a route, comprising a time sequenced collection of GLOB locations, can be animated or otherwise shown on the map display by plotting or drawing the route on the map display as the time stamp associated with each GLOB in the asset chronicle advances. The route can thus represent the route taken by the AV 2709 when the object data was collected and/or a future route of the AV 2709.

A map display can include a set of control functions, each of which can permit an operator and/or observer to adjust or control an aspect of the chronicle playback. For example, the map display can include fast forward and rewind functions, a pause function, a stop function, a play function, and the like. An operator and/or observer can further drag a pointer or icon displayed over the map display along a route to select a particular GLOB and/or GLOB location, which may cause the map display to display the GLOB (e.g., the image) associated with the selected route location as part of a GLOB view or imagery view.

An operator and/or observer can further "drill down" within a particular GLOB (e.g., zoom in on the data object) to view a more detailed version of the object data (e.g., a zoomed in photograph). In various embodiments and operator and/or observer can drill down by selecting a particular GLOB, which can cause pause the time sequenced GLOB animation and open a more detailed view of the GLOB.

Accordingly, with reference to FIG. 39, a process 3900 for collecting and geocoding object data (such as target data) is shown. The process 3900 can therefore be used to generate an asset chronicle.

In various embodiments, and as described above, the AV 2709 can receive a mission specification, which can include, for example, one or more target objectives, one or more target or asset locations, one or more locations at which to collect a data object (e.g., a photograph), one or more targets to photograph, and the like (step 3902). An operator can select a mission for upload to the AV 2709 in any suitable fashion. For instance, the operator can select a mission from a dashboard displayed in the operator UI device 2718. This can be done by a remote operator and/or a field operator, depending upon the location of the operator, since in either case, the operator can communicate with the AV 2709 via the network described herein. The operator can further select a mission using an application installed on the operator UI device 2718, where the application communicates with the AV 2709 over the same network that is used to remotely (directly) control the AV 2709 in the field. The operator can, in addition, select a mission using an interface disposed in the AV 2709 itself.

The AV 2709 can, at a predetermined date and time and/or in response to a command transmitted by the operator, launch, and based upon the mission plan, the AV 2709 can traverse a programmed route (step 3904). As the AV 2709 traverses the route, the AV 2709 can collect object data (step 3906). The collected object data can be associated with any object along the route traversed by the AV 2709, including, in various embodiments, target data. The collected object data can, as described herein, serve as a basis for an asset chronicle.

The AV 2709 can further, as the AV 2709 traverses the programmed route, collect location data in association with the object data. (step 3908). For instance, and as described herein, the AV 2709 can, for each object data record (e.g., for each photograph or video), record a location associated with the object data record, such as GPS coordinates associated with the record.

The AV 2709 can further upload the collected object data and/or location data to the chronicle server 3802 (step 3910). Data can be uploaded by the AV 2709 to the chronicle server 3802 in real time, after a time delay, and/or in response to an event. For example, the AV 2709 can upload data to the chronicle server 3802 in response to completion of the mission and/or in response to a mission failure event (e.g., in response to an AV malfunction). Data can be uploaded to the chronicle server 3802 directly (e.g., where the AV 2709 can communicate directly with the chronicle server 3802) and/or indirectly, over the network (e.g., where the AV 2709 passes data to the ground station 2714, which can pass data across the network to the chronicle server 3802).

In various embodiments, the AV 2709 can associate or tag the collected object data with the location data collected in conjunction with the data object to form a plurality of GLOBs (step 3912). For example, the AV 2709 can, in real time and/or after a time delay and/or in response to an event, associated a photograph or video with a location of the photograph or video. In various embodiments, the AV 2709 may not associate or tag the object data with the location data. Rather, the AV 2709 can upload the object data and location data to the chronicle server 3802, and the chronicle server 3802 can perform the required association between the object data and location data to generate a plurality of GLOBs (step 3912). The plurality, or group, of GLOBs can, in either case, include a data, or asset, chronicle.

In various embodiments, and as described herein, each GLOB can be associated with a GDS. A GDS can include a variety of auxiliary GLOB data, such as location, time when the GLOB and/or data object was generated, owner of GLOB, access specification for GLOB, entity generating GLOB, type of GLOB, description of GLOB, rating of GLOB, and access permissions.

A GDS can also include a specification that permits the GDS to be searched for and/or accessed. The specification can be in the form of an identifier that specifies where the GLOB is located as well as information specifying how to access the GLOB from the specified location. Examples of specifications that support this are Uniform Resource Identifiers (URI's) which are well known methods for doing this on the World Wide Web.

A GLOB can therefore be searched for and/or accessed in the system 3800. For instance, a GLOB can be searched for within an asset chronicle based upon a location of the GLOB and/or a time associated with recordation or collection of the data object comprising the GLOB. A search can be performed, as described herein, based upon input received from an operator and/or observer via a UI device 2718 and/or 2720.

With reference to FIG. 40, an example map display 4000 is shown. The map display 4000 can be displayed by the chronicle server 3008 at a UI device 2718 and/or 2720. The map display 4000 can display a high level view or overview of the area surveyed by the AV 2709. In various embodiments, the AV 2709 can capture the overview from an elevation that is sufficient to photograph the mission route.

As shown, the map display 4000 can illustrate an AV route or "chronicle path" 4002. The chronicle path can, as described above, illustrate the path or route taken by the AV 2709 during a mission. The chronicle path can be drawn or rendered over the high level overview image displayed in the map display 4000.

A GLOB or imagery view 4004 can be displayed (e.g., as a picture-in-picture feature) in the map display 4000. The imagery view 4004 may comprise a video that plays as the marker on the map representing the AV location moves along the route. The imagery view 4004 can display a particular data object (e.g., an image or photograph) taken in association with a particular location along the AV route.

The map display 4000 can further include a timeline 4006. The timeline 4006 can extend along a portion of the map display 4000, such as, in various embodiments, horizontally along a bottom portion of the map display 4000. The timeline 4006 can begin with a mission start date and start time and end with a mission end date and end time. The timeline 4006 can be partitioned or segmented between the start date/time and the end date/time to show consecutive time blocks or time periods. The timeline 4006 can be partitioned at any desired granularity.

The map display 4000 can further include a control function 4008. The control function 4008 can include various control options, such as options for fast forward, rewind, play, pause, stop, and the like.

In operation, the map display 4000 can playback an object or asset chronicle. The asset chronicle can be played back at an operator and/or observer UI 2718 and/or 2720. As shown, the map display 4000 can display the chronicle path 4002 superimposed over the high level route view. As the asset chronicle is played back, a marker 4008 can be shown over the chronicle path 4002 to indicate the location of the data object or image displayed in the imagery view 4004. The timeline 4006 can also advance as the marker 4008 advances along the chronicle path 4002. Thus, an operator or observer can review a high level map of the area over which the AV 2709 traveled as well as a chronicle path superimposed over the high level map indicating the AV route. The operator and/or observer can further view the marker 4008, which indicates a location of the AV 2709 along the route at a particular time, as indicated in the timeline 4006. The imagery viewer 4004 can be displayed as well, so that the operator and/or observer can view the data object or asset image associated with a particular location (as designated by the marker 4008 and timeline 4006).

In various embodiments, the map display 4000 can include an option 4010 to designate a point of interest along the chronicle path 4002. A point of interest can be associated with any point along the AV route and can be represented by an icon, such as a star icon. Two example points of interest 4012 and 4014 are shown. Moreover, in various embodiments, the map display 4000 can include an option to create notes or instructions in association with a particular mission, GLOB, chronicle view, and the like. For instance, the map display 4000 can receive and/or store notes or instructions for future inspections or work orders in association with a particular data object, asset, chronicle path 4002, and the like.

In various embodiments, the map display 4000 can include an option to perform a comparative analysis. A map display 400 performing an example comparative analysis is shown at FIG. 41. A comparative analysis can be performed between any two GLOBs. However, in various embodiments, a comparative analysis can be performed between two GLOBs having the same location but that have different dates and/or times of recordation. For example, a first GLOB 4102 and a second GLOB 4104 can be associated with the location 4106. However, the first GLOB 4102 can have a first date/time of recordation, and the second GLOB 4104 can have a second date/time of recordation. An operator and/or observer can select the GLOBs 4102 and 4104 and/or GLOB dates/times for comparison, and the map display 4000 can, in response display each GLOB or image within the map display 4000, such as side by side, for comparison.

A comparative analysis can, as described, be useful in various circumstances. For instance, where an asset includes a levee, it may be desirable to compare a condition of the levee at a first time (e.g., at high tide) to a condition of the levee at a second time (e.g., low tide). Similarly, where an asset includes a bridge, it may be desirable to compare a condition of the bridge at a first time (e.g., when the bridge is newly constructed) to a condition of the bridge at a second, later time (e.g., after a year of use). Thus, the asset chronicles described herein can give an operator and/or observer the option to analyze a particular data object over time.

Moreover, in various embodiments, and where a data object is associated with multiple recordation dates and times, a time lapse video of the data object can be generated by the system 3800. In particular, the system 3800 can generate a file comprising a plurality of date and time sequenced GLOBs, each GLOB associated with a particular location, and the time sequenced series can be played back to illustrate a time lapse video.

It is to be understood that the foregoing is a detailed description of illustrative embodiments. The scope of the claims is not limited to these specific embodiments. Various elements, details, execution of any methods, and uses may differ from those just described, or be expanded on or implemented using technologies not yet commercially viable, and yet still be within the inventive concepts of the present disclosure. The scope of the invention is determined by the following claims and their legal equivalents.

What is claimed is:

1. An Autonomous Vehicle (AV) system capable of determining a motor control command associated with an Automated Vehicle (AV) trajectory, the AV system comprising:
   a content generating device that collects a plurality of target data associated with a target;
   a system controller communicatively coupled to the content generating device, wherein the system controller performs the steps of:
   extracting target features from the target data;
   comparing the extracted target features to a plurality of target model data to determine a target pose;
   determining the AV trajectory by comparing the target pose with at least one target objective;
   an AV sensor that determines an AV state;
   wherein the system controller determines at least one motor control command associated with the AV trajectory based on the AV state, the at least one target objective, and the AV trajectory.

2. The AV system of claim 1 wherein the extracted target features include at least one of an edge, a corner, and a shape.

3. The AV system of claim 1 wherein the content generating device includes at least one of a sonar sensor, an infrared sensor, a LIDAR sensor, and a camera.

4. The AV system of claim 1 wherein the target model data includes at least one of a target model feature and a target location.

5. The AV system of claim 1 wherein the target pose includes at least one of a target location with respect to the AV and an orientation with respect to the AV.

6. The AV system of claim 1 wherein the at least one target objective includes at least one of an AV location with respect to the target, an AV orientation with respect to the target, a time, and a velocity.

7. The AV system of claim 1 wherein the AV state includes at least one of an AV speed, a proximity to an obstacle, an AV orientation, an AV heading, an AV altitude, and an AV location, wherein an obstacle includes the target.

8. The AV system of claim 1 wherein the AV trajectory includes at least one of a desired AV state and a rate of change in the AV state.

9. The AV system of claim 1 wherein the AV state includes at least one of an AV speed, a proximity to an obstacle, an AV orientation, an AV heading, an AV altitude, and an AV location, wherein an obstacle includes the target;

wherein the at least one target objective includes at least one of an AV location with respect to the target, an AV orientation with respect to the target, a time, and a velocity; and wherein the AV trajectory includes at least one of a desired AV state and a rate of change in the AV state.

10. The AV system of claim 1 further comprising a server that is communicatively coupled to the AV, wherein the server receives target data from the AV.

11. A system for determining an Automated Vehicle (AV) trajectory, the system comprising:
 an AV that includes,
  a content generating device that collects a plurality of target data associated with a target,
  a system controller communicatively coupled to the content generating device,
  an AV sensor that determines an AV state;
 a server that is communicatively coupled to the AV, wherein the server performs the steps of:
  receiving the target data from the AV;
  extracting target features from the target data;
  comparing the extracted target features to a plurality of target model data to determine a target pose;
  determining the AV trajectory by comparing the target pose with at least one target objective; and
  transmitting the AV trajectory to the AV system controller.

12. The system of claim 11 wherein the extracted target features include at least one of an edge, a corner, and a shape.

13. The system of claim 11 wherein the content generating device includes at least one of a sonar sensor, an infrared sensor, a LIDAR sensor, and a camera.

14. The system of claim 11 wherein the target model data includes at least one of a target model feature and a target location.

15. The system of claim 11 wherein the target pose includes at least one of a target location with respect to the AV and an orientation with respect to the AV.

16. The system of claim 11 wherein the at least one target objective includes at least one of an AV location with respect to the target, an AV orientation with respect to the target, a time, and a velocity.

17. The system of claim 11 further comprising:
 the server determining an AV state;
 the server determining at least one motor control command based upon the AV state, the at least one target objective, and the AV trajectory; and
 the server transmitting the motor control command to the system controller.

18. The system of claim 17 wherein the AV state includes at least one of an AV speed, a proximity to an obstacle, an AV orientation, an AV heading, an AV altitude, and an AV location, wherein an obstacle includes the target.

19. The system of claim 17 wherein the AV trajectory includes at least one of a desired AV state and a rate of change in the AV state.

20. The system of claim 11 wherein the server includes at least one of a ground station and a cloud station.

* * * * *